United States Patent
Lee et al.

(10) Patent No.: US 11,884,467 B2
(45) Date of Patent: Jan. 30, 2024

(54) DEGRADABLE MATERIALS AND PACKAGING MADE FROM SAME

(71) Applicant: MONOSOL, LLC, Merrillville, IN (US)

(72) Inventors: David M. Lee, Clemmons, NC (US); Jennifer L. Childers, Lowell, IN (US); Lee K. Yeung, Garland, TX (US); Ken Jenke, Merrillville, IN (US); Jonathon Knight, Laporte, IN (US); Nicholas Zeese, Michigan City, IN (US); P. Scott Bening, Crown Point, IN (US); Yashodhan S. Parulekar, Crown Point, IN (US); Sumeet Kumar, Crown Point, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 17/390,005

(22) Filed: Jul. 30, 2021

(65) Prior Publication Data

US 2022/0017276 A1    Jan. 20, 2022

Related U.S. Application Data

(62) Division of application No. 15/516,667, filed as application No. PCT/US2015/053757 on Oct. 2, 2015, now Pat. No. 11,104,497.

(Continued)

(51) Int. Cl.
*B65D 65/46* (2006.01)
*C08J 5/18* (2006.01)
(Continued)

(52) U.S. Cl.
CPC ............ *B65D 5/46* (2013.01); *A45F 5/00* (2013.01); *B65D 65/40* (2013.01); *B65D 75/30* (2013.01);
(Continued)

(58) Field of Classification Search
None
See application file for complete search history.

(56) References Cited

U.S. PATENT DOCUMENTS

| | | |
|---|---|---|
| 3,652,371 A | 3/1972 | Hirata |
| 3,984,940 A | 10/1976 | Reich et al. |

(Continued)

FOREIGN PATENT DOCUMENTS

| | | | | |
|---|---|---|---|---|
| CN | 101778897 A | * | 7/2010 | ................ C08J 5/18 |
| EP | 0495257 A1 | | 7/1992 | |

(Continued)

OTHER PUBLICATIONS

Chinese Patent Application No. 201580057942.6, First Office Action, dated Oct. 9, 2019.

(Continued)

*Primary Examiner* — Jeffrey D Washville
(74) *Attorney, Agent, or Firm* — MARSHALL, GERSTEIN & BORUN LLP

(57) ABSTRACT

A water-soluble film, comprising a first water-soluble film, wherein the first water soluble film disintegrates in water within less than about 24 hours and dissolves in water within less than about 48 hours as measured by the MSTM-205 at 20° C. The disclosure provides a water-soluble film comprising a first water-soluble film that disintegrates in water within less than 24 hours and dissolves in water within less than 48 hours as measured by MSTM-205 at 20° C. The first water-soluble film optionally may be further characterized in that it does not disintegrate in water for at least about 1 hour (Continued)

and does not dissolve in water for at least about 1 hour as measured by MSTM-205 at 20° C. The disclosure further provides a water-soluble film comprising a first water-soluble film characterized in that the degradation and/or dissolution of the first water-soluble film is adapted to be activated by consumer handling.

16 Claims, 10 Drawing Sheets

Related U.S. Application Data

(60) Provisional application No. 62/121,995, filed on Feb. 27, 2015, provisional application No. 62/059,740, filed on Oct. 3, 2014.

(51) Int. Cl.
| | |
|---|---|
| *C08K 3/012* | (2018.01) |
| *C08K 3/014* | (2018.01) |
| *A45F 5/00* | (2006.01) |
| *B65D 65/40* | (2006.01) |
| *B65D 75/30* | (2006.01) |
| *C08K 5/00* | (2006.01) |
| *C08K 9/10* | (2006.01) |
| *B65D 5/46* | (2006.01) |

(52) U.S. Cl.
CPC ............... *C08J 5/18* (2013.01); *C08K 3/012* (2018.01); *C08K 3/014* (2018.01); *C08K 5/005* (2013.01); *C08K 5/0033* (2013.01); *C08K 9/10* (2013.01); *A45F 2005/006* (2013.01); *C08J 2300/14* (2013.01); *C08J 2329/00* (2013.01)

(56) References Cited

U.S. PATENT DOCUMENTS

| | | | |
|---|---|---|---|
| 4,067,836 | A | 1/1978 | Potts et al. |
| 4,435,307 | A | 3/1984 | Barbesgaard et al. |
| 5,288,627 | A | 2/1994 | Nielsen et al. |
| 5,441,805 | A | 8/1995 | Kwok |
| 5,443,750 | A | 8/1995 | Convents et al. |
| 5,457,046 | A | 10/1995 | Woldike et al. |
| 5,520,838 | A | 5/1996 | Baeck et al. |
| 5,648,096 | A | 7/1997 | Gander et al. |
| 5,648,263 | A | 7/1997 | Schulein et al. |
| 5,666,785 | A | 9/1997 | Jouffreau et al. |
| 5,668,073 | A | 9/1997 | Convents et al. |
| 5,674,270 | A | 10/1997 | Viltro et al. |
| 5,686,593 | A | 11/1997 | Woldike et al. |
| 5,691,178 | A | 11/1997 | Schulein et al. |
| 5,693,520 | A | 12/1997 | Branner et al. |
| 5,763,254 | A | 6/1998 | Woldike et al. |
| 5,776,757 | A | 7/1998 | Schulein et al. |
| 5,792,641 | A | 8/1998 | Schulein et al. |
| 5,824,532 | A | 10/1998 | Barnett et al. |
| 5,849,549 | A | 12/1998 | Barnett et al. |
| 5,858,757 | A | 1/1999 | Von Der Osten et al. |
| 5,912,157 | A | 6/1999 | von der Osten et al. |
| 5,919,691 | A | 7/1999 | Schulein et al. |
| 5,948,672 | A | 9/1999 | Rasmussen et al. |
| 6,001,639 | A | 12/1999 | Schulein et al. |
| 6,071,735 | A | 6/2000 | Schulein et al. |
| 6,093,562 | A | 7/2000 | Bisg.ang.rd-Frantzen et al. |
| 6,114,296 | A | 9/2000 | Schulein et al. |
| 6,117,664 | A | 9/2000 | Schulein et al. |
| 6,159,731 | A | 12/2000 | Yang et al. |
| 6,297,037 | B1 | 10/2001 | Barnett et al. |
| 6,297,038 | B1 | 10/2001 | Bisg.ang.rd-Frantzen et al. |
| 6,300,116 | B1 | 10/2001 | von der Osten et al. |
| 6,387,690 | B1 | 5/2002 | Schulein et al. |
| 6,423,524 | B1 | 7/2002 | Hagen et al. |
| 6,506,589 | B1 | 1/2003 | Hastrup et al. |
| 6,808,913 | B2 | 10/2004 | Hastrup et al. |
| 6,835,821 | B2 | 12/2004 | Hastrup et al. |
| 6,855,531 | B2 | 2/2005 | Shulein et al. |
| 6,867,031 | B2 | 3/2005 | Bisgard-Frantzen et al. |
| 7,098,017 | B2 | 8/2006 | von der Osten et al. |
| 7,147,787 | B2 | 12/2006 | Chisholm et al. |
| 7,226,773 | B2 | 6/2007 | Schulein et al. |
| 7,854,994 | B2 | 12/2010 | Henderson-Rutgers et al. |
| 7,993,898 | B2 | 8/2011 | Andersen et al. |
| 8,017,372 | B2 | 9/2011 | Andersen et al. |
| 8,757,062 | B2 | 6/2014 | Content et al. |
| 8,809,250 | B2 | 8/2014 | Parrish et al. |
| 11,104,497 | B2 | 8/2021 | Lee et al. |
| 2001/0036910 | A1 | 11/2001 | Rasmussen et al. |
| 2002/0098996 | A1 | 7/2002 | Bisgard-Frantzen et al. |
| 2002/0102702 | A1 | 8/2002 | Osten et al. |
| 2003/0054539 | A1 | 3/2003 | Schulein et al. |
| 2003/0064908 | A1 | 4/2003 | Bisgard-Frantzen et al. |
| 2003/0069155 | A1 | 4/2003 | Mangin et al. |
| 2003/0092097 | A1 | 5/2003 | Andersen et al. |
| 2003/0119167 | A1 | 6/2003 | Rasmussen et al. |
| 2003/0148495 | A1 | 8/2003 | Hastrup et al. |
| 2003/0175933 | A1 | 9/2003 | Hastrup et al. |
| 2003/0186378 | A1 | 10/2003 | Hastrup et al. |
| 2004/0253676 | A1 | 12/2004 | Bisgard-Frantzen et al. |
| 2005/0003986 | A1 | 1/2005 | Hastrup et al. |
| 2005/0009166 | A1 | 1/2005 | Andersen et al. |
| 2005/0059131 | A1 | 3/2005 | Bisgard-Frantzen et al. |
| 2005/0070003 | A1 | 3/2005 | Schulein et al. |
| 2005/0250664 | A1 | 11/2005 | Bisgard-Frantzen et al. |
| 2006/0035323 | A2 | 2/2006 | Bisgard Frantzen et al. |
| 2006/0213801 | A1 | 9/2006 | Karaoren et al. |
| 2008/0132438 | A1 | 6/2008 | Hoffman et al. |
| 2008/0145912 | A1 | 6/2008 | Schulein et al. |
| 2008/0206836 | A1 | 8/2008 | Andersen et al. |
| 2009/0084321 | A1 | 4/2009 | Mo |
| 2009/0123679 | A1 | 5/2009 | Denome et al. |
| 2009/0136641 | A1 | 5/2009 | Azam et al. |
| 2009/0170747 | A1 | 7/2009 | Andersen et al. |
| 2009/0280527 | A1 | 11/2009 | Bisgard-Frantzen et al. |
| 2010/0099597 | A1 | 4/2010 | Bisgard-Frantzen et al. |
| 2010/0099598 | A1 | 4/2010 | Bisgard-Frantzen et al. |
| 2010/0107342 | A1 | 5/2010 | Schulein et al. |
| 2010/0222454 | A1 | 9/2010 | Sala et al. |
| 2010/0305020 | A1 | 12/2010 | Jennewein |
| 2011/0177990 | A1 | 7/2011 | Bisgard-Frantzen et al. |
| 2011/0197642 | A1 | 8/2011 | Rustemeyer et al. |
| 2011/0250674 | A1 | 10/2011 | Andersen et al. |
| 2011/0268938 | A1 | 11/2011 | Schuhmann |
| 2013/0273277 | A1 | 10/2013 | Lee et al. |

FOREIGN PATENT DOCUMENTS

| | | |
|---|---|---|
| EP | 0531315 A1 | 3/1993 |
| EP | 0531372 A1 | 3/1993 |
| GB | 1296839 A | 11/1972 |
| JP | 2004-529243 A | 9/2004 |
| JP | 2007-533556 A | 11/2007 |
| JP | 2011-505437 A | 2/2011 |
| JP | 2012-512061 A | 5/2012 |
| TW | 201400565 A | 1/2014 |
| WO | WO-89/06270 A1 | 7/1989 |
| WO | WO-89/06279 A1 | 7/1989 |
| WO | WO-89/09259 A1 | 10/1989 |
| WO | WO-92/19729 A1 | 11/1992 |
| WO | WO-94/02597 A1 | 2/1994 |
| WO | WO-94/07998 A1 | 4/1994 |
| WO | WO-94/18314 A1 | 8/1994 |
| WO | WO-94/25583 A1 | 11/1994 |
| WO | WO-95/24471 A1 | 9/1995 |
| WO | WO-96/11262 A1 | 4/1996 |
| WO | WO-96/23873 A1 | 8/1996 |
| WO | WO-96/29397 A1 | 9/1996 |
| WO | WO-97/43424 A1 | 11/1997 |
| WO | WO-98/08940 A1 | 3/1998 |
| WO | WO-98/12307 A1 | 3/1998 |
| WO | WO-98/20115 A1 | 5/1998 |
| WO | WO-98/20116 A1 | 5/1998 |
| WO | WO-98/34946 A1 | 8/1998 |

(56) References Cited

FOREIGN PATENT DOCUMENTS

| WO | WO-2004/043822 A1 | 5/2004 |
| WO | WO-2006/124484 A1 | 11/2006 |
| WO | WO-2007/034471 A2 | 3/2007 |
| WO | WO-2008/105705 A1 | 9/2008 |
| WO | WO-2013/158364 A1 | 10/2013 |
| WO | WO-2014/110356 A1 | 7/2014 |
| WO | WO-2014/151718 A2 | 9/2014 |
| WO | WO-2016040629 A1 * | 3/2016 ......... C11D 17/0039 |

OTHER PUBLICATIONS

International Search Report and Written Opinion, International Application No. PCT/US2015/053757, dated May 27, 2015.
Japanese Patent Application No. 2017-517777, Notice of Reasons for Refusal, dated Aug. 26, 2019.
Taiwan Patent Application No. 104132517, Examination Report with Search Report, dated May 17, 2019.

\* cited by examiner

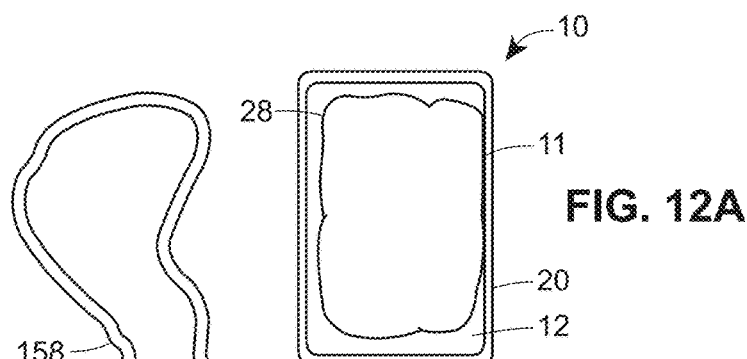
FIG. 12A
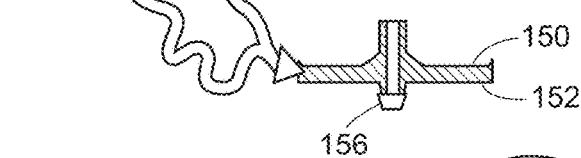
FIG. 12B
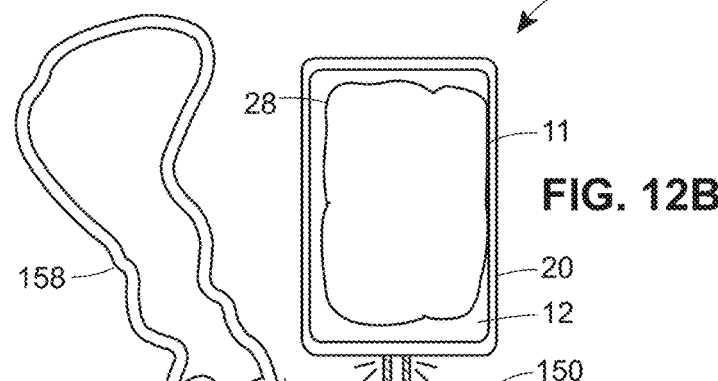
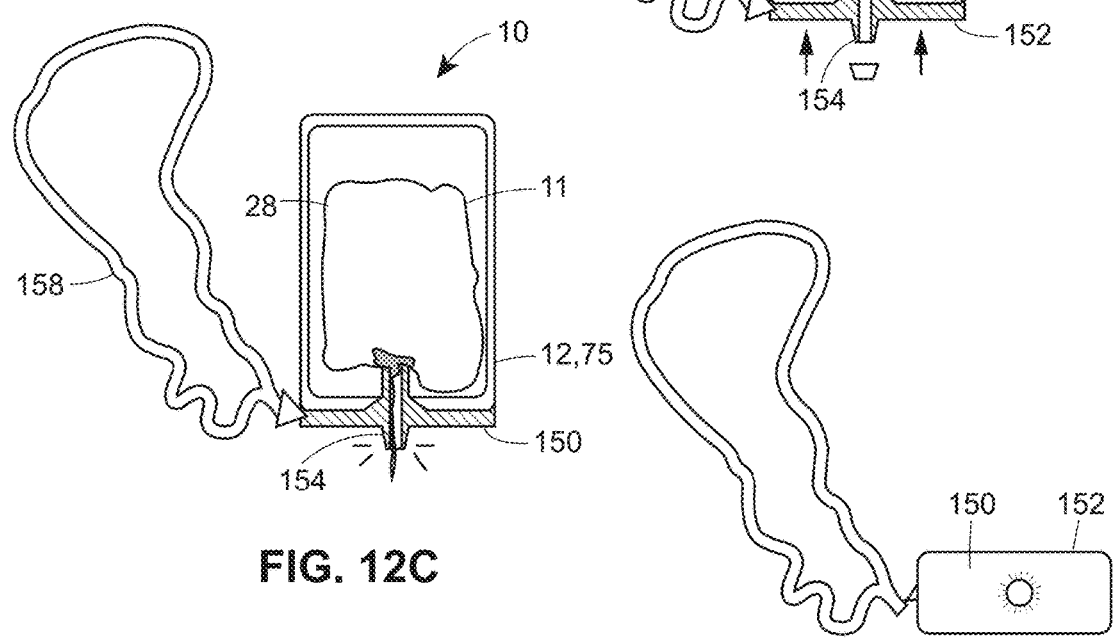
FIG. 12C
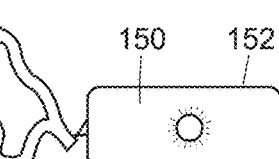
FIG. 12D

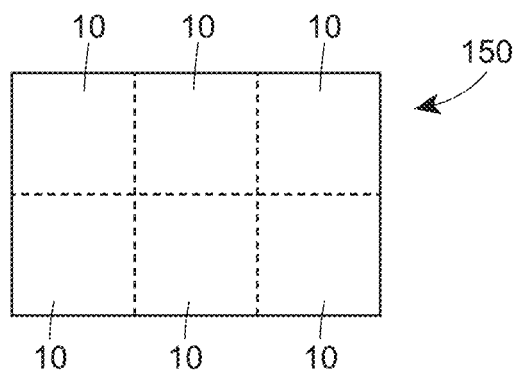
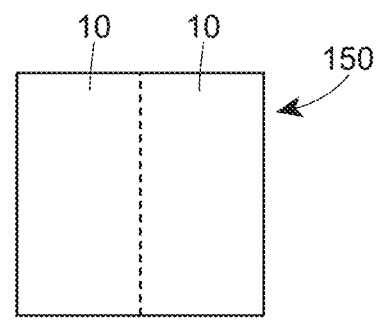
FIG. 13A  FIG. 13B
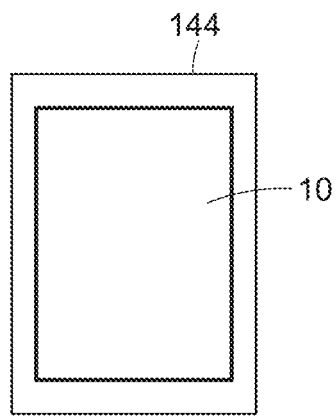
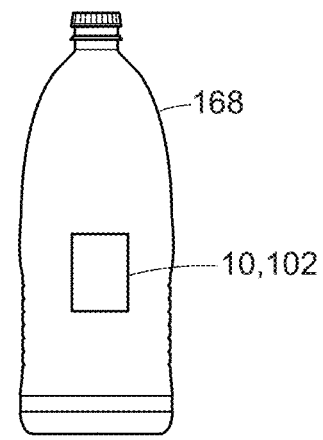
FIG. 14  FIG. 15
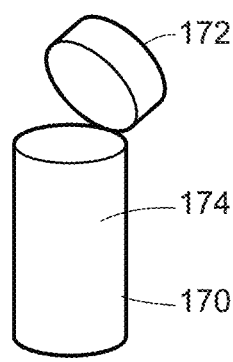
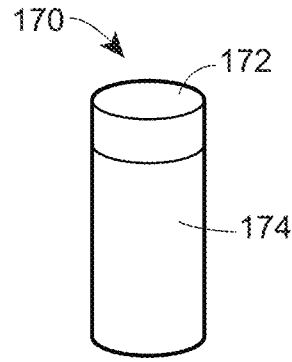
FIG. 16A  FIG. 16B

DEGRADABLE MATERIALS AND PACKAGING MADE FROM SAME

CROSS-REFERENCE TO RELATED APPLICATIONS

This application is a divisional application of U.S. patent application Ser. No. 15/516,667 filed on Apr. 3, 2017, which is a U.S. national phase application of PCT Application No. PCT/US15/53757, filed on Oct. 2, 2015, which claims the benefit of priority under 35 U.S.C. § 119(e) of U.S. Provisional Application Nos. 62/121,995 filed on Feb. 27, 2015 and 62/059,740, filed on Oct. 3, 2014, the entire disclosures of which are hereby incorporated by reference.

FIELD OF THE DISCLOSURE

The disclosure relates generally to water-soluble or water-insoluble degradable films and related pouches or packets. More particularly the disclosure relates to water-soluble films, water-insoluble films, and related pouches or packets that are adapted to degrade or dissolve after handling or use by a consumer.

BACKGROUND

Water-soluble polymeric films are commonly used as packaging materials to simplify dispersing, pouring, dissolving and dosing of a material to be delivered. For example, packets made from water-soluble film are commonly used to package household care compositions, e.g., a pouch containing a laundry or dish detergent. A consumer can directly add the pouch to a mixing vessel, such as a bucket, sink or washing machine. Advantageously, this provides for accurate dosing while eliminating the need for the consumer to measure the composition.

However, in developing countries, such single dose pouches must be more robust in order to withstand the supply chain as well as greater handling by consumers, as consumers typically purchase one single dose pouch at a time and transport it from the point of purchase to the point of use. Accordingly, single dose pouches in developing countries are typically made of water-insoluble films because such films have greater mechanical strength and are less susceptible to environmental variants, including water that may exist on the consumer's hands.

Previous water-insoluble pouches remain intact after the consumer has emptied the contents and need to be disposed of by the consumer. Such pouches tend to accumulate in landfills after they are disposed of, and improper disposal of such pouches leads to unsightly and environmentally unfriendly litter. Some companies have focused on biodegradable pouches as a way of reducing trash; however, these materials tend to be susceptible in the supply chain and require specialized disposal conditions. Thus, it is important that single dose pouches completely dissolve or degrade, in a timely manner with little to no effort from consumers, for example when exposed to the elements.

SUMMARY

One aspect of the disclosure provides a water-soluble film comprising a first water-soluble film characterized in that it disintegrates in water within less than 24 hours and dissolves in water within less than 48 hours as measured by MSTM-205 at 20° C., which is described in detail below. The first water-soluble film optionally may be further characterized in that it does not disintegrate in water for at least about 1 hour and does not dissolve in water for at least about 1 hour as measured by MSTM-205 at 20° C.

Another aspect of the disclosure provides a water-soluble film comprising a first water-soluble film characterized in that the degradation and/or dissolution of the first water-soluble film is adapted to be activated by consumer handling.

Optionally, the water-soluble film of any aspect disclosed herein is characterized in that it degrades within about 1 month as measured by the Compostability Test ASTMD 6400-04, as described below. Further optionally, the water-soluble film is characterized in that it does not degrade within about 2 weeks as measured by the Compostability Test ASTMD 6400-04, as described below. As a further option, a printed material can be provided on the water-soluble film.

Further optionally, the first water-soluble film of any aspect disclosed herein further comprises a degradation accelerator, an agent for delayed degradation, or both a degradation accelerator and an agent for delayed degradation.

Another aspect of the disclosure provides a water-soluble pouch or packet, comprising a water-soluble film in the form of a pouch or packet, wherein the degradation and/or dissolution of the pouch or packet is adapted to be activated by consumer handling.

Another aspect of the disclosure provides a water-insoluble, degradable, film characterized in the water-insoluble film degrades within at most about 4 weeks as measured by the Compostability Test ASTM D6400-04, which is described in detail below. The water-insoluble, degradable, film optionally may be further characterized in that it does not degrade for at least about 2 weeks as measured by the Compostability Test ASTM D6400-04.

Another aspect of the disclosure provides a water-insoluble film characterized in that the disintegration and/or dissolution of the water-insoluble film is adapted to be activated by consumer handling.

Optionally, the water-insoluble film of any aspect disclosed herein further comprises a degradation accelerator, an agent for delayed degradation, or both a degradation accelerator and an agent for delayed degradation.

A still further aspect of the disclosure provides a water-insoluble, degradable, pouch or packet, comprising a water-insoluble, degradable, film in the form of a pouch or packet, wherein the degradation of the pouch or packet is adapted to be activated by consumer handling.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the invention to the specific embodiments described herein.

DESCRIPTION OF THE DRAWINGS

The present disclosure can be more readily understood with reference to the appended drawing figures where:

FIGS. 12A to 12C are various views of an embodiment of a spout tool and an embodiment of a degradable packet;

FIG. 12D is a bottom view of the embodiment of the spout tool of FIGS. 12A to 12C;

FIG. 13A is a front view of an embodiment of a packet assembly;

FIG. 13B is a front view of an embodiment of a packet assembly;

FIG. 14 is a front view of an embodiment of a degradable packet and an embodiment of a degradable outer packaging;

FIG. 15 is a front view of an embodiment of a degradable packet and an embodiment of a container;

FIG. 16A is a perspective view of an embodiment of a degradable packet and an embodiment of a container in an open position;

FIG. 16B is a perspective view of the embodiment of the degradable packet and the embodiment of the container of FIG. 16A in a closed position;

DETAILED DESCRIPTION

Figure 1:
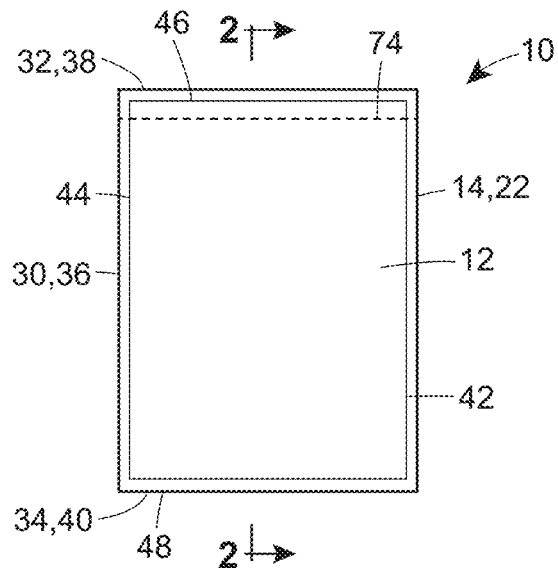
FIG. 1 is a front view of an embodiment of a degradable packet.

One aspect of the disclosure provides a water-soluble film comprising a first water-soluble film characterized in that it disintegrates in water within less than about 24 hours and dissolves in water within less than about 48 hours as measured by MSTM-205 at 20° C., which is described in detail below. The first water-soluble film optionally may be further characterized in that it does not disintegrate in water for at least about 1 hour and does not dissolve in water for at least about 1 hour as measured by MSTM-205 at 20° C.

Another aspect of the disclosure provides a water-soluble film comprising a first water-soluble film characterized in that the degradation and/or dissolution of the first water-soluble film is adapted to be activated by consumer handling.

Optionally, the water-soluble film of any aspect disclosed herein is characterized in that it degrades within about 1 month as measured by the Compostability Test ASTMD6400-04, as described below. Further optionally, the water-soluble film is characterized in that it does not degrade within about 2 weeks as measured by the Compostability Test ASTMD6400-04, as described below. As a further option, a printed material can be provided on the water-soluble film.

Further optionally, the first water-soluble film of any aspect disclosed herein further comprises a degradation accelerator, an agent for delayed degradation, or both a degradation accelerator and an agent for delayed degradation. The degradation accelerator, if included, can optionally be encapsulated and can further optionally be dispersed within the first water-soluble film and/or can be provided, for example as a coating, on at least one side of the first water-soluble film. Further, optionally, if the first water-soluble film has a degradation accelerator dispersed therein, at least one side of the first water-soluble film can be coated with a second water-soluble film layer. The second water-soluble film layer can be free of the degradation accelerator. Alternatively, if the first water-soluble film has a degradation accelerator provided on at least one side of the first water-soluble film, a second water-soluble film layer can optionally be coated over the degradation accelerator such that the degradation accelerator is provided between the first water-soluble film and the second water-soluble film. The second water-soluble film is characterized in that it disintegrates in water within at most about 90 seconds and dissolves in water within at most about 120 seconds as measured by MSTM-205, and it can optionally have a thickness in a range of 25 microns to 125 microns. Advantageously, the second water-soluble film can optionally be a film that has gas barrier properties.

Another aspect of the disclosure provides a water-soluble pouch or packet, comprising a water-soluble film in the form of a pouch or packet, wherein the degradation and/or dissolution of the pouch or packet is adapted to be activated by consumer handling. Advantageously, the water-soluble packet of the disclosure maintains structural integrity up to the point of purchase by the consumer, but dissolution and/or degradation begins to occur upon handling by the consumer. As used herein and unless specified otherwise, "handling by the consumer" includes any one or more of tearing of the film (e.g. to open a pouch or packet formed from the film), allowing the film to come into contact with water (e.g., water on a consumer's skin, wash water, rain), carrying a film without a secondary package, and/or allowing the film to be exposed to UV light, including but not limited to exposure to sunlight as a consumer transports the film from the point of sale to the point of use, or general exposure to sunlight after the contents have been released by the consumer and the packet or pouch discarded.

In some embodiments, the water-soluble packets will comprise, enclosed within the packet, solids, liquids, gels, pastes, or combinations thereof. Non-limiting examples of the enclosed composition include laundry detergents, bleach and laundry additives, fabric care, dishwashing, hard surface cleaning, beauty care, skin care, or other personal care products including, but not limited to shampoo, conditioner, and toothpaste.

In some embodiments, the water-soluble packets can comprise a water-soluble film having a first water-soluble film layer and a second water-soluble film layer coated on a surface thereof, wherein the packet is assembled such that the second water-soluble film layer is the outer surface of the packet.

In refinements of the aforementioned embodiment, when the second water-soluble film layer degrades or dissolves, the first water-soluble film is exposed to the environment at which point the first water-soluble film begins to degrade or dissolve, such that the packet degrades from the outside-in. As used herein and unless specified otherwise "outside-in" is intended to refer to any degradation and/or dissolution process wherein the partial or complete degradation or dissolution of an outer film or film layer allows for the degradation or dissolution of an inner film or film layer. Of course, in refinements the first-water soluble film can have a degradation accelerator dispersed within the film or provided on a surface of the film. Advantageously, when a degradation accelerator is provided on a surface of the first water-soluble film, the degradation accelerator can be protected from premature activation by the second water-soluble film.

In some embodiments, the water-soluble packets can comprise a water-soluble film having a first water-soluble film layer and a second water-soluble film layer coated on a surface thereof, wherein the packet is assembled such that the second water-soluble film is the inner surface of the packet.

In refinements of the aforementioned embodiment, when the second water-soluble film degrades or dissolves, the first water-soluble film is exposed to the packet contents and/or environment at which point the first water-soluble film begins to degrade or dissolve, such that the packet degrades from the inside-out. As used herein and unless specified otherwise "inside-out" is intended to refer to any degradation and/or dissolution process wherein the partial or complete degradation or dissolution of an inner film or film layer allows for the degradation or dissolution of an outer film or film layer. Of course, in refinements the first-water soluble film can have a degradation accelerator dispersed within the film or provided on a surface of the film. Advantageously, when an degradation accelerator is provided on a surface of the first water-soluble film, the degradation accelerator can be protected from premature activation by the second water-soluble film.

In some embodiments, wherein a water-soluble pouch or packet includes or is intended to be distributed in a secondary packaging, the water-soluble pouch or packet may be formed form a cold water-soluble film that is readily soluble. A film that is readily soluble in cold water is characterized in that it disintegrates in water having a temperature less than about 50° F. (10° C.) within at most about 90 seconds and dissolves in water having a temperature less than about 50° F. (10° C.) within at most about 120 seconds as measured by MSTM-205; optionally it can have a thickness in a range of about 25 microns to about 125 microns.

Another aspect of the disclosure provides a water-insoluble, degradable, film characterized in the water-insoluble film degrades within at most about 4 weeks as measured by the Compostability Test ASTM D6400-04, which is described in detail below. The water-insoluble, degradable, film optionally may be further characterized in that it does not degrade for at most about 2 weeks as measured by the Compostability Test ASTM D6400-04.

Another aspect of the disclosure provides a water-insoluble film characterized in that the disintegration and/or dissolution of the water-insoluble film is adapted to be activated by consumer handling.

Optionally, the water-insoluble film of any aspect disclosed herein further comprises a degradation accelerator, an agent for delayed degradation, or both a degradation accelerator and an agent for delayed degradation. The degradation accelerator, if included, can optionally be encapsulated and can be dispersed within the water-insoluble film and/or can be provided, for example as a coating, on at least one side of the water-insoluble film. Further, optionally, if the water-insoluble film has a degradation accelerator dispersed therein, at least one side of the water-insoluble film can be coated with a water-soluble film. The coating of water-soluble film can be free of a degradation accelerator. Alternatively, if the water-insoluble film has a degradation accelerator provided on at least one side of the water-insoluble film, a water-soluble film can optionally be provided over the degradation accelerator such that the degradation accelerator is provided between the water-insoluble film and the water-soluble film. The water-soluble film is characterized in that it disintegrates in water within at most about 90 seconds and dissolves in water within at most about 120 seconds as measured by MSTM-205; optionally the film has a thickness in a range of 15 microns to 125 microns. In these types of embodiments, the coating of water-soluble film can optionally be free of the degradation accelerator. Advantageously, the water-soluble film optionally can be a film that has gas-barrier properties. As a further option, a printed material can be provided on the water-insoluble film.

A still further aspect of the disclosure provides a water-insoluble, degradable, pouch or packet, comprising a water-insoluble, degradable, film in the form of a pouch or packet, wherein the degradation of the pouch or packet is adapted to be activated by consumer handling. Advantageously, the water-insoluble packet of the disclosure maintains structural integrity up to the point of purchase by the consumer but degradation begins to occur upon handling by the consumer.

One type of embodiment of the water-insoluble packets will comprise, enclosed within the packet, solids, liquids, gels, or combinations thereof. Non-limiting examples of the enclosed composition include laundry detergents, bleach and laundry additives, fabric care, dishwashing, hard surface cleaning, beauty care, skin care, or other personal care products including, but not limited to shampoo, conditioner, and toothpaste.

In some embodiments, the water-insoluble pouches or packets can comprise a water-insoluble film having a water-soluble film layer coated on a surface thereof, wherein the pouch or packet is assembled such that the water-soluble film layer is the outer surface of the pouch or packet. A water-insoluble pouch or packet formed as such can degrade from the outside-in as described above. Of course, in refinements the water-insoluble film can have a degradation accelerator dispersed within the film or provided on a surface of the film. Advantageously, when a degradation accelerator is provided on a surface of the water-insoluble film, the degradation accelerator can be protected from premature activation by the water-soluble film. The coating of water-soluble film can optionally be free of the degradation accelerator.

In some embodiments, the water-insoluble pouches or packets can comprise a water-insoluble film having a water-soluble film layer coated on a surface thereof, wherein the pouch or packet is assembled such that the water-soluble film layer is the inner surface of the pouch or packet. A water-insoluble pouch or packet formed as such can degrade from the inside-out as described above. Of course, in refinements the water-insoluble film can have a degradation accelerator dispersed within the film or provided on a surface of the film. Advantageously, when a degradation accelerator is provided on a surface of the water-insoluble film, the degradation accelerator can be protected from premature activation by the water-soluble film.

In another aspect, a packet having a water-insoluble film layer can include an adjacent water-soluble film layer than includes a degradation accelerator for the water-insoluble film layer. For example, the degradation accelerator can be released from the water-soluble film layer upon partial or complete dissolution of the water-soluble film layer, so that it can begin to act on the water-insoluble film layer.

Ranges may be expressed herein as from "about" or "approximately" one particular value and/or to "about" or "approximately" another particular value. When such a range is expressed, another contemplated embodiment includes from the one particular value and/or to the other particular value. Similarly, when particular values are expressed as approximations, but use antecedents such as "about," "at least," "at most," or "less than about," it will be understood that the particular value forms another embodiment.

As used herein, the term "comprising" indicates the potential inclusion of other agents, elements, steps, or features, in addition to those specified.

As used herein and unless specified otherwise all measurements of viscosity in centipoises (cP) are of a 4% aqueous solution at 20° C.

As used herein and unless specified otherwise, the terms "wt. %" and "wt %" are intended to refer to the composition of the identified element in "dry" (non water) parts by weight of the entire film (when applicable) or parts by weight of the entire composition enclosed within a packet (when applicable). As used herein and unless specified otherwise, the term "phr" is intended to refer to the composition of the identified element in parts per one hundred parts water-soluble polymer resin.

As used herein and unless specified otherwise, the term "degradable" is intended to refer to a material that degrades from the action of one or more of a microorganism, e.g. bacteria, fungi, and algae; heat; moisture, including humidity; UV light; oxidants; chemicals; enzymes; or combinations of the foregoing. The water-soluble film and water-insoluble film disclosed herein are degradable films. The term degradable encompasses material that is biodegradable and/or oxo-degradable. As used herein, the term "biodegradable" generally refers to a material that degrades from the action of naturally occurring microorganisms, e.g. bacteria, fungi, and algae; environmental heat; moisture; or other environmental factors, such as determined according to the QUV Test for Accelerated Weathering (according to one or more of ASTM G154, ASTM D4329, ASTM D4587, and ISO 4892, or all of them) or the Compostability Test ASTM D400-04, as described below.

As used herein and unless specified otherwise, the terms "degradation accelerator" or "accelerates degradation" are intended to refer to a material that when present in a film free of agents for delayed degradation, results in an increased rate or degree of degradation of the film relative to a film that does not include a degradation accelerator.

As used herein and unless specified otherwise, the term "agent(s) for delayed degradation" are intended to refer to a material that when present in a film comprising a degradation accelerator, delays the initiation of degradation of the film, relative to a film that does not include an agent for delayed degradation.

As used herein and unless specified otherwise, the term "water-insoluble film" is intended to refer to a film that is practically insoluble or practically non-dispersable as well as a film that is sparingly-soluble or sparingly-dispersable. A film is sparingly-soluble or sparingly-dispersable if the film has a disintegration time in water of at least 24 hours and a dissolution time in water of at least 48 hours as determined by MSTM-205 at 20° C.; optionally the film has a thickness in a range of 15 microns to about 125 microns. As used herein, "practically insoluble" is intended to refer to a material wherein more than 10,000 ml of water is needed to dissolve 1 g of material at 20° C.

Further, as used herein, "water-insoluble organic material" is intended to refer to an inorganic material that is practically insoluble as well as an inorganic material that is very lightly-soluble or slightly-soluble. An inorganic material is very slightly-soluble if 1 g of the material dissolves in an amount of water in the range of 1000 ml to 10,000 ml at 20° C. (i.e., has a solubility in the range of 1 g/1000 ml to 1 g/10,000 ml) and an inorganic material is slightly soluble if 1 g of the material dissolves in an amount of water in the range of 100 ml to 1000 ml at 20° C. (i.e., has a solubility in the range of 1 g/100 ml to 1 g/1000 ml).

As used herein and unless specified otherwise, the term "nonsoluble in water" is intended to refer to a material that is practically insoluble in water.

Water-Soluble Film

In one class of embodiments, the water-soluble film includes polyvinyl alcohol ("PVA"). PVA is a synthetic resin generally prepared by the alcoholysis, usually termed hydrolysis or saponification, of polyvinyl acetate. Fully hydrolyzed PVA, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVA polymer then being known as partially hydrolyzed, it is more weakly hydrogen-bonded and less crystalline and is soluble in cold water—less than about 50° F. (10° C.). An intermediate cold/hot water soluble film can include, for example, intermediate partially-hydrolyzed PVA (e.g., with degrees of hydrolysis of about 94% to about 98%), and is readily soluble only in warm water—e.g., rapid dissolution at temperatures of about 40° C. and greater. Both fully and partially hydrolyzed PVA types are commonly referred to as PVA homopolymers although the partially hydrolyzed type is technically a vinyl alcohol-vinyl acetate copolymer.

The degree of hydrolysis (DH) of the PVA included in the water-soluble films of the present disclosure can be about 75% to about 99%, for example. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVA can be chosen such that the water-solubility of the resin is temperature dependent, and thus the solubility of a film made from the resin, and additional ingredients is also influenced. In one class of embodiments the film is cold water-soluble. A cold water-soluble film, soluble in water at a temperature of less than 10° C., can include PVA with a degree of hydrolysis in a range of about 75% to about 90%, or in a range of about 80% to about 90%, or in a range of about 85% to about 90%. In another class of embodiments the film is hot water-soluble. A hot water-soluble film, soluble in water at a temperature of at least about 60° C., can include PVA with a degree of hydrolysis of at least about 98%.

The PVA polymer of the water-soluble film is not particularly limited and it can include a single PVA homopolymer, a single PVA copolymer, or a blend of PVA homopolymers, copolymers, or combinations thereof. In some aspects, the water-soluble film can include a water-soluble polymer which is other than a PVA polymer. In one class of embodiments, the PVA polymer will be a partially or fully hydrolyzed PVA homopolymer including vinyl alcohol monomer units and optionally vinyl acetate monomer units. In another type of embodiment, the PVA polymer will be a partially or fully hydrolyzed PVA copolymer including an anionic monomer unit, a vinyl alcohol monomer unit, and optionally a vinyl acetate monomer unit. In various embodiments, the anionic monomer can be one or more of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). For example, the anionic monomer can include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid) and alkali metal salts thereof (e.g., sodium salts). Similarly, the anionic monomer can include one or more of monomethyl maleate and alkali metal salts thereof (e.g., sodium salts). Examples of non-PVA water-soluble polymers include polyethyleneimines, polyvinyl pyrrolidones, polyalkylene oxides, polyacrylamides, cellulose ethers, cellulose esters, cellulose amides, polyvinyl acetates, polyamides, gelatines, methylcelluloses, carboxymethylcelluloses and salts thereof, dextrins, ethylcelluloses, hydroxyethyl celluloses, hydroxypropyl methylcelluloses, maltodextrins, starches, modified starches, guar gum, acacia gum, xanthan gum, carrageenan, and polyacrylates and salts thereof. The anionic monomer or functional group can be present in a range of 0.1 to 20 mole %, or 1 to 10 mole %, for example.

As noted, the PVA polymer can include blends of PVA polymers, for example a blend including two or more different PVA homopolymers, a blend including two or more different PVA copolymers, or a blend including at least one PVA homopolymer and at least one PVA copolymer. In a particular PVA copolymer blend embodiment, the blend includes a first PVA copolymer including a first anionic monomer unit, and a second PVA copolymer including a second anionic monomer unit different from the first anionic monomer unit. For example, the first anionic monomer can include one or more acrylamido methylpropanesulfonic acids and alkali metal salts thereof or alternatively one or more acrylate or methacrylate and alkali metal salts thereof, and the second anionic monomer can include one or more of monomethyl maleate and alkali metal salts thereof or alternatively one or more acrylate or methacrylate and alkali metal salts thereof. The first PVA copolymer can be present in an amount in a range of about 10 wt. % to about 80 wt. % (e.g., 10 wt. % to 60 wt. %, 40 wt. % to 60 wt. %, 10 wt. % to 30 wt. %) of total PVA polymers in the film, and the second PVA copolymer can be present in an amount in a range of about 20 wt. % to about 90 wt. % (e.g., 40 wt. % to 90 wt. %, 40 wt. % to 60 wt. %, 70 wt. % to 90 wt. %) of total PVA polymers in the film.

Other film-forming resins for use in addition to or in an alternative to PVA can include, but are not limited to, modified polyvinyl alcohols, polyacrylates, water-soluble acrylate copolymers, polyaminopropyl sulfonic acid and salts thereof, polyitaconic acid and salts thereof, polyacrylamides, polyvinyl pyrrolidone, pullulan, cellulosics, including but not limited to carboxymethyl cellulose and hydroxypropyl methyl cellulose, water-soluble natural polymers including, but not limited to, guar gum, xanthan gum, carrageenan, and starch, water-soluble polymer derivatives including, but not limited to, cationically and anionically modified starches, including ethoxylated starch and hydroxypropylated starch, poly(sodium acrylamido-2-methylpropane sulfonate), polymonomethylmaleate and salts thereof, copolymers thereof, and combinations of any of the foregoing with each other and/or with PVA. In some embodiments the film forming agent comprises PVA. In some embodiments the film forming agent comprises PVA and a starch. In yet other embodiments the film forming agent comprises PVA and an anionically modified starch.

The water-soluble resin can be included in the water-soluble film in any suitable amount, for example an amount in a range of about 35 wt % to about 90 wt %. The weight ratio of the amount of the water-soluble resin as compared to the combined amount of additives can be any suitable ratio, for example a ratio in a range of about 0.5 to about 5, or about 1 to 3, or about 1 to 2.

Water-soluble resins for use in the films described herein (including, but not limited to PVA resins) can be characterized by any suitable viscosity for the desired film properties, optionally a viscosity in a range of about 8.0 to about 50.0 cP, or about 10.0 cP to about 40 cP, or about 13 cP to about 30 cP, or about 15 cP to about 27 cP. The viscosity of a PVA resin is determined by measuring a freshly made solution using a Brookfield LV type viscometer with UL adapter as described in British Standard EN ISO 15023-2:2006 Annex E Brookfield Test method. It is international practice to state the viscosity of 4% aqueous solution at 20° C. All viscosities specified herein in cP should be understood to refer to the viscosity of 4% aqueous solution at 20° C., unless specified otherwise.

It is well known in the art that the viscosity of a resin is correlated with the weight average molecular weight ($\overline{M}w$) of the same resin, and often the viscosity is used as a proxy for $\overline{M}w$. Thus, the weight average molecular weight of the water-soluble resin optionally can be in a range of about 14,000 to about 205,000, or about 35,000 to about 200,000, or about 80,000 to about 170,000, or about 97,000 to about 160,000 Daltons. The molecular weight of the resin need only be sufficient to enable it to be molded by suitable techniques or cast from a solution to form a thin plastic film.

The water-soluble films according to the present disclosure may comprise a water-soluble film having any thickness characterized in that it disintegrates in water within less than about 24 hours and dissolves in water within less than about 48 hours as measured by MSTM-205 at 20° C. Suitable film thicknesses of a water-soluble film characterized in that it disintegrates in water within less than about 24 hours and dissolves in water within less than about 48 hours as measured by MSTM-205 include thicknesses in a range of about 20 microns to about 125 microns, about 25 microns to about 125 microns, about 30 microns to about 100 microns, about 40 microns to about 90 microns, or about 50 microns to about 80 microns, for example.

Further, the first water-soluble films of the disclosure optionally may be water-soluble films having any thickness characterized in that it does not disintegrate in water for at least about 1 hour and does not dissolve in water for at least about 1 hour as measured by MSTM-205 at 20° C. Suitable film thicknesses of a water-soluble film characterized in that it does not disintegrate in water for at least about 1 hour and does not dissolve in water for at least about 1 hour as measured by MSTM-205 include thicknesses in a range of about 20 microns to about 125 microns, about 25 microns to about 125 microns, about 30 microns to about 100 microns, about 40 microns to about 90 microns, or about 50 microns to about 80 microns, for example.

The water-soluble films according to the present disclosure may include other optional additive ingredients including, but not limited to, plasticizers, surfactants, emulsifiers, fillers, extenders, antiblocking agents, detackifying agents, antifoams, film formers and other functional ingredients, for example in amounts suitable for their intended purpose.

Water is recognized as a very efficient plasticizer for PVA and other polymers; however, the volatility of water makes its utility limited since polymer films need to have at least some resistance (robustness) to a variety of ambient conditions including low and high relative humidity. Glycerin is much less volatile than water and has been well established as an effective plasticizer for PVA and other polymers. Glycerin or other such liquid plasticizers by themselves can cause surface "sweating" and greasiness if the level used in the film formulation is too high. This can lead to problems in a film such as unacceptable feel to the hand of the consumer and even blocking of the film on the roll or in stacks of sheets if the sweating is not mitigated in some manner, such as powdering of the surface. This could be characterized as over plasticization. However, if too little plasticizer is added to the film the film may lack sufficient ductility and flexibility for many end uses, for example to be converted into a final use format such as packets.

Plasticizers for use in water-soluble films of the present disclosure include, but are not limited to, sorbitol, glycerol, digylcerol, propylene glycol, ethylene glycol, diethyleneglycol, triethylene glycol, tetraethyleneglycol, polyethylene glycols up to MW 400, 2 methyl 1,3 propane diol, lactic acid, monoacetin, triacetin, triethyl citrate, 1,3-butanediol, trimethylolpropane (TMP), polyether triol, and combinations thereof. In some embodiments the plasticizer is selected from the group consisting of sorbitol, glycerol, digylcerol, propylene glycol, ethylene glycol, diethyleneglycol, triethylene glycol, tetraethyleneglycol, polyethylene glycols up to MW 400, and combinations of the foregoing. In some embodiments the plasticizer comprises glycerol. As less plasticizer is used, the film can become more brittle, whereas as more plasticizer is used the film can lose tensile strength. Plasticizers can be included in the water-soluble films in an amount in a range of about 25 phr to about 50 phr, or from about 30 phr to about 45 phr, or from about 32 phr to about 42 phr, for example.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing. Surfactants can be included in the water-soluble films in an amount of less than about 3 phr, for example less than about 2 phr, less than about 1 phr, or less than about 0.5 phr, for example.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339, which are proprietary, non-mineral oil defoamers. In embodiments, defoamers can be used in an amount of 0.5 phr, or less, for example, 0.05 phr, 0.04 phr, 0.03 phr, 0.02 phr, or 0.01 phr.

In some embodiments the water-soluble film can include one or more active agents. Suitable active agents include, but are not limited to cleaning products such as laundry cleaners, including but not limited to laundry detergent, stain removers, enzymes, fragrance, disinfectants, peroxide and other bleaching agents including but not limited to hypochlorites, hydroxides, chloramines, chloramines, chloramides, and chlorimides, and personal care/hygiene products, including but not limited to shampoo, skin cleansers, and teeth cleansers. Non-limiting examples of actives that can be used in the water-soluble films of the disclosure are disclosed in U.S. Pat. No. 8,809,250, herein incorporated by reference in its entirety.

One or more active agents can be included in the water-soluble films, and the one or more active agents can have more than one function. For example, peroxides and sodium hypochlorite can function both as a bleaching agent and as an antimicrobial agent. The active agents can be include do the water-soluble film in any suitable weight percent, for example from about 5 wt % to about 80 wt %, based on the total weight of the film.

Biodegradable Film

As defined above, the term "biodegradable" generally refers to a material that degrades from the action of naturally occurring microorganisms, including but not limited to bacteria, fungi, and algae; environmental heat; moisture; or other environmental factors, such as determined according to QUV Test or the Compostability Test, as described below. Suitable biodegradable film-forming resins for use in biodegradable films include water-soluble polymers and water-insoluble polymers. Suitable biodegradable polymers include, but are not limited to, aliphatic polyesters, poly (amino acids), copoly(ether-esters), polyalkylenes oxalates, polyamides, poly(iminocarbonates), polyorthoesters, polyoxaesters, polyamidoesters, polyoxaesters containing amine groups poly(anhydrides), polyphosphazenes, tyrosine derived polycarbonates, collagen, poly(alpha esters) such as poly(lactate acid) and polyglycolic acid, polyanhydrides, biopolymers and various mixtures thereof.

Suitable biodegradable film-forming resins can further include, but are not limited to, polyglactin, cellulose ether, cellulose, cellulosic ester, phenolic, poly-4-methylpentene, polyacrylonitrile, polyamide, polyamideimide, polyacrylate, polybenzoxazole, polycyanoarylether, polyester, polyestercarbonate, polyether, polyetheretherketone, polyetherimide, polyetherketone, polyethersulfone, polyethylene, polyfluoroolefin, polyimide, polyolefin, polyoxadiazole, polyphenylene oxide, polyphenylene sulfide, polypropylene, polystyrene, polycaprolactone, polysulfide, polysulfone, polythioether, polytriazole, polyurethane, polyvinyl (e.g., polyvinyl alcohol), polyvinylidene fluoride, regenerated cellulose, silicone, urea-formaldehyde, or copolymers or physical blends of these materials. In some embodiments, the biodegradable film-forming resin is selected from the group consisting of cellulose ether, cellulose, cellulosic ester, polyacrylate, polyvinyl alcohol and combinations of the foregoing. In some embodiments, the biodegradable film-forming resin comprises polyvinyl alcohol.

Examples of suitable biodegradable polyesters include, but are not limited to, aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aromatic polyesters and modified aromatic polyesters; and aliphatic-aromatic copolyesters. Further examples of suitable biodegradable polymers include, but are not limited to, polyethylensuccinate, polybutylensuccinate, polybutylensuccinate/adipate, polybutylensuccinate/carbonate, polybutylensuccinate/terephtalate, polycaprolactone, poly(hydroxyalcanoates), poly 3-hydroxybutyrate, polylactic acid, polyester amides, and/or blends of these materials with natural or modified starch, polysaccharides, lignin, wood flour, cellulose and chitin. In some embodiments, biodegradable polyester is selected from the group consisting of polylactic acid, polylactic acid copolymers, terpolymers based on polylactic acid, and combinations thereof.

Gas Barrier Films

In one class of embodiments the first water-soluble film or water-insoluble film can have provided on at least one side of the film a second water-soluble film. Advantageously, the second water-soluble film can have gas barrier properties. In one embodiment, a first water-soluble film having an oxygen activated degradation accelerator dispersed therein has a second water-soluble film provided on at least one side of the first-water soluble film such that when the water-soluble film is formed into a pouch wherein the at least one side having a second water-soluble film is the outer side of the pouch, the second water-soluble film provides an oxygen barrier thereby preventing premature degradation of the pouch due to premature exposure of the oxygen activated degradation accelerator to oxygen. As used herein, an "oxygen activated degradation accelerator" is intended to refer to any degradation accelerator that can accelerate degradation in the presence of oxygen, including but not limited to, chemical degradation accelerators, heat forming agents, oxidative degradation accelerators, and combinations thereof.

Examples of water-soluble, biodegradable films with gas barrier properties are described in U.S. Pat. No. 7,854,994, U.S. Patent Publication No. 2009/0136641, and International Patent Publication No. WO 2008/105705 all of which are herein incorporated by reference in their entirety.

Water-Insoluble Degradable Film

In one aspect of the disclosure, the film can be a water-insoluble degradable film. Water-insoluble degradable films are films that do not readily dissolve in water, but undergo degradation when exposed to one or more of a microorganism, e.g. bacteria, fungi, and algae; heat; moisture, including humidity; UV light; oxidants; chemicals; enzymes; or combinations of the foregoing. Suitable water-insoluble degradable film-forming resins include, but are not limited to polypropylene, polyisobutylene, polybut-1-ene, poly-4-methylpent-1-ene, polyvinylcyclohexane, polyisoprene, and polybutadiene, as well as polymers of cycloolefins, including but not limited to cyclopentene or norbornene, polyethylene (which optionally can be crosslinked), including but not limited to high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), and combinations of the foregoing. In some embodiments, the water-insoluble degradable film-forming resin is selected from the group consisting of polypropylene, polyethylene, and combinations thereof.

Additional suitable water-insoluble degradable film-forming resins include copolymers of monoolefins and diolefins with each other or with other vinyl monomers, including but not limited to ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

In embodiments, the water-insoluble degradable film may be a film comprising a blend of a water-soluble polymer film-forming resin and a water-insoluble film-forming resin or a water-soluble film-forming resin that has been cross-linked so as to be nonsoluble in water. In some embodiments a sufficient amount of starch or other biodegradable film-forming resin, for example polylactic acid, is included in the film such that the biodegradable film-forming resin is the continuous phase, or is at least 50% by weight based on the weight of the final film, or both. The biodegradable film-forming resin can be crosslinked so that it is not water-soluble. The biodegradable film-forming resin can be blended with a water-soluble polymer, such as PVA, to provide strength and solubility to the resulting film. Advantageously, such a blended film remains intact until it comes in contact with water (e.g., more than the water on a consumers hands, such as rain or wash-water) at which point the water-soluble film forming resin will solubilize leaving the cross-linked biodegradable film-forming resin structurally weak and readily biodegradable. Optionally, the blend of the water-soluble film and nonsoluble biodegradable film can have degradation accelerators or agents for delayed degradation dispersed therein or provided as a layer on the film.

In another embodiment, a water-soluble film can be crosslinked at only a surface, or otherwise surface-modified, to render it water-insoluble at that surface. Multiple surfaces of the film can be so treated. When the water-insoluble surface portion degrades or otherwise no longer provides an effective barrier to water, the water-soluble portion of the film is subject to attack by water.

Degradation Accelerators

The rate of the degradation of the films of the disclosure that include a degradation accelerator can be adjusted by changing the concentration of the degradation accelerator, i.e. if slower degradation is desired, less of the degradation accelerator is added. A degradation accelerator can be included in an amount effective to achieve the degradation times described herein. It will be understood that the selection of a particular degradation accelerator and a particular film ingredient will guide the selection of an appropriate amount of the degradation accelerator. For example, generally the degradation accelerator can be present in the film of the disclosure in an amount of 0.01 to 25%, or 0.01 to 5%, by weight relative to the weight of the total weight of the film. Other non-limiting example amounts are provided below for particular degradation accelerators. Optionally, the initiation of the film degradation can be delayed by including an agent for delayed degradation that is complementary to the degradation accelerator included in the film. Agents for delayed degradation are described below. As a non-limiting example, if the film of the disclosure includes an oxidative degradation accelerator, the degradation of the film can be delayed by including in the film an antioxidant.

Chemical Degradation Accelerators (Water/Oxygen Activated)

The chemical degradation accelerator is used to accelerate the rate at which a water-soluble or water-insoluble film degrades in the presence of water and/or oxygen. The chemical degradation accelerator is generally designed to release gas when exposed to water and/or oxygen, which in turn agitates a region of the film so as to cause acceleration in the degradation of the film. The chemical degradation accelerator can include one or more materials including, but not limited to, alkali metal carbonates (e.g. sodium carbonate, potassium carbonate, calcium carbonate, etc.), alkali metal hydrogen carbonates (e.g., sodium hydrogen carbonate, potassium hydrogen carbonate, etc.), ammonium carbonate, and combinations of the foregoing. Chemical degradation accelerators are described in U.S. Pat. No. 8,809,250, herein incorporated by reference in its entirety.

The chemical degradation accelerator, when used in a water-soluble or water-insoluble film generally comprises at least about 0.01 wt. % of the film optionally up to about 20 wt. % of the film, based on the total weight of the film. It will be recognized by one of ordinary skill in the art that the amount of chemical degradation accelerator dispersed in a film or provided on a film can be selected to control the rate at which degradation is accelerated.

Heat Forming Agents (Water/Oxygen Activated)

Heat forming agents generate heat in the presence of water and/or oxygen and thereby accelerate the rate at which the film degrades in the presence of water and/or oxygen. Non-limiting heat forming agents include electrolyte salts (e.g., aluminum chloride, calcium chloride, calcium sulfate, cupric chloride, cuprous chloride, ferric sulfate, magnesium chloride, magnesium sulfate, manganese chloride, manganese sulfate, potassium chloride, potassium sulfate, sodium acetate, sodium chloride, sodium carbonate, sodium sulfate, etc.), glycols (e.g., propylene glycol, dipropyleneglycol, etc.), lime (e.g., quick lime, slaked lime, etc.), metals (e.g., chromium, copper, iron, magnesium, manganese, etc.), metal oxides (e.g., aluminum oxide, iron oxide, etc.), polyalkyleneamine, polyalkyleneamine, polyvinyl amine, zeolites, glycerin, 1,3, propanediol, polysorbates esters (e.g., Tweens 20, 60, 85, 80), and/or poly glycerol esters (e.g., Noobe, Drewpol and Drewmulze from Stepan) and combinations of the foregoing. In some embodiments the heat forming agent will be selected from the group consisting of calcium chloride, calcium sulfate, potassium chloride, potassium sulfate, sodium acetate, sodium chloride, sodium carbonate, sodium sulfate, and combinations thereof. Heat forming agents are described in U.S. Pat. Nos. 8,809,250, 5,674,270 and U.S. Patent Publication No. 2008/0132438 all of which are herein incorporated by reference in their entireties.

The heat forming agent, when used in a water-soluble or water-insoluble film generally comprises at least about 2 wt. % of the film, optionally up to about 25 wt. % of the film, based on the total weight of the film. It will be recognized by one of ordinary skill in the art that the type of heat forming agent and/or concentration of heat forming agent dispersed in a film or provided on a film can be selected to generate a certain amount of heat.

Enzyme Accelerators

In certain embodiments, the degradation accelerator may comprise an enzyme. Suitable enzymes include those that can cleave the bonds of the film-forming resins that make up the films of the disclosure, thereby enhancing degradation. For example, to catalyze the hydrolysis of ester bonds linking the monomers of an ester-containing resin, an esterase can be included in the film, to catalyze the hydrolysis of glycosidic bonds linking cellulose, a cellulase can be included in the film, and to catalyze the hydrolysis of amide or amine bonds linking monomers an amidase or aminase can be included in the film. In embodiments wherein the film-forming resin comprises a starch or a modified starch, the enzyme accelerator can comprise an amylase. Suitable enzymes include enzymes categorized in the conventional Enzyme Commission (EC) categories, i.e., the hydrolases of EC 3 (which catalyze the hydrolysis of various bonds), the lyases of EC 4 (which cleave various bonds by means other than hydrolysis and oxidation).

Glycosylases

Glycosylases include glycosidases, i.e. enzymes hydrolyzing O- and S-glycosyl compounds, including but not limited to α-amylase, β-amylase, glucan 1,4-α-glucosidase, cellulase, endo-1,3(4)-β-glucanase, inulinase, endo-1,4-β-xylanase, oligo-1,6-glucosidase, dextranase, chitinase, polygalacturonase, lysozyme, exo-α-sialidase, α-glucosidase, β-glucosidase, α-galactosidase, β-galactosidase, α-mannosidase, β-mannosidase, β-fructofuranosidase, α,α-trehalase, β-glucuronidase, endo-1,3-β-xylanase, amylo-1,6-glucosidase, hyaluronoglucosaminidase, hyaluronoglucuronidase, xylan 1,4-β-xylosidase, β-D-fucosidase, glucan endo-1,3-β-D-glucosidase, α-L-rhamnosidase, pullulanase, GDP-glucosidase, β-L-rhamnosidase, fucoidanase, glucosylceramidase, galactosylceramidase, galactosylgalactosylglucosylceramidase, sucrose α-glucosidase, α-N-acetylgalactosaminidase, α-N-acetylglucosaminidase, α-L-fucosidase, β-L-N-acetylhexosaminidase, β-N-acetylgalactosaminidase, cyclomaltodextrinase, α-N-arabinofuranosidase, glucuronosyl-disulfoglucosamine glucuronidase, isopullulanase, glucan 1,3-β-glucosidase, glucan endo-1,3-α-glucosidase, glucan 1,4-α-maltotetraohydrolase, mycodextranase, glycosylceramidase, 1,2-α-L-fucosidase, 2,6-β-fructan 6-levanbiohydrolase, levanase, quercitrinase, galacturan 1,4-α-galacturonidase, isoamylase, glucan 1,6-α-glucosidase, glucan endo-1,2-β-glucosidase, xylan 1,3-β-xylosidase, licheninase, glucan 1,4-β-glucosidase, glucan endo-1,6-β-glucosidase, L-iduronidase, mannan 1,2-(1,3)-α-mannosidase, mannan endo-1,4-β-mannosidase, fructan β-fructosidase, β-agarase, exo-poly-α-galacturonosidase, κ-carrageenase, glucan 1,3-α-glucosidase, 6-phospho-β-galactosidase, 6-phospho-β-glucosidase, capsular-polysaccharide endo-1,3-α-galactosidase, β-L-arabinosidase, arabinogalactan endo-1,4-β-galactosidase, cellulose 1,4-β-cellobiosidase (non-reducing end), peptidoglycan β-N-acetylmuramidase, α,α-phosphotrehalase, glucan 1,6-α-isomaltosidase, dextran 1,6-α-isomaltotriosidase, mannosyl-glycoprotein endo-β-N-acetylglucosaminidase, endo-α-N-acetylgalactosaminidase, glucan 1,4-α-maltohexaosidase, arabinan endo-1,5-α-L-arabinanase, mannan 1,4-mannobiosidase, mannan endo-1,6-α-mannosidase, blood-group-substance endo-1,4-β-galactosidase, keratan-sulfate endo-1,4-β-galactosidase, stearyl-β-glucosidase, strictosidine β-glucosidase, mannosyl-oligosaccharide glucosidase, protein-glucosylgalactosylhydroxylysine glucosidase, lactase, endogalactosaminidase, 1,3-α-L-fucosidase, 2-deoxyglucosidase, mannosyl-oligosaccharide 1,2-α-mannosidase, mannosyl-oligosaccharide 1,3-1,6-α-mannosidase, branched-dextran exo-1,2-α-glucosidase, glucan 1,4-α-maltotriohydrolase, amygdalin β-glucosidase, prunasin β-glucosidase, vicianin β-glucosidase, oligoxyloglucan β-glycosidase, polymannuronate hydrolase, maltose-6'-phosphate glucosidase, endoglycosylceramidase, 3-deoxy-2-octulosonidase, raucaffricine β-glucosidase, coniferin β-glucosidase, 1,6-α-L-fucosidase, glycyrrhizinate β-glucuronidase, endo-α-sialidase, glycoprotein endo-α-1,2-mannosidase, xylan α-1,2-glucuronidase, chitosanase, glucan 1,4-α-maltohydrolase, difructose-anhydride synthase, neopullulanase, glucuronoarabinoxylan endo-1,4-β-xylanase, mannan exo-1,2-1,6-α-mannosidase, α-glucuronidase, lacto-N-biosidase, 4-α-D-{(1→4)-α-D-glucano}trehalose trehalohydrolase, limit dextrinase, poly (ADP-ribose) glycohydrolase, 3-deoxyoctulosonase, galactan 1,3-β-galactosidase, β-galactofuranosidase, thioglucosidase, β-primeverosidase, oligoxyloglucan reducing-end-specific cellobiohydrolase, xyloglucan-specific endo-β-1,4-glucanase, mannosylglycoprotein endo-β-mannosidase, fructan β-(2,1)-fructosidase, fructan β-(2,6)-fructosidase, xyloglucan-specific exo-β-1,4-glucanase, oligosaccharide reducing-end xylanase, τ-carrageenase, α-agarase, α-neoagaro-oligosaccharide hydrolase, β-apiosyl-β-glucosidase, λ-carrageenase, 1,6-α-D-mannosidase, galactan endo-1,6-β-galactosidase, exo-1,4-β-D-glucosaminidase, heparanase, baicalin-β-D-glucuronidase, hesperidin 6-O-α-L-rhamnosyl-β-D-glucosidase, protein O-GlcNAcase, mannosylglycerate hydrolase, rhamnogalacturonan hydrolase, unsaturated rhamnogalacturonyl hydrolase, rhamnogalacturonan galacturonohydrolase, rhamnogalacturonan rhamnohydrolase, β-D-glucopyranosyl abscisate β-glucosidase, cellulose 1,4-β-cellobiosidase (reducing end), α-D-xyloside xylohydrolase, and β-porphyranase.

Hydrolases

Hydrolases of EC 3 include, but are not limited to: those acting on ester bonds; glycosylases, those acting on ether bonds; those acting on peptide bonds (peptidases/proteases); those acting on carbon-nitrogen bonds, other than peptide bonds; those acting on acid anhydrides; those acting on carbon-carbon bonds; those acting on halide bonds; those acting on phosphorus-nitrogen bonds; those acting on sulfur-nitrogen bonds; those acting on carbon-phosphorus bonds; those acting on sulfur-sulfur bonds; and those acting on carbon-sulfur bonds.

The hydrolases of EC 3 which act on ester bonds, can include, but are not limited to, carboxylic ester hydrolases (for example lipases including triacylglycerol lipase, phospholipase $A_1$, phospholipase $A_2$, lysophospholipase, acylglycerol lipase, galactolipase, lipoprotein lipase; and phosphoric diester hydrolases including phospholipase C, phospholipase D, phosphoinositide phospholipase C, glycosylphosphatidylinositol phospholipase D, and N-acetylphosphatidylethanolamine-hydrolysing phospholipase D) and glycosylases, including glycosidases, i.e. enzymes hydrolysing O- and S-glycosyl compounds, for example amylases (including alpha-amylase, beta-amylase, and isoamylase), cellulases, and mannanases.

Suitable amylases (α and/or β) include those of bacterial or fungal origin. Chemically modified or protein engineered mutants are included. Amylases include, for example, α-amylases obtained from *Bacillus*, e.g., a special strain of *Bacillus licheniformis*, described in more detail in GB 1,296,839. Examples of useful amylases are the variants described in WO 94/02597, WO 94/18314, WO 96/23873, WO 97/43424, U.S. Pat. Nos. 5,824,532; 5,849,549; 6,297,037; 6,093,562; 6,297,038; 6,867,031; and US Publication Nos. 2002/0098996; 2003/0064908; 2004/0253676; 2005/0059131; 2005/0250664; 2006/0035323; 2009/0280527; 2010/0099597; 2010/0099598; and 2011/0177990, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444. Commercially available amylases are Duramyl™, Termamyl™, Fungamyl™, Natalase™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307; 5,648,263; 5,691,178; 5,776,757 and WO 89/09259. Especially suitable cellulases are the alkaline or neutral cellulases having color care benefits. Examples of such cellulases are cellulases described in EP 0 495 257, EP 0 531 372, WO 96/11262, WO 96/29397, WO 98/08940, U.S. Pat. Nos. 5,520,838; 5,443,750; 5,668,073; 5,948,672; 6,423,524; 5,919,691; 6,071,735; 6,001,639; 6,387,690; 6,855,531; 7,226,773; and US Publication Nos. 2001/0036910; 2003/0119167; 2003/0054539; 2005/0070003; 2008/0145912; and 2010/0107342. Other examples are cellulase variants such as those described in WO 94/07998, EP 0 531 315, WO 95/24471, WO 98/12307, PCT/DK98/00299, U.S. Pat. Nos. 5,457,046; 5,686,593; 5,763,254; 5,792,641; 6,114,296; 5,457,046; 5,912,157; 6,117,664; 7,993,898; 8,017,372; and US Publication Nos. 2003/0092097; 2005/0009166; 2008/0206836; 2009/0170747 and 2011/0250674. Commercially available cellulases include Celluzyme™, and Carezyme™ (Novozymes A/S), Clazinase™, and Puradax HA™ (Genencor International Inc.), and KAC-500(B)™ (Kao Corporation).

Peptidases/Proteases

The hydrolases of EC 3 which act on peptide bonds (peptidases/proteases) can include, but are not limited to aminopeptidases (including leucyl aminopeptidase, membrane alanyl aminopeptidase, cystinyl aminopeptidase, tripeptide aminopeptidase, prolyl aminopeptidase, arginyl aminopeptidase, glutamyl aminopeptidase, Xaa-Pro aminopeptidase, bacterial leucyl aminopeptidase, clostridial aminopeptidase, cytosol alanyl aminopeptidase, lysyl aminopeptidase, Xaa-Trp aminopeptidase, tryptophanyl aminopeptidase, methionyl aminopeptidase, D-stereo specific aminopeptidase, aminopeptidase Ey, aspartyl aminopeptidase, aminopeptidase I, PepB aminopeptidase, aminopeptidase S, beta-peptidyl aminopeptidase, and intermediate cleaving peptidase 55); dipeptidases (including Xaa-Arg dipeptidase, Xaa-methyl-His dipeptidase, Glu-Glu dipeptidase, Xaa-Pro dipeptidase, Met-Xaa dipeptidase, non-stereospecific dipeptidase, cytosol nonspecific dipeptidase, membrane dipeptidase, beta-Ala-His dipeptidase, dipeptidase E, and D-Ala-D-Ala dipeptidase); Dipeptidyl-peptidases and tripeptidyl-peptidases (including dipeptidyl-peptidase I, dipeptidyl-peptidase II, dipeptidyl-peptidase III, dipeptidyl-peptidase IV, dipeptidyl-dipeptidase, tripeptidyl-peptidase I, tripeptidyl-peptidase II, Xaa-Pro dipeptidyl-peptidase, and prolyl-tripeptidyl aminopeptidase); peptidyl-dipeptidases (including peptidyl-dipeptidase A, peptidyl-dipeptidase B, peptidyl-dipeptidase Dcp, and cyanophycinase); serine-type carboxypeptidases (including lysosomal Pro-Xaa carboxypeptidase, serine-type D-Ala-D-Ala carboxypeptidase, carboxypeptidase C, and carboxypeptidase D); metallocarboxypeptidases (including carboxypeptidase A, carboxypeptidase B, lysine carboxypeptidase, Gly-Xaa carboxypeptidase, alanine carboxypeptidase, muramoylpentapeptide carboxypeptidase, carboxypeptidase E, glutamate carboxypeptidase, carboxypeptidase M, muramoyltetrapeptide carboxypeptidase, zinc D-Ala-D-Ala carboxypeptidase, carboxypeptidase A2, membrane Pro-Xaa carboxypeptidase, tubulinyl-Tyr carboxypeptidase, carboxypeptidase T, carboxypeptidase Taq, carboxypeptidase U, glutamate carboxypeptidase II, metallocarboxypeptidase D, and angiotensin-converting enzyme 2); cysteine-type carboxypeptidases, including cathepsin X; omega peptidases (including acylaminoacyl-peptidase, peptidyl-glycinamidase, pyroglutamyl-peptidase I, beta-aspartyl-peptidase, pyroglutamyl-peptidase II, N-formylmethionyl-peptidase, gamma-glutamyl hydrolase, gamma-D-glutamyl-meso-diaminopimelate peptidase I, and ubiquitinyl hydrolase 1); serine endopeptidases (including chymotrypsin, chymotrypsin C, metridin, trypsin, thrombin, coagulation factor Xa, plasmin, enteropeptidase, acrosin, alpha-Lytic endopeptidase, glutamyl endopeptidase, cathepsin G, coagulation factor VIIa, coagulation factor IXa, cucumisin, prolyl oligopeptidase, coagulation factor XIa, brachyuran, plasma kallikrein, tissue kallikrein, pancreatic elastase, leukocyte elastase, coagulation factor XIIa, chymase, complement subcomponent $\overline{C^{1r}}$, complement subcomponent $\overline{C^{1s}}$, classical-complement-pathway C3/C5 convertase, complement factor I, complement factor D, alternative-complement-pathway C3/C5 convertase, cerevisin, hypodermin C, lysyl endopeptidase, endopeptidase La, gamma-renin, venombin AB, leucyl endopeptidase, tryptase, scutellarin, kexin, subtilisin, oryzin, peptidase K, thermomycolin, thermitase, endopeptidase So, t-plasminogen activator, protein C (activated), pancreatic endopeptidase E, pancreatic elastase II, IgA-specific serine endopeptidase, u-plasminogen activator, venombin A, furin, myeloblastin, semenogelase, granzyme A, granzyme B, streptogrisin A, streptogrisin B, glutamyl endopeptidase II oligopeptidase B, limulus clotting factor $\overline{C}$, limulus clotting factor $\overline{B}$, limulus clotting enzyme, repressor LexA, signal peptidase I, togavirin, flavivirin, endopeptidase Clp, proprotein convertase 1, proprotein convertase 2, snake venom factor V activator, lactocepin, assemblin, hepacivirin, spermosin, sedolisin, xanthomonalisin, C-terminal processing peptidase, physarolisin, mannan-binding lectin-associated serine protease-2, rhomboid protease, hepsin, peptidase Do, HtrA2 peptidase, matriptase, C5a peptidase, aqualysin 1, site-1 protease, pestivirus NS3 polyprotein peptidase, equine arterivirus serine peptidase, infectious pancreatic necrosis birnavirus Vp4 peptidase, SpoIVB peptidase, stratum corneum chymotryptic enzyme, kallikrein 8, kallikrein 13, and oviductin); cysteine endopeptidases (including cathepsin B, papain, ficain, chymopapain, asclepain, clostripain, streptopain, actinidain, cathepsin L, cathepsin H, cathepsin T, glycyl endopeptidase, cancer procoagulant, cathepsin S, picornain 3C, picornain 2A, caricain, ananain, stem bromelain, fruit bromelain, legumain, histolysain, caspase-1, gingipain R, cathepsin K, adenain, bleomycin hydrolase, cathepsin F, cathepsin V, cathepsin O, nuclear-inclusion-a endopeptidase, helper-component proteinase, L-peptidase, gingipain K, staphopain, separase, V-cath endopeptidase, cruzipain, calpain-1, calpain-2, calpain-3, caspase-2, caspase-3, caspase-4, caspase-5, caspase-6, caspase-7, caspase-8, caspase-9, caspase-10, caspase-11, peptidase 1 (mite), calicivirin, zingipain, Ulp1 peptidase, SARS coronavirus main proteinase, sortase A, and sortase B); aspartic endopeptidases (including pepsin A, pepsin B, gastricsin, chymosin, cathepsin D, nepenthesin, renin, HIV-1 retropepsin, Pro-opiomelanocortin converting enzyme, aspergillopepsin I, aspergillopepsin II, penicillopepsin, rhizopuspepsin, endothiapepsin, mucorpepsin, candidapep sin, saccharopepsin, rhodotorulapepsin, acrocylindropepsin, polyporopepsin, pycnoporopepsin, scytalidopepsin A, scytalidopepsin B, cathepsin E, barrierpepsin, signal peptidase II, plasmepsin I, plasmepsin II, phytepsin, yapsin 1, thermopsin, prepilin peptidase, nodavirus endopeptidase, memapsin 1, memapsin 2, HIV-2 retropepsin, plasminogen activator Pla, omptin, human endogenous retrovirus K endopeptidase, and HycI peptidase); metalloendopeptidases (including atrolysin A, microbial collagenase, leucolysin, interstitial collagenase, neprilysin, envelysin, IgA-specific metalloendopeptidase, procollagen N-endopeptidase, thimet oligopeptidase, neurolysin, stromelysin 1, meprin A, procollagen C-endopeptidase, peptidyl-Lys metalloendopeptidase, astacin, stromelysin 2, matrilysin, gelatinase A, vibriolysin, pseudolysin, thermolysin, bacillolysin, aureolysin, coccolysin, mycolysin, β-lytic metalloendopeptidase, peptidyl-Asp metalloendopeptidase, neutrophil collagenase, gelatinase B, leishmanolysin, saccharolysin, gametolysin, deuterolysin, serralysin, atrolysin B, atrolysin C, atroxase, atrolysin E, atrolysin F, adamalysin, horrilysin, ruberlysin, bothropasin, bothrolysin, ophiolysin, trimerelysin I, trimerelysin II, mucrolysin, pitrilysin, insulysin, O-sialoglycoprotein endopeptidase, russellysin, mitochondrial intermediate peptidase, dactylysin, nardilysin, magnolysin, meprin B, mitochondrial processing peptidase, macrophage elastase, choriolysin L, choriolysin H, tentoxilysin, bontoxilysin, oligopeptidase A, endothelin-converting enzyme, fibrolase, jararhagin, fragilysin, lysostaphin, flavastacin, snapalysin, gpr endopeptidase, pappalysin-1, membrane-type matrix metalloproteinase-1, ADAM10 endopeptidase, ADAMTS-4 endopeptidase, anthrax lethal factor endopeptidase, Ste24 endopeptidase, S2P endopeptidase, ADAM 17 endopeptidase, and ADAMTS13 endopeptidase); and threonine endopeptidases (including proteasome endopeptidase complex and HslU-HslV peptidase).

Suitable proteases include those of animal, vegetable or microbial origin. Microbial origin is preferred. Chemically modified or protein engineered mutants are included. The protease may be a serine protease or a metalloprotease, preferably an alkaline microbial protease or a trypsin-like protease. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279, U.S. Pat. Nos. 6,506,589; 6,808,913; 6,835,821; and US Publication Nos. 2003/0148495; 2003/0175933; 2003/0186378 and 2005/0003986). Examples of trypsin-like proteases are trypsin (e.g., of porcine or bovine origin) and the *Fusarium* protease described in WO 89/06270, WO 94/25583, and U.S. Pat. Nos. 5,288,627 and 5,693,520. Examples of useful proteases are the variants described in WO 92/19729, WO 98/20115, WO 98/20116, WO 98/34946, and U.S. Pat. Nos. 5,858,757; 6,300,116; 7,098,017; 6,159,731; and US Publication No. 2002/0102702, especially the variants with substitutions in one or more of the following positions: 27, 36, 57, 76, 87, 97, 101, 104, 120, 123, 167, 170, 194, 206, 218, 222, 224, 235, and 274. Preferred commercially available protease enzymes include Alcalase™, Savinase™, Primase™, Duralase™ Esperase™, and Kannase™ (Novozymes A/S), Maxatase™, Maxacal™, Maxapem™ Properase™, Purafect™, Purafect OxP™, FN2™, and FN3™ (Genencor International Inc.)

It is contemplated that an enzyme for use as a degradation accelerator described herein can come from any suitable source or combination of sources, for example bacterial, fungal, plant, or animal sources. In one type of embodiment, a mixture of two or more enzymes will come from at least two different types of sources.

Enzyme degradation accelerators, when dispersed in or provided on a water-soluble or water-insoluble film generally comprises at least about 0.1 wt. % of the film, optionally up to about 20 wt. % of the film, based on the total weight of the film. It will be recognized by one of ordinary skill in the art that the amount of enzyme degradation accelerator dispersed in a film or provided on a film can be selected to control the rate at which degradation is accelerated.

UV Degradation Accelerators

UV degradation accelerators are materials that promote degradation of the polymer material in the presence of UV light. In one class of embodiments, UV degradation accelerators will include, for example, aromatic photosensitizers. Suitable aromatic photosensitizers include, but are not limited to, anthraquinone, benzophenone, derivatives of the foregoing, and combinations of the foregoing.

UV degradation accelerators, when dispersed in a water-soluble or water-insoluble film generally comprises at least about 0.1 wt. % of the film, optionally up to about 20 wt. % of the film, based on the total weight of the film. It will be recognized by one of ordinary skill in the art that the amount of UV degradation accelerator dispersed in a film or provided on a film can be selected to control the rate at which degradation is accelerated.

Oxidative Degradation Accelerators

Oxidative degradation accelerators are materials that promote oxidation reactions along the carbon-carbon bonds of a polymer chain, thereby promoting degradation of the film material. In one class of embodiments, oxidative degradation accelerators may include metals. Polyolefin oxidation, for example is catalyzed by the redox-cycle of polyvalent metal ions. Suitable metals for use as metal catalysts include, but are not limited to transition metals, including but not limited to, iron, cobalt, manganese, zinc, cerium, nickel, copper, platinum, rhodium, ruthenium, silver, osmium, gold and iridium. In some embodiments, the metal for use as a metal catalyst is selected from the group consisting of iron, gold, platinum, and combinations thereof. The metal that accelerates degradation can be of any suitable oxidation state. In embodiments, oxidative degradation accelerators include peroxides and oxides, including, but not limited to hydrogen peroxide, molecular oxygen, $ClO^-$, $HNO_3$, $KMnO_4$, $K_2CrO_4$, $K_2Cr_2O_7$, $Ce(SO_4)_2$, $K_2S_2O_8$, $KIO_3$, ozone, peroxides and any combinations of the foregoing.

In embodiments, oxidative degradation accelerators will include auto-oxidative susceptible additives that can be added to the film-forming resin. Auto-oxidative susceptible additives are compounds that have at least one hydrogen bonded to a carbon atom having an auto-oxidative susceptibility greater than that of a hydrogen bonded to a normal secondary carbon atom. Auto-oxidative susceptible additives include polyalkylene oxides, polyunsaturated hydrocarbons, derivatives of aliphatic and cycloaliphatic compounds containing one or more allylic hydrogens, including but not limited to, myrcene, ocimene, limonene (dipentene), cyclohexadiene, dicyclopentadiene, decahydronaphthalene, indene, tetrahydroindene, and ethylidenenorbornene, unsaturated fatty acids, including but not limited to, eleostearic acid, linolenic acid, linoleic acid, oleic acid, crotonic and sorbic acid as well as adducts of these and other unsaturated aliphatic and alicyclic compounds, including but not limited to, maleic acid, acrylic acid, and acrolein, compounds with highly reactive benzylic hydrogens, including but not limited to, cumene, and para-isopropylbenzoic acid, and combinations of the foregoing. Examples of oxidative degradation accelerators are provided in U.S. Pat. No. 4,067,836, herein incorporated by reference in its entirety.

Oxidative degradation accelerators, when dispersed in or provided on a water-soluble or water-insoluble film generally comprises at least about 0.1 wt. % of the film, optionally up to about 20 wt. % of the film, based on the total weight of the film. It will be recognized by one of ordinary skill in the art that the amount of oxidative degradation accelerator dispersed in a film or provided on a film can be selected to control the rate at which degradation is accelerated.

Microorganism Degradation Accelerators

Microorganism degradation accelerators are microorganisms that promote degradation of the film material. Suitable microorganisms include but are not limited to aerobic, heterotrophic or anaerobic bacteria. In embodiments, the microorganisms can be PVA degradation organisms, including but not limited to, *Arthrobacter ilicis, Bacillus amyloliquefaciens, Bacillus pumilus* GC subgroup B, *Bacillus subtilis, Brevibacterium mcbrellneri, Comamonas testosterone, Flavobacterium resinovorum, Kocuria kristinae, Microbacterium liquefaciens, Micrococcus luteus* GC subgroup C, *Pseudomonas balearica, Pseudomonas chlororaphis,*

*Pseudomonas putida* biotype A, *Pseudomonas pseudoalcaligenes, Rhodococcus equi* GC subgroup B, and combinations of the foregoing. Organisms may be purchased from the American Type Culture Collection, 12301 Parklawn Drive, Rickville, Md. 20852 (http://www.atcc.org). Examples of microorganism degradation accelerators can be found in U.S. Pat. No. 7,147,787, herein incorporated by reference in its entirety.

Microorganism degradation accelerators, when dispersed in a water-soluble or water-insoluble film generally comprises at least about 0.1 wt. % of the film, optionally up to about 20 wt. % of the film, based on the total weight of the film. It will be recognized by one of ordinary skill in the art that the amount of microorganism degradation accelerator dispersed in a film or provided on a film can be selected to control the rate at which degradation is accelerated.

Humidity Degradation Accelerators

Humidity degradation accelerators are materials that promote degradation of the polymer material in the presence of humidity. In embodiments, humidity degradation accelerators include, but are not limited to, compounds that when in contact with humidity react with the water in order to liberate an active auxiliary prodegradant species. Advantageously, humidity degradation accelerators of the disclosure are thermoprocessable in a temperature range between 100° C. and 300° C. Suitable humidity degradation accelerators include inorganic peroxides and superoxides, including but not limited to alkali metal, alkaline earth metal, and/or transition meal peroxides or superoxides. Suitable examples include, but are not limited to, magnesium peroxide ($MgO_2$), calcium peroxide ($CaO_2$), strontium peroxide ($SrO_2$), barium peroxide ($BaO_2$), lithium peroxide ($Li_2O_2$), sodium peroxide ($Na_2O_2$), potassium peroxide ($K_2O_2$), zinc peroxide ($ZnO_2$), silver peroxide ($Ag_2O_2$), copper peroxide, iron peroxide, lithium superoxide ($LiO_2$), sodium superoxide ($NaO_2$), potassium superoxide ($KO_2$), rubidium superoxide ($RbO_2$) and cesium superoxide ($CsO_2$). In some embodiments, the humidity degradation accelerator is selected from the group consisting of magnesium peroxide, calcium peroxide, sodium peroxide, potassium peroxide, sodium superoxide, potassium superoxide, and combinations of the foregoing. A comprehensive summary of inorganic peroxides or superoxides, which are useful for the present invention, is given in Kirk-Othmer, Encyclopedia of Chemical Technology, John Wiley & Sons, 4. ed. (1994), Vol. 18, pages 202-229, which is incorporated by reference herein. Blends of the abovementioned peroxides and/or superoxides can also be used. Examples of UV absorbers and light stabilizers can be found in U.S. Patent Publication No. 2010/0222454, herein incorporated by reference in its entirety.

Humidity degradation accelerators, when dispersed in a water-soluble or water-insoluble film generally comprises at least about 0.1 wt. % of the film, optionally up to about 20 wt. % of the film, based on the total weight of the film. It will be recognized by one of ordinary skill in the art that the amount of humidity degradation accelerator dispersed in a film or provided on a film can be selected to control the rate at which degradation is accelerated.

Agents for Delayed Degradation

As mentioned above, agents for delayed degradation can delay the degradation of a water-soluble or water-insoluble film in the presence of a complementary degradation accelerator. Generally, if an agent for delayed degradation is included in a film of the disclosure, the agent for delayed degradation may be included in the water-soluble or water-insoluble film in amounts to stabilize the film during film processing, pouch or packet forming, and shipping the pouch or packet to a merchant. Generally the agent for delayed degradation is included in an amount to inhibit degradation prior to the point of sale to the consumer, e.g. for up to one month, two months, three months, four months, five months, six months, or one year in various embodiments.

Antioxidants

An antioxidant is a material that opposes oxidation or inhibits reactions promoted by oxygen or peroxides. Antioxidants can delay the degradation of a film that includes an oxygen activated degradation accelerator. It will be recognized by one of ordinary skill in the art that the amount of antioxidant included in film can be selected to stabilize the film such that degradation will be activated by consumer handling.

Antioxidants can include, but are not limited to, sterically hindered phenols, aryl amines, thioureas, thiocarbamates, phosphites, thioether esters, and combinations of the foregoing. autoSuitalbe examples of antioxidants include, but are not limited to, alkylated monophenols, including but not limited to, 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1-yl)phenol and mixtures thereof, alkylthiomethylphenols, including but not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, hydroquinones and alkylated hydroquinones, including but not limited to, 2,6-di-tert-butyl-4-methoxyphenol, 2,5 di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, tocopherols, including but not limited to, α-tocopherol, β-tocopherol, γ-tocopherol, δ-tocopherol and mixtures thereof (vitamin E), hydroxylated thiodiphenyl ethers, including but not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis (2,6-dimethyl-4-hydroxyphenyl)-disulfide, alkylidenebisphenols, including but not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis (4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)

butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane, O-, N- and S-benzyl compounds, including but not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate, hydroxybenzylated malonates, including but not limited to, dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, aromatic hydroxybenzyl compounds, including but not limited to, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, triazine compounds, including but not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)iso-cyanurate, benzylphosphonates, including but not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, acylaminophenols, including but not limited to, 4-hydroxylauranilide, 4-hydroxystearanilide, octyl N-(3,5-di-tert-butyl-4-hydroxyphenyl)carbamate, esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane, esters of 6-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycal, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, amides of 6-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal), ascorbic acid (vitamin C), aminic antioxidants, including but not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, including but not limited to, p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-di-aminobut-2-ene, and combinations of the foregoing. Examples of antioxidants can be found in U.S. Patent Publication No. 2010/0222454 and U.S. Pat. No. 4,067,836 both of which are herein incorporated by reference in their entirety.

UV Absorbers and Light Stabilizers

UV absorbers and light stabilizers are antioxidants that are specifically useful in retarding actinic degradation of films. It will be recognized by one of ordinary skill in the art that the amount of UV absorber and/or light stabilizer included in film can be selected to stabilize the film to any included UV degradation accelerator up to the point of purchase by the consumer, such that degradation will be activated by consumer handling. In one type of embodiment, a UV absorber and/or light stabilizer can be disposed preferentially at the outside of the film packet, such that tearing open the film packet exposes at least a portion of the film that includes less or no UV absorber and/or light stabilizer.

Suitable examples of UV absorbers and light stabilizers include, but are not limited to, 2-(2'-Hydroxyphenyl)benzotriazoles, including but not limited to, 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol], 2-Hydroxybenzophenones, including but not limited to, the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives, esters of substituted and unsubstituted benzoic acids, including but not limited to, 4-tert-butyl-phenyl salicylate, phenyl salicylate, octylphenyl salicylate, dibenzoyl resorcinol, bis (4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, acrylates, including but not limited to, ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-(β-cyanovinyl)-2-methylindoline, neopentyl tetra(α-cyano-β,β-diphenylacrylate, nickel compounds, including but not limited to, nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands, sterically hindered amines, including but not limited to, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyphexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly [methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydrooxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6- tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine, oxamides, including but not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, 2-(2-Hydroxyphenyl)-1,3,5-triazines, including but not limited to, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tri-decyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, and combinations of the foregoing. Examples of UV absorbers and light stabilizers can be found in U.S. Patent Publication No. 2010/0222454 and U.S. Pat. No. 3,984,940, both of which are herein incorporated by reference in their entirety. Inorganic pigments, including but not limited to, titanium dioxide, zinc oxide, silica, aluminum silicate, acidic carbon black, and combinations of the foregoing can also be used as light stabilizer Degradation Enhancing Film Components Accelerated degradation can be promoted in the films disclosed herein by including degradation enhancing film components. Accelerated degradation has been found to take place in a biodegradable plastic when the plastic contains a) finely distributed particles of a biodegradable, water-soluble, organic component and b) finely distributed particles of a water-soluble inorganic component comprising nitrogen, phosphorus, and/or sulfer, promoting the growth of organic microorganisms. As disclosed in U.S. Patent Publication 2011/0197642, herein incorporated by reference in its entirety, it is believed that upon contacting the plastic with water, component a) dissolves thereby forming a cavity network in the plastic from which microorganisms can simultaneously attack the surrounding polymer matrix from the outside and the inside and component b) promotes the microbiological growth thereby accelerating biodegradation owing to the growth of microorganisms. Component a) can include, but is not limited to, water-soluble saccharides and water-soluble organic acids including, but not limited to, saccharose, glucose, maltose, lactose, oxalic acid, malonic acid, glutaric acid, adipic acid, hydroxycarboxylic acids, including but not limited to lactic acid, malic acid, tartaric acid, citric acid, and ascorbic acid, amino carboxylic acids, and combinations of the foregoing. Component b) can include, but is not limited to, salts containing Cl, K, Mg, Ca and/or Fe. Suitable salts can include, but are not limited to, $Na(NH_4)_2PO_4$, $NaH_2PO_4$, $Na_2SO_4$, $(NH_4)_2SO_4$, $NH_4NO_3$, $NaNO_3$, $MgSO_4$, $KH_2PO_4$, $FeSO_4$, $NH_4Cl$, water-soluble salts of phosphoric acid, including but not limited to, ammonium orthophosphate $((NH_4)_3PO_4.3H_2O)$, diammonium hydrogen orthophosphate $((NH_4)_2HPO_4.3H_2O)$, ammonium dihydrogen orthophosphate $((NH_4)H_2PO_4.3H_2O)$, sodium orthophosphate $(Na_3PO_4.12H_2O)$, sodium orthophosphate $(Na_3PO_4.10H_2O)$, disodium hydrogen phosphate $(Na_2HPO_4.2H_2O)$, disodium hydrogen phosphate $(Na_2HPO_4.12H_2O)$, sodium hydrogen phosphate $(NaH_2PO_4.2H_2O)$, sodium pyrophosphate $(Na_2H_2P_2O_7.6H_2O)$, sodium ammonium hydrogen phosphate $(NaH(NH_4)PO_4.4H_2O)$, potassium tetrametaphosphate $((KPO_3)_4.2H_2O)$, potassium orthophosphate $(K_3PO_4)$, potassium dihydrogen phosphate $(KH_2PO_4)$, potassium monohydrogen phosphate $(K_2HPO_4)$, potassium pyrophosphate $(K_4P_2O_7.3H_2O)$, potassium subphosphate $(K_2PO_3.4H_2O)$ and combinations of the foregoing. In some embodiments, the salt for component b) is selected from the group consisting of sodium salts, calcium salts, magnesium salts, and combinations thereof.

Encapsulation Material

In one class of embodiments the degradation accelerator is encapsulated, allowing for the controlled release of the degradation accelerator. Suitable microcapsules can include or be made from one or more of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, zein, and combinations thereof. In embodiments, the microcapsules include or are made from materials selected from the group consisting of starch, cellulose, cellulose derivatives, and combinations thereof. In some embodiments, the microcapsules include or are made from materials selected from the group consisting of carboxymethylcellulose, hydroxyethylcellulose, methylcellulose, and combinations thereof. In one type of embodiment, the microcapsule is characterized by a mean particle size of at least about 0.1 micron, or a mean particle size in a range of about 0.1 micron to about 200 microns, for example. In alternate embodiments, the microcapsules can form agglomerates of individual particles, for example wherein the individual particles have a mean particle size of at least about 0.1 micron, or a mean particle size in a range of about 0.1 micron to about 200 microns.

Examples of microcapsules that may form agglomerates include, but are not limited to, melamine formaldehyde, polyurethane, urea formaldehyde, chitosan, polymethyl methacrylate, polystyrene, polysulfone, polytetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly(ethylenevinyl acetate), cellulose nitrate, silicones, poly(lactidoco-glycolide), paraffin, carnauba, spermaceti, beeswax, stearic acid, stearyl alcohol, glyceryl stearates, shellac, cellulose acetate phthalate, and zein.

Mechanisms for the controlled release of the degradation accelerator from the microcapsule can include one or more of mechanical rupture, dissolution, ablation release, biodegradation, melting, pH-activated release, and humidity-activated release.

Suitable microcapsules for use in a mechanical rupture mechanism can include one or more of the group including, but not limited to, melamine formaldehyde, polyurethane, urea formaldehyde, polymethyl methacrylate, and polytetrahydrofuran.

Suitable microcapsules for use in embodiments that include a dissolution release mechanism can include one or more of the group including, but not limited to, gelatin, gum arabic, starch, malodextrins, polyvinylpyrrolidone, carboxymethylcellulose, hydroxyethylcellulose, methylcellulose, arabinogalactan, polyvinyl alcohol, and polyacrylic acid.

Suitable microcapsules for use in embodiments that include an ablation release mechanism can include one or more of the group including, but not limited to, ethylcellulose, polyethylene, polymethacrylate, polyamide, poly (ethylenevinyl acetate), cellulose nitrate, silicones, and poly (lactideco-glycolide).

Suitable microcapsules for use in embodiments that include a biodegradation release mechanism can include one or more of the group including, but not limited to, mono- and co-polyesters of the lactic, glycolic, and β-hydroxybutyric acids, as well as δ-valerolactone and ε-caprolactones. Examples of microcapsules that utilize a biodegradation release mechanism can be found in U.S. Pat. No. 5,648,096, herein incorporated by reference in its entirety.

Suitable microcapsules for use in embodiments that include a melt release mechanism can include one or more of the group including, but not limited to, polystyrene, polysulfone paraffin, carnauba, spermaceti, beeswax, stearic acid, stearyl alcohol, and glyceryl stearates.

Suitable microcapsules for use in embodiments that include a pH-activated release mechanism can include one or more of the group including, but not limited to, shellac, cellulose acetate phthalate, zein, and chitosan. Polymers with pH-activated dissolution are described in U.S. Patent Application Publication 2010/0105821-A1, herein incorporated by reference in its entirety.

Suitable microcapsules for use in embodiments that include a humidity-activated release mechanism can include on or more of the group including, but not limited to, cyclodextrin, gum arabic, gelatins, hemicelluloses, microbially produced polysaccharides, modified starches, and combinations of the foregoing. Hygroscopic water-soluble film forming agents for humidity-activated release microcapsules are described in US 2006/0013884, herein incorporated by reference in its entirety.

In some embodiments, microcapsules comprising degradation accelerators are dispersed within the water-soluble or water-insoluble film. In other embodiments, microcapsule comprising degradation accelerators are provided, for example, by forming a coating, on at least one surface of the water-soluble or water-insoluble film.

In some embodiments, in use the microcapsule will be mechanically ruptured thereby releasing the degradation accelerator. Suitable degradation accelerators to be released via mechanical rupture include, but are not limited to, chemical degradation accelerators, heat forming agents, enzymes, humidity degradation accelerators and microorganisms. In this embodiment, the degradation accelerator will not be activated until the point of purchase, upon which handling by the consumer will mechanically rupture some of the microcapsules, thereby activating the degradation accelerator.

In alternative embodiments, in use the degradation accelerator will be released from the microcapsule by dissolution of the microcapsule. Suitable degradation accelerators to be released upon microcapsule dissolution include, but are not limited to, chemical degradation accelerators, UV degradation accelerators, oxidative degradation accelerators, microorganisms, enzymes, and humidity degradation accelerators. In these embodiments, upon dissolution of the microcapsule, the degradation accelerator is released from the microcapsule and can act upon the film.

Embodiments may comprise an ablation or erosion mechanism for the release of degradation accelerators from the microcapsules. Suitable degradation accelerators to be released upon ablation of the microcapsules include, but are not limited to enzymes, UV degradation accelerators and microorganisms. In these embodiments, upon ablation, the microcapsule will release the degradation accelerator allowing it to activate and being degrading the film.

In alternative embodiments, the degradation accelerator will be released upon biodegradation of the microcapsule. Suitable degradation accelerators for use in a biodegradable microcapsule include, but are not limited to, chemical degradation accelerators, heat forming agents, enzymes, UV degradation accelerators, oxidative degradation accelerators, microorganisms, and humidity degradation accelerators.

In some embodiments, the microcapsules will release the degradation accelerator upon melting. Suitable degradation accelerators to be released when the microcapsule melts include, but are not limited to, chemical degradation accelerators, heat forming agents, UV degradation accelerators, and oxidative degradation accelerators. In one embodiment, the degradation accelerator may comprise an oxidative degradation accelerator. During the lifetime of the pouch or packet, the microcapsules would not release the oxidative degradation accelerator until the pouch or packet was heated to a temperature not encountered unless in direct sunlight (e.g. greater than 40° C. or greater than 50° C., or greater than 55° C., or greater than 60° C.).

In another type of embodiment, the microcapsule will release the degradation accelerator upon dry brittle failure. Suitable degradation accelerators for a pH activated release may include, but are not limited to, UV degradation accelerators, oxidative degradation accelerators, chemical degradation accelerators and heat forming agents. For example, in one embodiment the degradation accelerator can include a UV degradation accelerator. During the lifetime of the pouch or packet, the microcapsules would not be released until the capsules were dried sufficiently to become brittle and crack, thus releasing their contents. For example, the microcapsules can be designed to become brittle at a critical relative humidity significantly below standard household conditions, e.g. ≤40%, or <40%, or ≤35%, or <35%, or ≤30%, or <30%, or ≤25%, or <25%.

Embodiments may comprise pH activated release of the degradation accelerator from the microcapsule. Suitable degradation accelerator for a pH activated release may include, but are not limited to, chemical degradation accelerators, heat forming agents, UV degradation accelerators, oxidative degradation accelerators and humidity degradation accelerators. In one embodiment the composition enclosed in the water-soluble packet may comprise a laundry detergent composition, and the degradation accelerator may comprise an oxidative degradation accelerator. The packet, when dipped in wash water would release the detergent composition. When the packet was then further exposed to water in the absence of detergent (e.g., rain water), the degradation accelerator would be released from the microcapsule.

Embodiments may comprise humidity activated release of the degradation accelerator from the microcapsule. Suitable degradation accelerators for a humidity activated release may include, but are not limited to, chemical degradation accelerators, heat forming agents, enzymes, UV degradation accelerators, oxidative degradation accelerators, microorganisms, and humidity degradation accelerators. In one embodiment, the humidity activated release microcapsule may contain oxidative degradation accelerators, and the microcapsules may be provided on an inner layer of a water-insoluble film that forms at least one wall of a water-insoluble pouch or packet. Upon opening the pouch or packet and emptying the contents, the humidity activated release microcapsule is exposed to a change in humidity, the oxidative degradation accelerator is released from the microcapsule.

Printable Film

In embodiments of the disclosure a printable material can be adhered to at least one surface of the water-soluble film and/or water-insoluble film. As used herein, "printable material" refers to inks and coloring agents, as well as over print varnish, gels, liquids, powders, microcapsules and other functional materials. In some embodiments, the printable material will be a photo-sensitive ink. As used herein, "photo-sensitive ink" refers to an ink that, when exposed to ultraviolet radiation such as sunlight, fades away. A water-soluble or water-insoluble film described herein may have a photo-sensitive ink adhered to at least one surface thereof such that the photo-sensitive ink will fade away after being exposed to sunlight for a time in the range of about 2 weeks to about 6 months. In some embodiments, the image will not fade for at least 24 hours, at least 48 hours, or at least 72 hours, but loss of the image will begin before at most 96 hours. Fading of printable material can be determined using ASTM E1347 (Standard Test Method for Color and Color-difference Measurement by Tristimulus Colorimetry), for example. As a non-limiting example, soy-based inks degrade faster than petroleum-based inks. In some embodiments, the photo-sensitive ink will advantageously also be a photo-degradable ink and upon exposure to ultraviolet radiation will accelerate degradation of the water-soluble or water-insoluble film to which the ink is adhered.

In embodiments, the printable material may be a water-soluble ink. Suitable water-soluble inks, include but are not limited to, inks known under the trade reference SunChemical Aquadestruct, sold by SunChemical, New Jersey, US, and inks of corresponding characteristics. Other suitable inks include but are not limited to those known under the trade name Aqua Poly Super Opaque White QW000046, Film III Opaque White FR EC007094, Stable Flex ES Opaque White SFX02700, Plus 0700 Pro Plus Opaque White Plus 0700 all sold by Environmental Inks and Opta Film OPQ White W0L009656 sold by Water Ink Technologies Incorporated and inks of corresponding characteristics.

The printable material may comprise functional material to be printed onto the water-soluble or water-insoluble film. The functional material may be in solid, gel or liquid form or a solid suspended in a gel or liquid. The functional material is preferably selected from the group consisting of degradation accelerators, agents to delay degradation, and combinations thereof, wherein the degradation accelerators and agents to delay degradation can optionally be encapsulated in microcapsules as described herein. The printable material comprising functional material may require a water-soluble film coating to ensure adhesion to the film and reduce rub off. The purpose of the functional materials is to improve the degradation of the film material.

In these embodiments graphics or indicia including but not limited to text, symbols, and shapes, may be printed onto the surface of the film. In some embodiments, the graphic indicates the origin of the pouch or packet; the manufacturer of the pouch or packet; an advertising, sponsorship or affiliation image; a trade mark or brand name; a safety indication; a product use or function indication; a geographical indication; an industry standard; and/or a preferred orientation indication. In some embodiments the graphic may be random patterns of any type, including but not limited to, lines, circles, squares, stars, moon, flowers, animals, snowflakes, leaves, feathers, fish, and or sea shells.

The adherence of the printable material to the water-soluble or water-insoluble film is expressed as the Opacity Index. The Opacity Index (OI) of a printed film is calculated by dividing reflectance of printed film after the Sutherland Rub Test (SRT), by the reflectance obtained from the same material before the Sutherland Rub Test. The Opacity Index and the Sutherland Rub Test method are described in detail below. A higher OI value corresponds to a more abrasive resistant printed film.

WO 2007034471 A3 relates to a water-soluble detergent printed film comprising a film support and at least one print, being printed thereon and/or therein said film, said film is a water-soluble detergent adapted for effective cleansing of various human body and goods cleaning. WO 2007034471 also discusses a method of producing a water-soluble detergent printed film, comprising forming a detergent film; and, printing the same with at least one print. U.S. Pat. No. 5,666,785 relate to printing directly on water soluble film and more particularly to a method and apparatus for printing graphics and text directly on water soluble films while the film is in the process of being formed into a water soluble container by a packaging machine. Methods for printing on water-soluble films are also disclosed in WO 06/124484. Methods for on-line printing onto water-soluble film during water-soluble pouch production are disclosed in U.S. Pat. No. 8,757,062. WO 2007034471, WO 2007034471, U.S. Pat. No. 5,666,785, WO 06/124484, and U.S. Pat. No. 8,757,062, are all herein incorporated by reference in their entireties.

Any kind of printing can be used, including rotogravure, lithography, flexography, porous and screen printing, inkjet printing, letterpress, tampography and combinations thereof. Preferred for use herein is flexography printing. Flexography is a printing technology which uses flexible raised rubber or photopolymer plates to carry the printing solution to a given substrate. Standard line dryer boxes with blown air (e.g. 195-200° F., or 90-95° C.) can be used to dry any printed water soluble material.

Suitable water soluble materials for adhering a printed material thereon include, but are not limited to PVA films known under the trade reference Monosol M8630, as sold by MonoSol LLC, a Kuraray Company, of Merrillville, IN, US, and PVA films of corresponding solubility and deformability characteristics. Other films suitable for use herein include, but are not limited to, films known under the trade reference PT film or the K-series of films supplied by Aicello, or VF-HP film supplied by Kuraray.

As used herein, the "dispersion grade" is a grading scale used to rank the behavior of the printable material after the water soluble material on which it is printed, dissolves. A grade of 1 for the Dispersion Grade correlates to an ink that fully disperses in water during the Dissolution Test Method described below. A grade of 2 the Dispersion Grade correlates to that ink somewhat dispersed, small size pieces (less than or equal to about 1 mm) present in water during the Dissolution Test Method described below. A grade of 3 the Dispersion Grade correlates to ink present in large pieces (greater than about 1 mm) in the water during the Dissolution Test Method.

The Dispersion Grade should be less than 2 for the ink of the present application. The Dispersion Grade should be 1 for the ink of the present application.

Processes for making water-soluble articles, including films, include casting, blow-molding, extrusion and blown extrusion, are known in the art. One contemplated class of embodiments is characterized by the water-soluble film described herein being formed by casting, for example, by admixing the ingredients described herein with water to create an aqueous mixture, for example a solution with optionally dispersed solids, applying the mixture to a surface, and drying off water to create a film. Similarly, other compositions can be formed by drying the mixture while it is confined in a desired shape.

While the present disclosure provides film examples, the compositions can take other forms and shapes, including those having thicknesses substantially in excess of what would normally be considered a film. Composition thicknesses (i.e. at their thinness point or average thickness), for film and non-film embodiments, can be in any desired range, including values and ranges of at least 0.1 µm, at least 10 µm, at least 50 µm, at least 100 µm, at least 1 mm, at least 2 mm, at least 3 mm, at least 4 mm, at least 5 mm, at least 10 mm, and in a range of 0.1 µm to 100 µm or 0.1 µm to 1000 µm, or 0.1 µm to 5 mm, for example.

The film is useful for creating a packet to contain a composition, for example laundry or dishwashing compositions, thereby forming a pouch. The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. In some embodiments, the polymers are selected from the group consisting of polyvinyl alcohols, polyvinyl alcohol copolymers, and combinations thereof. In some embodiments, the polymers comprise polyvinyl alcohols.

The pouches and/or packets of the present disclosure comprise at least one sealed compartment. Thus the pouches may comprise a single compartment or multiple compartments. The pouches may have regions with and without degradation accelerators and/or agents for delayed degradation. In embodiments including multiple compartments, each compartment may contain identical and/or different compositions. In turn, the compositions may take any suitable form including, but not limited to liquid, solid, gels and combinations thereof (e.g. a solid suspended in a liquid). In some embodiments, the pouches comprise a first, second and third compartment, each of which respectively contains a different first, second and third composition. In some embodiments, the compositions may be visually distinct as described in European Patent Application Publication EP 2258820 A1 and counterpart US Patent Application Publication No. 2010/0305020 A1.

The compartments of multi-compartment pouches and/or packets may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user.

In some embodiments, multi-compartment pouches and/or packets include three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment. In one class of embodiments, the partitioning wall may be the only active ingredient (e.g. enzyme, oxidative agent, free radical generator, degradation accelerator) containing film thereby minimizing the exposure of the consumer to the active ingredients.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

In one embodiment, the packet includes a first and a second sealed compartment. The second compartment is in a generally superposed relationship with the first sealed compartment such that the second sealed compartment and the first sealed compartment share a partitioning wall interior to the pouch.

In one embodiment, the packet including a first and a second compartment further includes a third sealed compartment. The third sealed compartment is in a generally superposed relationship with the first sealed compartment such that the third sealed compartment and the first sealed compartment share a partitioning wall interior to the pouch.

In various embodiments, the first composition and the second composition are selected from one of the following combinations: liquid, liquid; liquid, powder; liquid, gel; liquid, paste; powder, powder; powder, liquid; powder, gel; powder, paste; gel, liquid; gel, powder; gel, gel; gel, paste; paste, liquid; paste, powder; paste, gel; and paste, paste.

In various embodiments, the first, second and third compositions are selected from one of the following combinations:
powder, liquid, liquid; powder, liquid, powder; powder, liquid, gel; powder, liquid, paste; powder, powder, liquid; powder, powder, powder; powder, powder, gel; powder, powder, paste; powder, gel, liquid; powder, gel, powder; powder, gel, gel; powder, gel, paste; powder, paste, liquid; powder, paste, powder; powder, paste, gel; powder, paste, paste; liquid, liquid, liquid; liquid, liquid, powder; liquid, liquid, gel; liquid, liquid, paste; liquid, powder, liquid; liquid, powder, powder; liquid, powder, gel; liquid, powder, paste; liquid, gel, liquid; liquid, gel, powder; liquid, gel, gel; liquid, gel, paste; liquid, paste, liquid; liquid, paste, powder; liquid, paste, gel; liquid, paste, paste; gel, liquid, liquid; gel, liquid, powder; gel, liquid, gel; gel, liquid, paste; gel, powder, liquid; gel, powder, powder; gel, powder, gel; gel, powder, paste; gel, gel, liquid; gel, gel, powder; gel, gel, gel; gel, gel, paste; gel, paste, liquid; gel, paste, powder; gel, paste, gel; gel, paste, paste; paste, liquid, liquid; paste, liquid, powder; paste, liquid, gel; paste, liquid, paste; paste, powder, liquid; gel, powder, powder; gel, powder, gel; gel, powder, paste; paste, gel, liquid; paste, gel, powder; paste, gel, gel; paste, gel, paste; paste, paste, liquid; paste, paste, powder; paste, paste, gel; and paste, paste, paste.

In one embodiment, the single compartment or plurality of sealed compartments contains a composition. The plurality of compartments may each contain the same or a different composition. The composition is selected from a liquid, powder, gel, paste or combination thereof.

Heat can be applied to the film in the process commonly known as thermoforming. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film can be heated using an infrared light. The film may be heated to a temperature of at least 50° C., for example about 50 to about 150° C., about 50 to about 120° C., about 60 to about 130° C., about 70 to about 120° C., or about 60 to about 90° C.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The film can be thermoformed with a draw ratio of at least about 1.5, for example, and optionally up to a draw ratio of 2, for example. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. The water-soluble packet and/or the individual compartments thereof can be heat sealed at a temperature of at least 200° F. (93° C.), for example in a range of about 220° F. (about 105° C.) to about 290° F. (about 145° C.), or about 230° F. (about 110° C.) to about 280° F. (about 140° C.). Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In some embodiments, second, and/or third compartment(s) can be made in a separate step and then combined with the first compartment as described in U.S. Patent Application Publication No. 2013/0240388 A1.

It should be understood that by the use of appropriate feed stations, it may be possible to manufacture multi-compartment pouches incorporating a number of different or distinctive compositions and/or different or distinctive powder, liquid, gel or paste compositions.

Inorganic Shell Material

Water-soluble packets and pouches can be encapsulated in an inorganic shell to prevent water migration into the water-soluble pouch and, therefore, premature dissolution or degradation of the water-soluble pouch. Advantageously the inorganic shell is durable enough to withstand mechanical stresses encountered during manufacturing, shipping, and distribution at a sales location but can easily be ruptured by the consumer when the consumer is ready to release the contents of the pouch. In one embodiment, a water-soluble pouch containing a cleaning composition, such as a personal care composition, can be encapsulated by an inorganic shell material. Advantageously, upon rupture of the inorganic shell material and dissolution of the water-soluble pouch, the inorganic shell material can act as an exfolient in combination with the cleaning material released from the pouch.

Suitable water-insoluble inorganic materials include, but are not limited to, calcium carbonate, sand, pumice, calcium sulfate, and combinations of the foregoing. Optionally, a binder material can be included to bind the inorganic particles together. The binder can be any suitable water repellant or resistant material.

Suitable water-soluble inorganic materials include, but are not limited to, sodium chloride, calcium bicarbonate, magnesium chloride, magnesium sulfate, potassium chloride, sodium phosphate, sodium sulfate, and combinations of the foregoing. Advantageously the water-soluble inorganic material is soluble enough to dissolve in the presence of water or water with mechanical stress, but is not so soluble that water form the consumer's hands would dissolve the shell material. Advantageously, water-soluble inorganic materials would dissolve completely and would therefore not build up in sewage systems and/or drains.

Figure 2:
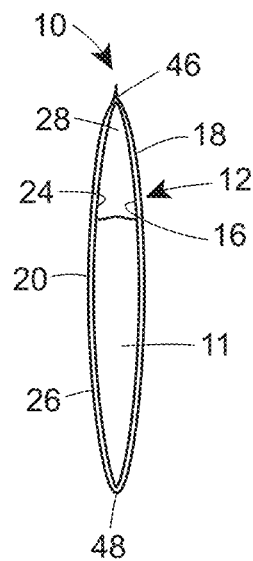
FIG. 2 is a sectional side view of the embodiment of the degradable packet of FIG. 1.

FIGS. 1 and 2 illustrate an embodiment of a degradable packet 10, for example for enclosing a powder or non-aqueous liquid 11 (e.g., a high-viscosity gel or a low-viscosity gel) that may function as a cleaning product. The degradable packet 10 may be made of any materials or combination of materials disclosed herein, including materials that may degrade or dissolve by an "outside-in" or an "inside-out" process as previously described. The degradable packet 10 may include a first panel 12 defined by at least a first edge 14, as illustrated in FIG. 1, and the first panel 12 may have an inner surface 16 and an outer surface 18 opposite the inner surface 14, as illustrated in FIG. 2. Still referring to FIG. 2, the degradable packet 10 may also include a second panel 20 defined by at least a first edge 22 (illustrated in FIG. 1), and the second panel 20 may have an inner surface 24 and an outer surface 26 opposite the inner surface 24. The inner surface 16 of the first panel 12 may be disposed between the outer surface 18 of the first panel 12 and the inner surface 24 of the second panel 20, and the inner surface 24 of the second panel 20 may be disposed between the outer surface 26 of the second panel 20 and the inner surface 16 of the first panel 12. At least a portion of the first panel 12 is sealingly coupled to a portion of the second panel 20 to define a sealed enclosure 28 between the inner surface 16 of the first panel 12 and the inner surface 24 of the second panel 20, and the sealed enclosure 28 may receive or store the powder or non-aqueous liquid 11. The sealed enclosure 28 may have any suitable volume, such as a volume between 5 and 100 ml, for example. Accordingly, the volume of powder or non-aqueous liquid 11 disposed within the sealed enclosure 28 may be between 5 and 100 ml, for example.

The first panel 12 and the second panel 20 may have any suitable shape to allow the sealed enclosure 28 to be formed therebetween. For example, as illustrated in FIG. 1, the first panel 12 and the second panel 20 may have a polygonal shape, such as, for example, a square or rectangular shape (or a substantially square or substantially rectangular shape). That is, as illustrated in FIG. 1, the first edge 14 of the first panel 12 may be adjacent to the first edge 22 of the second panel 20, and, more particularly, the first edge 14 of the first panel may be aligned with the first edge 22 of the second panel 20 when viewed from a direction normal to the X-Y plane of the reference coordinate system of FIG. 1. More specifically, the first panel 12 may have the first edge 14, a second edge 30, a third edge 32, and a fourth edge 34. The second panel 20 may have the first edge 22, a second edge 36, a third edge 38, and a fourth edge 40. As illustrated in FIG. 1, each of the first edge 14, the second edge 30, the third edge 32, and the fourth edge 34 of the first panel 12 may be adjacent to each of the first edge 22, the second edge 36, the third edge 38, and the fourth edge 40, respectively, of the second panel 20. More specifically, each of the first edge 14, the second edge 30, the third edge 32, and the fourth edge 34 of the first panel 12 may be aligned with each of the first edge 22, the second edge 36, the third edge 38, and the fourth edge 40, respectively, of the second panel 20 when viewed from a direction normal to the X-Y plane of the reference coordinate system of FIG. 1.

In FIG. 1, the first edge 14, the second edge 30, the third edge 32, and the fourth edge 34 of the first panel 12 and the first edge 22, the second edge 36, the third edge 38, and the fourth edge 40 of the second panel 20 are linear or substantially linear. However, any or all of the first edge 14, the second edge 30, the third edge 32, and the fourth edge 34 of the first panel 12 and the first edge 22, the second edge 36, the third edge 38, and the fourth edge 40 of the second panel 20 may have any suitable shape or combination of shapes, such as serrated shapes, curved, shapes, scalloped shapes, and/or partially contoured shapes, etc. Moreover, the degradable packet 10 (e.g., the first panel 12 and/or the second panel 20) may have any number of additional edges that may have any suitable shape or combination of shapes.

In some embodiments, the first panel 12 and the second panel 20 may be integrally formed at the first edge 14 of the first panel 12 and the first edge 22 of the second panel 20.

In other embodiments, a seal 42 (or multiple seals that function as a single, unitary seal) may be disposed on or between the first panel 12 and the second panel 20 to couple the first panel 12 to the second panel 20. More specifically, the seal 42 may be disposed along or adjacent to the first edge 14 of the first panel 12 and the first edge 22 of the second panel 20. In addition, seals 44, 46, 48 may be disposed along or adjacent to the second edges 30, 36, the third edges 32, 38, and the fourth edges 34, 40, respectively, of the first panel 12 and the second panel 20 to form a complete perimeter around and defining the sealed enclosure 28. The seals 42, 44, 46, 48 may be any type of seal or bonding that results in a leak-proof sealed enclosure 28. For example, any or all of the seals 42, 44, 46, 48 may be, for example, heat seals, adhesive seals, or ultrasonically welded seals, or any combination thereof.

Figure 5:
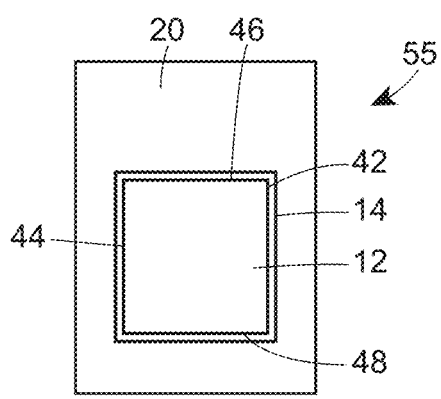
FIG. 5 is a front view of an embodiment of a degradable packet.

In some embodiments, one or more of the first edge 14, the second edge 30, the third edge 32, and the fourth edge 34 of the first panel 12 may not be adjacent or aligned with a corresponding one of the first edge 22, the second edge 36, the third edge 38, and the fourth edge 40, respectively, of the second panel 20. Specifically, in the embodiment of the degradable packet 55 illustrated in FIG. 5, the first edge 14, the second edge 30, the third edge 32, and/or the fourth edge 34 of the first panel 12 may be inwardly offset from a corresponding one of the first edge 22, the second edge 36, the third edge 38, and/or the fourth edge 40 of the second panel 20. In such an embodiment, the skilled person would recognize that any or all portions of the inner surface 24 of the second panel 20 that extends between the first edge 14, the second edge 30, the third edge 32, and/or the fourth edge 34 of the first panel 12 and the first edge 22, the second edge 36, the third edge 38, and the fourth edge 40, respectively, of the second panel 20 may be covered or coated with a protective layer to prevent premature degradation. The seals 42, 44, 46, 48 may be disposed along or adjacent to the first edge 14, the second edge 30, the third edge 32, and the fourth edge 34 of the first panel 12 to form a complete perimeter around and defining the sealed enclosure 28.

Figure 3:
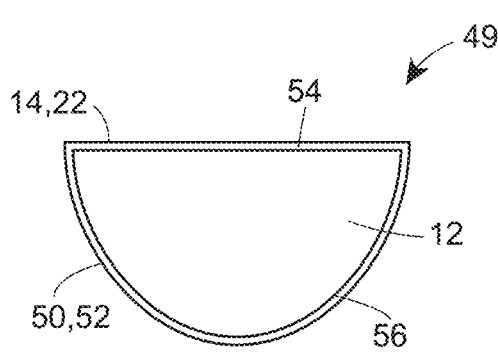

In the embodiment of the degradable packet 49 illustrated in FIG. 3, the first panel 12 and the second panel 20 may have a semicircular or substantially semicircular shape. That is, the first panel 12 may have the first edge 14 and a curved second edge 50 and the second panel 20 may have the first edge 22 and a curved second edge 52. In some embodiments, the first panel 12 and the second panel 20 may be integrally formed at the first edge 14 of the first panel 12 and the first edge 22 of the second panel 20. In other embodiments, a seal 54 may be disposed on or between the first panel 12 and the second panel 20 to couple the first panel 12 to the second panel 20. More specifically, the seal 54 may be disposed along or adjacent to the first edge 14 of the first panel 12 and the first edge 22 of the second panel 20. In addition, an additional seal 56 may be disposed along or adjacent to the second edges 50, 52 of the first panel 12 and the second panel 20 to form a complete perimeter around and defining the sealed enclosure 28.

Figure 4:
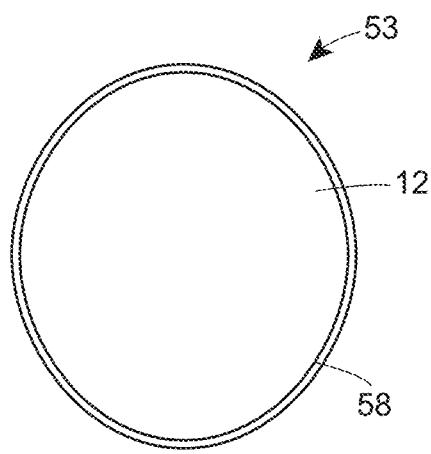
FIG. 4 is a front view of an embodiment of a degradable packet.

In other embodiments, such as the embodiment of the degradable packet 53 illustrated in FIG. 4, the first panel 12 and the second panel 20 may have a circular or substantially circular shape. That is, the first panel 12 may have the first edge 14 and the second panel 20 may have the first edge 22, and the first edges 14, 22 may be mutually adjacent or mutually aligned. A seal 58 may be disposed on or between the first panel 12 and the second panel 20 to couple the first panel 12 to the second panel 20. More specifically, the seal 58 may be disposed along or adjacent to the first edge 14 of the first panel 12 and the first edge 22 of the second panel 20 to form a complete perimeter around and defining the sealed enclosure 28.

Figure 6:
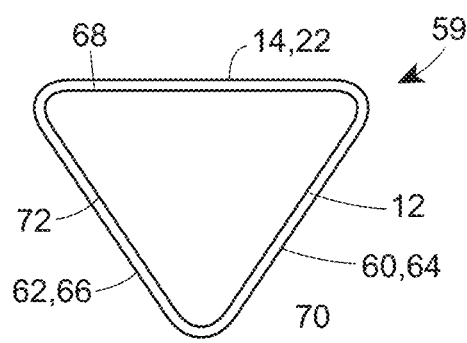
FIG. 6 is a front view of an embodiment of a degradable packet.

In the embodiment of the embodiment of the degradable packet 59 illustrated in FIG. 6, the first panel 12 and the second panel 20 may have a triangular or substantially triangular shape. That is, the first panel 12 may have the first edge 14, a second edge 60, and a third edge 62. The second panel 20 may have the first edge 22, a second edge 646, and a third edge 66. As illustrated in FIG. 6, each of the first edge 14, the second edge 60, and the third edge 62 of the first panel 12 may be adjacent to each of the first edge 22, the second edge 64, and the third edge 66, respectively, of the second panel 20. More specifically, each of the first edge 14, the second edge 60, and the third edge 62 of the first panel 12 may be aligned with each of the first edge 22, the second edge 64, and the third edge 66, respectively, of the second panel 20 when viewed from a direction normal to the X-Y plane of the reference coordinate system of FIG. 1.

Figure 7:
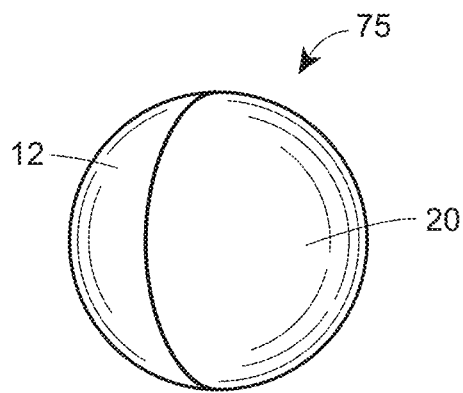
FIG. 7 is a perspective view of an embodiment of a degradable packet.
Figure 8:
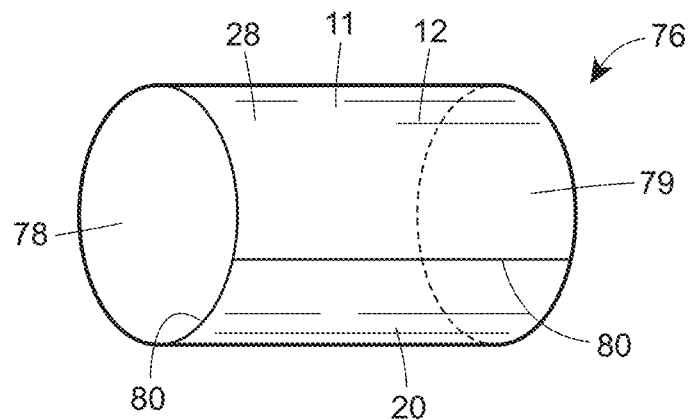
FIG. 8 is a perspective view of an embodiment of a degradable packet.

In some embodiments, the first panel 12 and the second panel 20 may be planar or substantially planar (e.g., parallel or substantially parallel to the X-Y plane of the reference coordinate system of FIG. 1). However, as illustrated in FIG. 2, such substantially planar panels 12, 20 may have a convex or cambered shape when the powder or non-aqueous liquid 11 is disposed within the sealed enclosure 28. In other embodiments, the first panel 12 and the second panel 20 may cooperate to from a substantially three-dimensional shape, such as a spherical shape, such as the embodiment of the degradable packet 75 illustrated in FIG. 7. In addition, the first panel 12 and the second panel 20 may cooperate to from a three-dimensional shape that may have an oval-cross section or a polygonal cross-section, such as a rectangular or square cross-section. The cross-sectional shape may be constant over the length of the degradable packet or may converge and/or diverge. Moreover, any number of additional panels may be coupled to the first panel 12 and the second panel 20 to result in the degradable packet. For example, the degradable packet 76 illustrated in FIG. 8 may include a third panel 78 and a fourth panel 79, and edges of each of the first, second, third, and fourth panels 12, 20, 76, 79 may be secured by seals 80 to form the sealed enclosure 28 containing the powder or non-aqueous liquid 11.

In some embodiments, the first panel 12 and the second panel 20 may be integrally formed at the first edge 14 of the first panel 12 and the first edge 22 of the second panel 20. In other embodiments, a seal 68 may be disposed on or between the first panel 12 and the second panel 20 to couple the first panel 12 to the second panel 20. More specifically, the seal 68 may be disposed along or adjacent to the first edge 14 of the first panel 12 and the first edge 22 of the second panel 20. In addition, seals 70, 72 may be disposed along or adjacent to the second edges 60, 64 and the third edges 62, 66, respectively, of the first panel 12 and the second panel 20 to form a complete perimeter around and defining the sealed enclosure 28.

In some embodiments, one or more seals (e.g., seals 46, 54, 58, 68) may be a water soluble seal that may dissolve when the degradable packet 10 is submerged or inserted into hot or warm water, for example. Accordingly, a user prepares a container of hot or warm water for washing (clothes, personal hygiene, etc.) and drops the degradable packet 10 into the water. The water-soluble seal will dissolve and weaken, and the powder or non-aqueous liquid 11 disposed within the sealed enclosure 28 will be released in the water.

The water will also come into contact with the inner surfaces 16, 24 of the first and second panels 12, 20, which may begin the degradation process.

In other embodiments, the degradable packet 10 (or any of the disclosed embodiments) may be ruptured, torn, or punctured (along, for example, a scored, perforated, or weakened line 74, as illustrated in FIG. 1) to form at least one passage (e.g., a hole, aperture, tear) in the first panel 12 between the inner surface 16 and the outer surface 18 and/or at least one passage in the second panel 20 between the inner surface 24 and the outer surface 26. The passage through the first panel 12 and/or second panel 20 allows the powder or non-aqueous liquid 11 to be accessed and dispensed as desired by the user. At least a portion of the degradable packet 10 may be immersed or placed in contact with an aqueous liquid such that the aqueous liquid passes through the at least one passage in the first panel 12 or the at least one passage in the second panel 20, wherein the aqueous liquid contacts at least one of the inner surface 16 of the first panel 12 and the inner surface 24 of the second panel 20.

Figure 9:
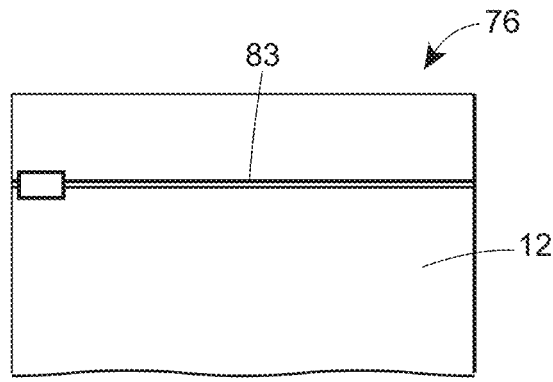
FIG. 9 is a front view of a portion of an embodiment of a degradable packet.

Rupturing the sealed enclosure 28 (e.g., creating or forming at least one passage in the first panel 12 between the inner surface 16 and the outer surface 18 and/or at least one passage in the second panel 20 between the inner surface 24 and the outer surface 26) may include tearing a portion of the first panel 12 and/or the second panel 20 that comprises or is adjacent to the sealed enclosure 28. In addition, rupturing the sealed enclosure 28 may include tearing a scored or perforated portion (e.g., the scored line 74 of FIG. 1) of the first panel 12 and/or the second panel 20. Also, rupturing the sealed enclosure 28 may include puncturing the sealed enclosure 28 (i.e., puncturing a portion of the first panel 12 and/or the second panel 20) with a tool, such as a knife or scissors, for example. In other embodiments, such as the degradable packet 81 illustrated in FIG. 9, rupturing the sealed enclosure 28 may include pulling a tab 82 affixed to at least one of the first panel 12 or the second panel 20, and the tab 82 may be secured to a tear portion 83 that extends across a portion of the first panel 12 and/or the second panel 20. That is, when the tab 82 is pulled by a user, the tear portion 83 opens an elongated passage that opens to the sealed enclosure 28 as previously described.

The degradable packet 10 (or any disclosed embodiment of the degradable packet) may be manufactured by any suitable process or combination of processes. For example, degradable packet 10, illustrated in FIG. 1, may be manufactured by positioning the first panel 12 (having the inner surface 16 and the outer surface 18) and the second panel 20 (having the inner surface 24 and the outer surface 26) such that the inner surface 16 of the first panel 12 is between the outer surface 18 of the first panel 12 and the inner surface 24 of the second panel 20. At least a portion of the first panel 12 and/or the second panel 20 may be sealed to form a portion of the sealed enclosure 28 to contain the powder or non-aqueous liquid 11. For example, seals 42, 44, 48 may be formed along or adjacent to the first edges 14, 22, the second edges 30, 36, and the fourth edges 34, 40 of the first and second panels 12, 20 to form a portion of the sealed enclosure 28. In some embodiments, the first panel 12 and the second panel 20 may be folded along the first edges 14, 22 and seals 44, 48 may be formed along or adjacent to the second edges 30, 36 and the fourth edges 34, 40 of the first and second panels 12, 20 to form a portion of the sealed enclosure 28 (i.e., a partially-formed sealed enclosure 28). The powder or non-aqueous liquid 11 may then be inserted within the partially-formed sealed enclosure 28, and an additional seal (e.g., the seal 46 formed at or adjacent to the third edges 32, 38 of the first and second panel 20) may fully and completely form the sealed enclosure 28.

The degradable packet 10 (or any previously or subsequently disclosed packet) may be formed in an injection molding process, and in such a process, no seals may be necessary. Instead, the powder or non-aqueous liquid 11 may be inserted through a passage (not shown) in the first panel 12 and/or the second panel 20, and the passage may be subsequently sealed to form the sealed enclosure 28.

The first panel 12 (having the inner surface 16 and the outer surface 18) and the second panel 20 (having the inner surface 24 and the outer surface 26) may be cut to the desired shape as a part of the manufacturing process, or the first and second panel 20 may be pre-cut in a separate process (such as pre-cut by the supplier of the first panel 12 and the second panel 20. The first panel 12 and the second panel 20 may be cut from the same sheet of material, and the first panel 12 and the second panel 20 may be folded along the first edges 14, 22. Alternatively, the first panel 12 and the second panel 20 may be cut from different sheets of material. The seals 42, 444, 46, 48 may be any type of seal or seals disclosed herein. One having ordinary skill in the art would recognize that any number or configuration of panels (such as the first panel 12 and second panel 20 of the degradable packet 49 of FIG. 3) may be manufactured in a similar manner, with one or more edges (e.g., second edges 50, 52 and/or first edges 14, 22 of the first and second panels 12, 20) sealed or folded as described to result in a sealed enclosure 28.

In the embodiments illustrated in FIGS. 13A and 13B, two or more of any of the disclosed degradable packets (e.g., the degradable packets 10) may be secured or coupled together to form a packet assembly 150. Adjacent edges (e.g., edges shared by adjacent packets) may be perforated, scored, or otherwise weakened to allow a user or cashier to easily remove a single packet from the packet assembly 150. Any of the disclosed degradable packets (e.g., the degradable packets 10) may be formed by an injection molding process, and the packet assembly 150 may be formed by an injection molding process (e.g., the entire packet assembly 150 may be formed in a single injection molding process as a single part).

In some embodiments, the degradable packet 10 and/or packet assembly 150 may be comprised of a steel foil material (i.e., made from a sheet or sheets of thin carbon steel). A protective film may be disposed as on outer layer over the steel foil material to protect the degradable packet 10 and/or packet assembly 150 from prematurely degrading. During the opening process (e.g., tearing through the steel foil material), the protective film covering the steel foil material is punctured or scraped away, allowing ambient moisture (i.e., rain or humidity) to contact—and begin to degrade—the steel foil material. After a suitable amount to time (e.g., three days to three weeks), the degradable packet 10 may substantially corrode.

In some embodiments, such as that as that illustrated in FIG. 14, any embodiment of the degradable packet 10 and/or packet assembly 150 may be stored or packaged in a degradable outer packaging 144 made or comprising any of the materials disclosed herein. For example, the outer packaging 144 may be formed from or comprise a high DH material, and the degradable packet 10 and/or packet assembly 150 may be water-soluble.

In some embodiments, any of the packets previously (or subsequently) described (e.g., the degradable packet 10) may be "opened" (e.g., punctured or ruptured) by a spout tool 151, as illustrated in FIGS. 12A to 12D. The spout tool 151 may have a base portion 152 and an elongated spout portion 154, and the spout portion 154 may have a passageway 155 disposed therethrough. A removable cap 156 may be disposed at an end of the spout portion 154. The spout tool 151 may be made from any degradable material described herein, or may be made from or comprise a non-degradable material. To use, a user may buy (or be given, or bring) the spout tool, and an end of the spout portion 154 (e.g., the end opposite the cap 156) may be inserted through the first panel 12 and/or the second panel 20 such that the passageway 155 is in fluid communication with the sealed enclosure 28. So disposed, the cap 156 may be removed, and the powder or non-aqueous liquid 11 disposed in the sealed enclosure 28 may travel through the passageway 155 for use, as illustrated in FIG. 12C. A lanyard 158 may be secured to the base portion 152 for the user's convenience, or to any other portion of the packet which does not compromise the integrity of the container.

Figure 10:
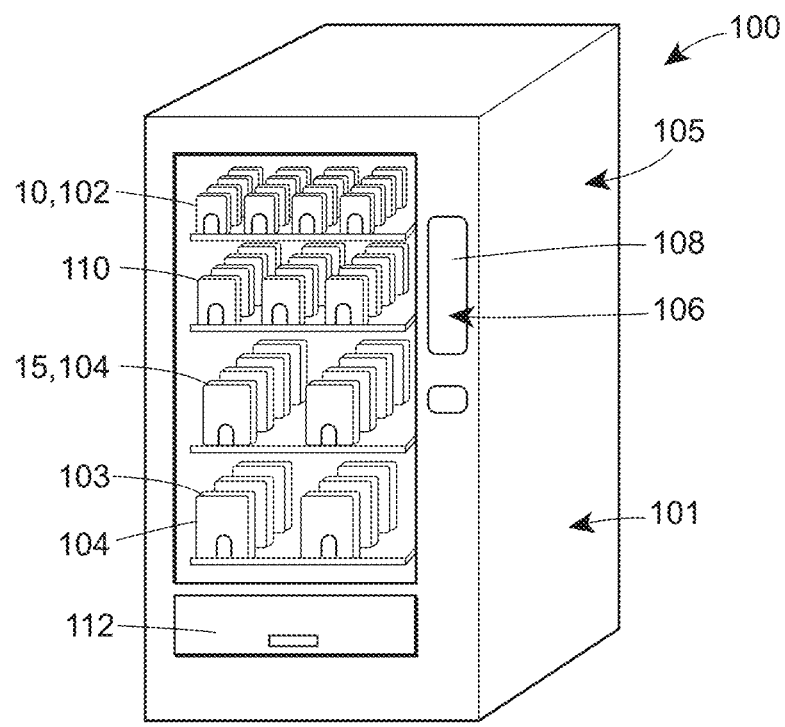
FIG. 10 is a perspective view of an embodiment of a system for dispensing cleaning product.

FIG. 10 illustrates a system 100 for dispensing cleaning product. The system 100 may include a dispensing machine 101, such as a vending machine, that may store and dispense portions of a cleaning product. More specifically, the dispensing machine 101 may include an inside portion 103 that may be defined by a plurality of walls 105. The inside portion 103 may be temperature and/or humidity controlled. Any suitable cleaning product may be stored and dispensed in the dispensing machine 100. For example, the cleaning product may be a soap or shampoo used to wash skin or hair. In other examples, the cleaning product may be powdered detergent or liquid detergent used to clean laundry in a known manner. In still further example, the cleaning product may be a powder or liquid used to clean dishes.

In some embodiments, the dispensing machine 101 may store and dispense degradable packets 102 (such as any of the packets previously or subsequently described, such as the degradable packet 10) that may contain portions of the cleaning product, and the degradable packets 102 may be identical to any of those previously disclosed. That is, the degradable packet 102 may degrade or dissolve by an "outside-in" or an "inside-out" process as previously described. In some embodiments, the dispensing machine 101 may store and dispense two or more degradable packets 102 that may be integrally formed or coupled (e.g., removably coupled) to form the packet assembly 150.

The system 100 may also include a delivery assembly 106 coupled to (or integrated with) the dispensing machine 101. The delivery assembly 106 may include a payment unit 108 that facilitates or accepts a transaction, such as a monetary transaction, between a user and the dispensing machine 101. For example, the transaction may be inserting tokens and/or currency, such as coins and/or paper currency, into the payment unit 108. Tokens may be purchased, for example, from a cashier if the dispensing machine 101 is located in or near a store. The payment unit 108 may also include a card reader, and the transaction may the transaction may be a credit card transaction, prepaid card transaction, or redeemable coupon card (issued by, for example, the owner or lessee of the dispensing machine 101) transaction.

The delivery assembly 106 may also include an actuator assembly 110, and the actuator assembly 110 may displace one or more of the degradable packets 102 after a transaction is made to the payment unit 108. The actuator assembly 110 may be in communication with the payment unit 108 such that the actuator assembly 110 is triggered by a transaction. For example, the actuator assembly 110 may include a worm drive and motor that mechanically advances the degradable packets 102 and/or the assembly of degradable packets 150 (or between one and four degradable packets 102 and/or assemblies of degradable packets 150) and allows the degradable packets 102 and/or the assembly of degradable packets 150 to vertically fall into a retrieval area 112 that is accessible to the user. The retrieval area 112 may be a portion of the dispensing machine 101 that is accessible by through a slot or by pivoting or opening a door.

The actuator assembly 110 (and/or the payment unit 108) may be electrically powered, and the electricity may be supplied by an external source. For example, the actuator assembly 110 (and/or the payment unit 108) may be powered by electricity provided via a conventional power outlet. As another example, the actuator assembly 110 (and/or the payment unit 108) may be powered by solar panels on or adjacent to the dispensing machine 101. The actuator assembly 110 (and/or the payment unit 108) may also (or alternatively) be powered by batteries (e.g., rechargeable batteries) disposed adjacent to, on, or inside the dispensing machine 101. In other examples, the actuator assembly 110 may be powered mechanically. That is, the actuator assembly 110 may include a worm drive that is powered by a mechanical crank. The actuator assembly 110 may also be powered, alone or in part, by one or more springs. The actuator assembly 110 may be coupled to the payment unit 108 mechanically (e.g., by a linkage mechanism) such that a transaction (e.g., the insertion of a token or coin(s) in a slot) mechanically actuates a mechanism that allows the crank to be turned by a user.

Figure 11:
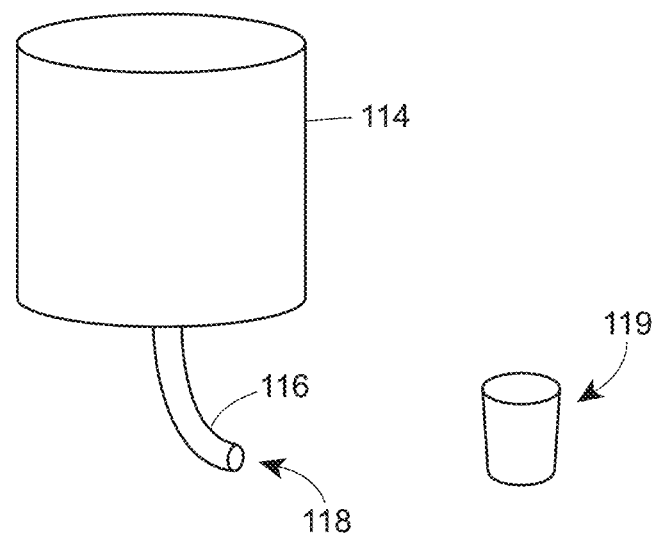
FIG. 11 is a perspective view of an embodiment of a storage vessel and a personal container.

In some embodiments, the dispensing machine 101 may include a storage vessel 114 of powder or liquid cleaning product, as illustrated in FIG. 11. That is, the storage vessel 114 may be re-fillable, and may have a volume that can accommodate multiple individual-sized portions of the powder or liquid cleaning product (e.g., from 5 to 20 gallons). In some embodiments, the storage vessel 114 may be completely or partially disposed within an inside portion 103 or an embodiment of the dispensing machine 101 that may be defined by the plurality of walls 105. In such an embodiment, the actuator assembly 110 may include a pump (not shown), and the pump may be coupled to the payment unit 108 such that a transaction may allow the pump to dispense a desired portion of the powder or liquid cleaning product to an outlet, such as a spout (not shown).

For example, the pump (and/or the payment unit 108) may be electrically powered as previously described. (e.g., by solar power or by externally-provided electricity, such as that provided by a power outlet). The pump may also be coupled to the payment unit 108 mechanically (e.g., by a linkage mechanism) such that a transaction (e.g., the insertion of a token or coin(s) in a slot) mechanically actuates a mechanism that allows the crank to be turned by a user, and the crank actuation directly or indirectly powers the pump such that one or more individual portions of the powder or liquid cleaning product is dispensed at the outlet.

As illustrated in FIG. 11, the actuator assembly 110 may alternatively include a gate 116 (e.g., a retractable or displaceable gate member or sluice valve member) that has an open position and a closed position. The gate 116 may be coupled to the payment unit 108 such that a transaction may allow the gate 116 to be actuated (electrically or mechanically) from the closed position to the open position, thereby allowing a desired portion of the powder or liquid cleaning product to be dispensed to an outlet, such as a spout 118. The portion of the powder or liquid cleaning product to be dispensed may be pumped from the gate 116 to the outlet 118 or may be gravity fed form the gate 116 to the outlet 118.

In some embodiments, as illustrated in FIG. 11, the user may buy (or be given, or bring) a personal container 119 that may be adapted to hold the portion of the powder or liquid cleaning product that may be dispensed from the spout 118 or the equivalent. The personal container 119 may be degradable, and may be made from or comprise any of the materials disclosed herein. The personal container 119 may also be made from a non-degradable material and may be intended as a re-usable container (e.g., a plastic cup or flexible plastic envelope, such as the flexible plastic envelope 192 of FIGS. 27A, 27B, and 28, which will be discussed in more detail below). As such, a typical transaction from the system 100 (i.e., using the dispensing machine 101 or from the storage vessel 114 itself, independent of a dispensing machine 101) would dispense the portion of the powder or liquid cleaning product directly into the degradable or non-degradable personal container 119, and no non-degradable waste would result from the transaction.

The personal container 119 may be any suitable container and may have any suitable shape. For example, a plurality of personal containers 119 may be provided adjacent to the storage vessel 114 (or the dispensing machine 101), and each of the plurality of personal containers 119 may be made of paper that is folded in a flat (e.g., planar) configuration. When a user wishes to purchase a portion of the powder or liquid cleaning product, the user unfolds paper personal containers 119 into a cup-like configuration and begins the transaction previously described.

In some configurations, individual (or multiple) degradable packets 10 may be purchased or acquired from the system 100 (e.g., purchased or acquired by the dispensing machine 101). The degradable packets 10 may have one or more sealable or closable (or re-sealable and/or re-closable) edges, and closing or sealing the edge will, along with any pre-sealed edges, cooperate to form the sealed enclosure 28. Prior to closing or sealing the degradable packet 10 to form the sealed enclosure 28, a portion of the powder or liquid cleaning product may be dispensed from the spout 118 into the degradable packet 10, and the one or more sealable or closable edge may be sealed or closed to form the sealed enclosure 28. The degradable packet 10 or degradable packets 10 may then be used in any or all of the manners previously described.

In additional configurations, individual (or multiple) degradable packets 10 may be stored within the inside portion 103 defined by a plurality of walls 105 of the dispensing machine 101 (see FIG. 10). An embodiment of the storage vessel 114 (see FIG. 11) may also be disposed (or may be partially disposed) within the inside portion 103 of the dispensing machine 101. The degradable packets 10 may have one or more sealable or closable (or re-sealable and/or re-closable) edges, and closing or sealing the edge will, along with any pre-sealed edges, cooperate to form the sealed enclosure 28. So configured, and following a transaction (such as, for example, inserting tokens and/or currency, such as coins and/or paper currency, into the payment unit 108), a portion of the powder or liquid cleaning product contained in the storage vessel 114 may be automatically dispensed from the spout 118 into the degradable packet 10. The one or more sealable or closable edge may then be sealed or closed to form the sealed enclosure 28 as previously described. Any suitable automated sealer (not shown) or combination of automated sealers may engage the one or more sealable or closable edge to seal or otherwise close the one or more sealable or closable edge and form the sealed enclosure 28. In a similar way, a degradable packet 10 or a sealed enclosure 28 can be made by sealing multiple edges of a film sheet, which may be divided from a roll of film. The degradable packet 10 may then be delivered or otherwise made available to the user (by, for example, an embodiment of the delivery assembly 106). In some embodiments, the degradable packet 10 containing the portion of the powder or liquid cleaning product may be delivered to the retrieval area 112 (see FIG. 10) of the dispensing machine 101.

In some embodiments, a personal container 119 may be disposed (or may be partially disposed) within the inside portion 103 of the dispensing machine 101. The personal container 119 may any of the embodiments described herein, such as the degradable personal container 119. As described in the previous paragraph, and following any suitable transaction, a portion of the powder or liquid cleaning product contained in the storage vessel 114 may be automatically dispensed from the spout 118 into the personal container 119. The personal container 119 may then be delivered or otherwise made available to the user (by, for example, an embodiment of the delivery assembly 106). In some embodiments, the personal container 119 containing the portion of the powder or liquid cleaning product may be delivered to the retrieval area 112 (see FIG. 10) of the dispensing machine 101.

These aspects where a container (e.g. a packet) is filled at the point of dispensing will allow for use of a relatively more sensitive (less robust) packaging material (e.g. film), because it will not need to travel through the entire supply chain when filled with product.

In other configurations, a user would buy a portion of a cleaning product (in any manner discussed above) and the cleaning product may be dissolved in a container 168 (such as, e.g., a recyclable water bottle or glass bottle, as illustrated in FIG. 15) for storing water. The cleaning product may be concentrated, such that when the concentrated cleaning product is mixed with the water in the recyclable container, a resulting cleaning product solution (e.g., a detergent) suitable for use is generated can be stored in the container for multiple uses. As illustrated in FIG. 15, the cleaning product may be disposed within a water-soluble degradable packet 10. Because the cleaning product is dispensed in a manner that generates no non-degradable waste, and the water is stored in a re-purposed container, no non-degradable waste would result from the transaction. In other embodiments, such as that illustrated in FIG. 16A, the container 170 may be a non-degradable container that may have a hinged top 172 to form a seal with a cup body 174 when in a closed position (illustrated in FIG. 16B). A user would buy a portion of a cleaning product (in any manner discussed above) and the cleaning product may be dissolved in a water solution contained in the non-degradable container.

In some embodiments, a unit (i.e., a strip, piece, or portion) of degradable material may be dispensed along with or instead of the degradable packet 102 and/or packet assembly 150. The unit may be a cleaning product, and, more particularly, may be a degradable material similar or identical to any that have been disclosed, and the material may have an embedded or applied detergent. The unit may be stored and/or dispensed in the dispensing machine 101 in the manner previously described. The unit (or a plurality of units) may also be stored or packaged in a degradable outer packaging (e.g., the degradable outer packaging 144 of FIG. 14) made or comprising any of the materials disclosed herein.

Figure 17:
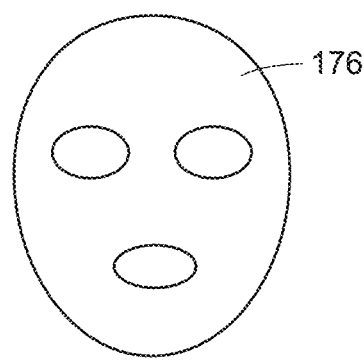
FIG. 17 is a front view of an embodiment of a facial mask.

After the unit is purchased by way of the dispensing machine 101 or by a cashier or a third party, the user may use the unit as a soap or a shampoo, and the unit may gradually dissolve after a predetermined number of uses (such as, e.g., one to five uses), and no non-degradable waste would result from the transaction. The unit may be used to wash the face or hair, or may be completely or partially dissolved in water to form a solution used to clean clothes, hair, or the body. In other embodiments, such as that illustrated in FIG. 17, the unit may be a facial mask 176 (e.g., a portion of previously-disclosed material that may be shaped to conform to a human face) that may be sold individually or packaged (e.g., within an appropriately-shaped outer packaging 144 as illustrated in FIG. 14), as described herein. With the facial mask 176, the material may be stronger than a cellulosic or natural polymer, and may degrade over time with use. The facial mask 176 may be apply water to the facial mask and apply to the face.

Figure 18:
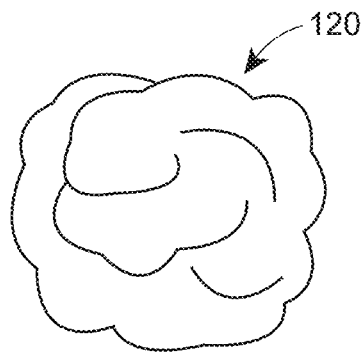
FIG. 18 is a perspective view of an embodiment of a scrub brush assembly.

Referring to FIG. 18, a scrub brush assembly 120 may be made from one or more of the previously disclosed materials, and the scrub brush assembly 120 may have the form of a "loofa" or other scrubbing implement. For example, the scrub brush assembly 120 may include a plurality of individual sheets of previously disclosed material that cooperate to form a non-planar and/or three-dimensionally contoured shape (e.g., substantially spherical shape, or substantially cylindrical shape), or a single sheet of material may be folded, bunched, twisted, and/or otherwise arranged to form such a shape or combination of shapes. The sheets (or sheet) may also form or cooperate to form a substantially three-dimensional cross-sectional shape (e.g., a rectangular, circular, or oval cross-sectional shape). The material may be PVA polymer, and detergents and/or anti-bacterial aids may be embedded into the water-soluble matrix (e.g., a hot water soluble matrix or a cold water-soluble matrix). The material may be abrasive texture or substantially abrasive texture suitable for scrubbing human skin. The material may have a thickness or other property/combination of properties to allow between 1 and three uses by an individual. In use, the scrub brush assembly 120 may be taken with a user into a bath, shower, or other washing facility, and hot water (or cold water) may be applied to the material (e.g., dunking the scrub brush assembly 120), thereby activating the detergents and/or anti-bacterial aids. The scrub brush assembly 120 may then be used as a conventional loofa or scrubbing implement, and the scrub brush assembly 120 may degrade with use resulting in no non-degradable waste.

Figure 19:
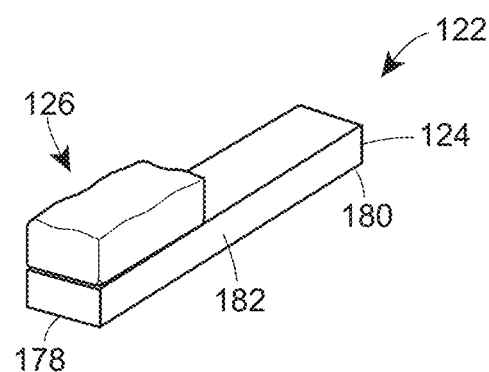
FIG. 19 is a perspective view of an embodiment of a scrub brush assembly.
Figure 20:
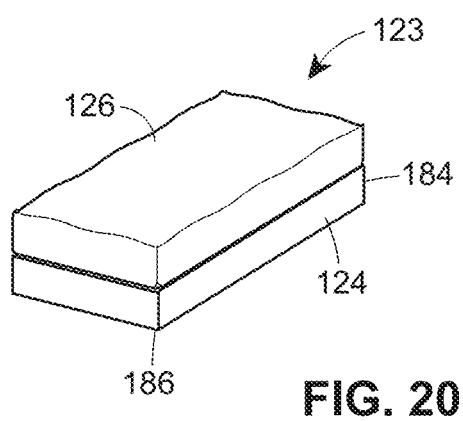
FIG. 20 is a perspective view of an embodiment of a scrub brush assembly.

In addition, a further embodiment of the scrub brush assembly 122 illustrated in FIG. 19, may include a handle portion 124 and a cleaning portion 126 secured to the handle portion 124. The handle portion 124 may be elongated and may have a first end 178 and a longitudinally-opposite second end 180, for example. The cleaning portion 126 may be secured to the handle portion 124 (e.g., between the first end 178 and an intermediate point 182) and a user may grasp or hold the handle portion 124 between the intermediate point 182 and the second end 180. In some embodiments, such as that illustrated in FIG. 20, scrub brush assembly 123 may include the handle portion 124 that may have a rectangular, substantially-rectangular, polygonal, partially-contoured, and/or oval cross-sectional shape, and may have a first side 184 and a second side 186 opposite the first side 184. The cleaning portion 126 may be secured to all or part of the first side 184, and the second side 186 may be adapted to be grasped by a user during the washing process. The handle portion 124 may be made from a robust and/or substantially rigid degradable material, such as any such suitable material described herein. For example, the handle portion 124 may be made from a hot water-soluble material. The handle portion 124 may be configured to degrade after any number of uses, such as between 1 and 10 uses. The cleaning portion 126 may identical to the scrub brush assembly 120 previously described. Alternatively, the cleaning portion 126 may be a plurality of bristles (e.g., linear bristles that each extend from the handle portion 124 in a known manner. These bristles may be made from any suitable degradable material disclosed herein, such as hot-water soluble material. In other embodiments, the cleaning portion 126 and the handle portion 124 may be made from non-degradable material, and a cleaning product (e.g., powder or non-aqueous liquid 11) may be applied to the cleaning portion 126, wherein the powder or non-aqueous liquid 11 is contained in any of the degradable packets or packages or other containers described herein.

Figure 21:
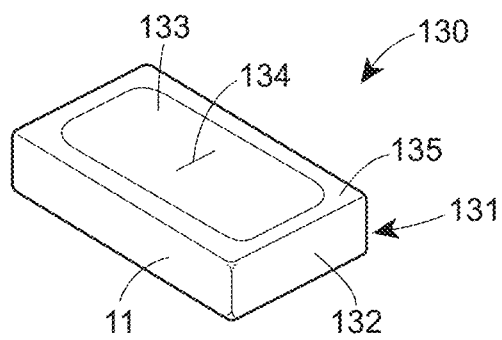
FIG. 21 is a perspective view of an embodiment of a scrub brush assembly.

In addition, a further embodiment of the scrub brush assembly 130 illustrated in FIG. 21, may include a container portion 131, and the container portion 131 may include a plurality of walls 132 that cooperate to define a sealed volume 135. A cleaning product, such as the powder or non-aqueous liquid 11 previously described, may be disposed within the sealed volume 132. The container portion 131 may be made from any of the degradable materials described herein, and the material may be rigid or semi-rigid to maintain its shape during storage or use. For example, the material may be a rigid or semi-rigid hot-water soluble material. At least one of the plurality of walls 132 may have or include an abrasive portion 133, and the abrasive portion 133 may be integrally formed (e.g., formed as a texture or collection of surface features) on an outer surface of the at least one of the plurality of walls 132. The abrasive portion 133 may also be coupled to the outer surface of the at least one of the plurality of walls 132, and the abrasive portion 133 may be made from any of the degradable materials described herein. The container portion 131 (and the abrasive portion 133) may be formed by any suitable manufacturing operation, such as an injection molding process. A scored or weakened portion 134 may be formed in one or more of the plurality of walls 132, and the scored or weakened portion 134 may be configured to allow a user to puncture, rupture, and/or tear the one or more of the plurality of walls 132 (e.g., create a passage between an outer surface and an inner surface of at least one of the plurality of walls 132) and thereby access the sealed volume 135 and release the cleaning product contained therein. The scored or weakened portion 134 may be formed as linear feature or may be formed as two or more perforations in the one or more plurality of walls, for example. The scored or weakened portion 134 may be formed on the one or more of the plurality of walls 132 of the abrasive portion 133. To use the scrub brush assembly 130, the user may apply pressure (e.g., with the fingers or with a tool, such as a knife) to the scored or weakened portion 134 to create a passage through at least one of the plurality of walls 132. The user may then squeeze out the cleaning product and distribute the cleaning product over the abrasive portion 133 and use the abrasive portion 133 to clean the body of the user (or any other washing or scrubbing application). The container portion 131 (and the abrasive portion 133) may degrade with use (e.g., one to three uses) and may therefore result in no non-degradable waste.

Figure 22:
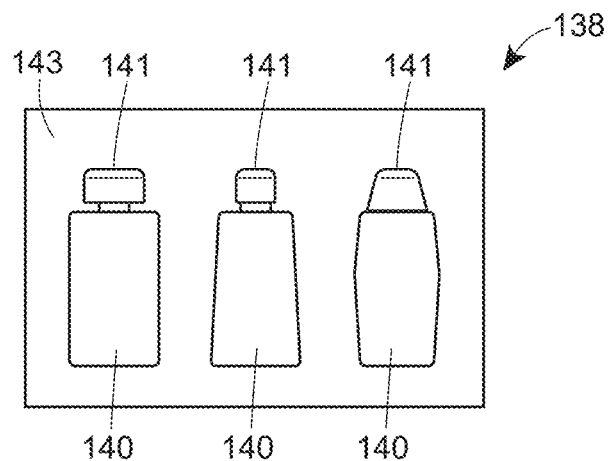
FIG. 22 is a front view of an embodiment of a cleaning kit.

In other embodiments, such as that illustrated in FIG. 22, a cleaning kit 138 may include one or more containers 140 containing a cleaning/hygiene material (i.e., a container of toothpaste, soap, shampoo, laundry detergent, etc.), and each of the containers 140 may be made from any of the degradable materials described herein, such as a water-soluble material, for example. Each container 140 may be any of the embodiments described herein, or may be an injection molded bottle (e.g., a bottle having a volume of 5 ml to 100 ml) having a twist-off caps 141 or the equivalent. The containers 140 may also be packets that may be pierced or opening in any of the manners previously described. Each of the containers 140 may be disposed within an interior 143 of a storage pouch 142 that may be totally or partially formed from or comprise a degradable material, such as any degradable material described herein. The storage pouch 142 may be closable, such as by a drawstring, flap, of snap, all made of degradable material. So configured, after a number of uses (e.g., 1 to 3 uses), the containers 140 and the storage pouch 142 will degrade, leaving no non-degradable waste. The storage pouch 142 may also be provided (or sold) as a stand-along item, and such a storage pouch 142 may be made from or comprise a PVA barrier.

As previously discussed, the dispensing machine 101 may store and dispense degradable packets 102 (such as any of the packets previously or subsequently described, such as the degradable packet 10) that may contain portions of the cleaning product, and the degradable packets 102 may be identical to any of those previously disclosed. A carrier 192 adapted to receive one or more of the degradable packets 102 may be acquired prior to or at the time of use of the dispensing machine 101. For example, the carrier 192 may be purchased prior to (or during) the transaction that enables use of the dispensing machine 101. Of course, the carrier 192 may be used to receive one or more of the degradable packets 102 (and/or a packet assembly 150 and/or any degradable material described herein) obtained in any manner, such as degradable packets 102 purchased from a cashier or a third party. In some embodiments, the carrier 192 may be adapted to receive portions of cleaning product not disposed within degradable packets 102.

Figure 27A:
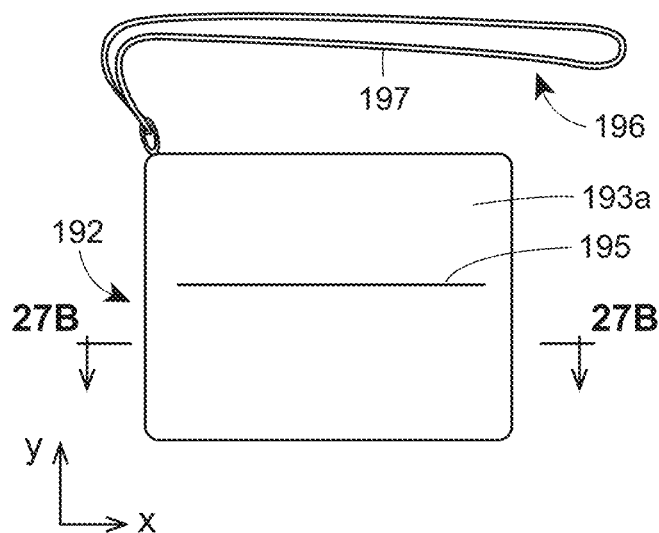
FIG. 27A is a front view of an embodiment of a carrier.
Figure 27B:
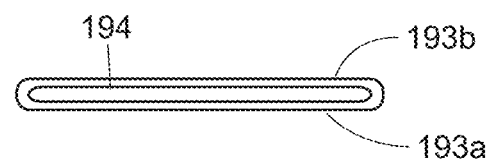
FIG. 27B is a section view taken along line 27B-27B of FIG. 27A.
Figure 28:
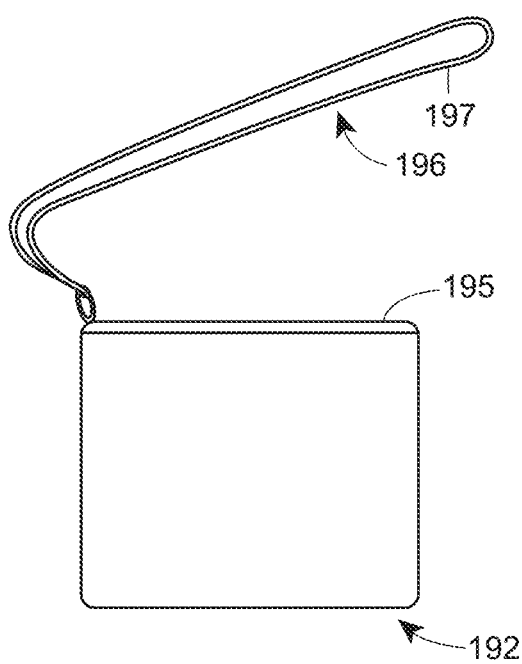
FIG. 28 is a front view of an embodiment of a carrier.

The carrier 192 may be any suitable container capable of removably receiving one or more of the degradable packets 102. In some embodiments, the carrier 192 may form a full or partial enclosure comprising one or more panels of material. For example, as illustrated in FIGS. 27A and 27B, the carrier 192 may include a front panel 193a and a rear panel 193b, and each of the perimeter edges of the front panel 193a and rear panel 193b may be coupled or may be integrally formed. In some embodiments, one or more of the perimeter edges of the front panel 193a and rear panel 193b may be heat sealed to couple the respective perimeter edges of the front panel 193a and rear panel 193b. Instead of coupling or integrally-forming each of the perimeter edges of the front panel 193a and rear panel 193b, one or more panels (not shown) may be disposed between the front panel 193a and rear panel 193b and a corresponding edge or edges of such one or more panels may be coupled to one or more perimeter edges of the front panel 193a and/or the rear panel 193b.

The front panel 193a and rear panel 193b may have any suitable shape or combination of shapes, such as that of a rectangle, square, or circle. So configured, the front panel 193a and rear panel 193b (and any additional panels) may cooperate to define an interior portion 194 adapted to receive one or more of the degradable packets 102. The interior portion 194 may be accessed by a user in any number of ways. For example, the front panel 193a and/or rear panel 193b (and/or any additional panels) may include a seam 195 (e.g., an elongated opening). In such embodiments, the front panel 193 and the rear panel 193b (and any other panels) may be made from a deformable material such that the seam 195 may be contorted or otherwise bent or formed (e.g., by an inward force applied to opposing edges of the front panel 193 and the rear panel 193b) into an "open" configuration in which a width of the seam (i.e., a dimension of the seam along the Y-axis of the reference coordinate system of FIG. 27A) increases (relative to the "closed" position illustrated in FIG. 27A). In such an open configuration, one or more of the degradable packets 102 may be removed or inserted into the interior portion 194.

When it is desired to "close" the seam 195, pressure may be relaxed or eliminated from the opposing edges of the front panel 193 and the rear panel 193b. In other configurations, such as that illustrated in FIG. 28, the seam 195 may be disposed along all or part of a top edge of the front panel 193 and the rear panel 193b (and any other panels). The seam 195 on the top may be closeable in any manner known in the art, such as by a reclosable adhesive, hook and loop fixtures, a zipper, or a slider identical to those used on a zipper storage bag. All or part of the carrier 192 (e.g., all or part of the front panel 193 and the rear panel 193b and any additional panels) may comprise any of the degradable materials described herein. In other embodiments, all or part of the carrier 192 (e.g., all or part of the front panel 193 and the rear panel 193b and any additional panels) may comprise a non-degradable materials described.

Is some embodiments, an attachment 196 may be secured to the carrier 192, and the attachment 196 may facilitate the transportation of the carrier 192 by a user. In some embodiments, the attachment 196 may be a lanyard 197 (e.g., a loop of fabric or plastic) that may be secured to any suitable portion of the carrier 192, and the lanyard 196 may be sized and shaped to fit around the head of a user. The attachment 196 (e.g., the lanyard 197) may include printing and/or graphics that can carry branding or other indicia. In addition, the carrier 192 (e.g., all or part of the front panel 193a and the rear panel 193b and any additional panels) may include printing and/or graphics that can carry branding or other indicia.

Figure 23:
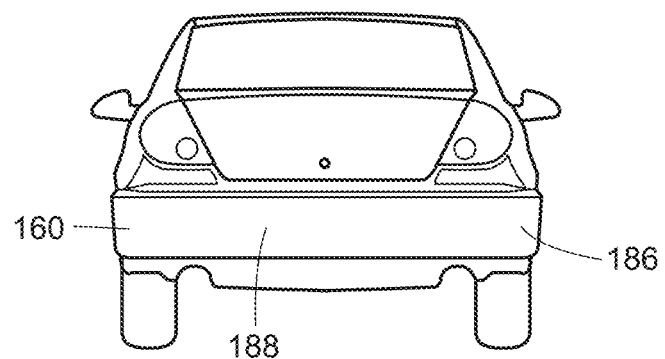
FIG. 23 is a perspective view of an embodiment of a car bumper protector.

Referring to FIG. 23, a car bumper protector 160 may include a masking film 186 made from or comprised of any of the degradable materials described herein, such as a hot-water soluble, or PVA, material. The car bumper protector 160 may be applied in solution form to form the film 186, or a pre-formed film 186 may be placed over all or a portion of a conventional car bumper 188 to form a protective barrier over the car bumper 188 and to protect the car bumper from damage (e.g., from salt, road tar, bugs, and corrosion). The car bumper protector 160 may be cleaned or removed with hot water.

In any of the embodiments in which one or more degradable packets 10, units (i.e., a strip, piece, or portion) of degradable material, degradable container 140, or combinations thereof are contained in (e.g., provided in/disposed in/enclosed in/transported in/held in/stored in) a container or outer packaging (e.g., the degradable outer packaging 144, a carrier 192, or a storage pouch 142), the container or outer packaging can contain a desiccant. The desiccant can include any suitable hygroscopic substance capable of absorbing moisture from the container or outer packaging thereby aiding in preventing the degradable packets 10, units (i.e., a strip, piece, or portion) of degradable material, degradable containers 140 contained therein from becoming too humid, e.g. and becoming sticky or sticking to each other. Suitable desiccants include, but are not limited to, silica gel, molecular sieves, clay, alumina desiccants, activated charcoal, calcium sulfate, calcium chloride, and combinations of the foregoing.

Figure 29:
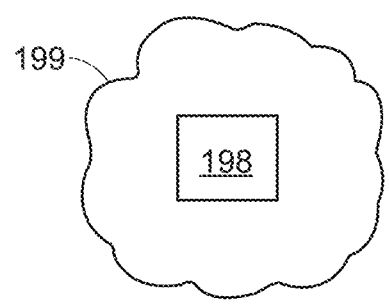
FIG. 29 is a partial view of a desiccant container secured to a surface of a container or outer packaging.

In some embodiments, such as that illustrated in FIG. 29, the desiccant can be partially or fully enclosed within a desiccant container 198. The desiccant container 198 may be any suitable container that at least partially encloses the desiccant, such as a pouch, "pillow", bag, or box, for example. The desiccant container 198 can be made of or comprise any suitable material that allows water vapor to permeate the desiccant container 198 and contact the desiccant. In some embodiments, the desiccant container 198 may be made from or comprise a material or materials that includes, but is not limited to synthetic fabrics, including but not limited to Tyvek® (DuPont) and cotton. In some embodiments, the desiccant container 198 may be made from or comprise a rigid or substantially rigid material, such as a plastic material and/or a metal material. Such a rigid desiccant container 198 may include one or more surfaces that are perforated. In some embodiments, such as the embodiment of FIG. 29, the desiccant container 198 can be secured to a surface 199 (e.g., an inside surface) of the container or outer packaging. The desiccant container 198 may be secured to the surface 199 in any suitable manner, such as by an adhesive or by one or more fasteners. In refinements of the foregoing embodiment, in a container or outer packaging that is provided as a container with a removable or hinged lid (not shown), the surface 199 may be an inside surface of the lid. Of course, the desiccant container 198 can also be provided as a loose packet in the container or outer packaging.

Dissolution and Disintegration Test (MSTM 205)

A film characterized by or to be tested for dissolution and disintegration times according to the MonoSol Test Method 205 (MS™ 205) is analyzed as follows.

Figure 24:
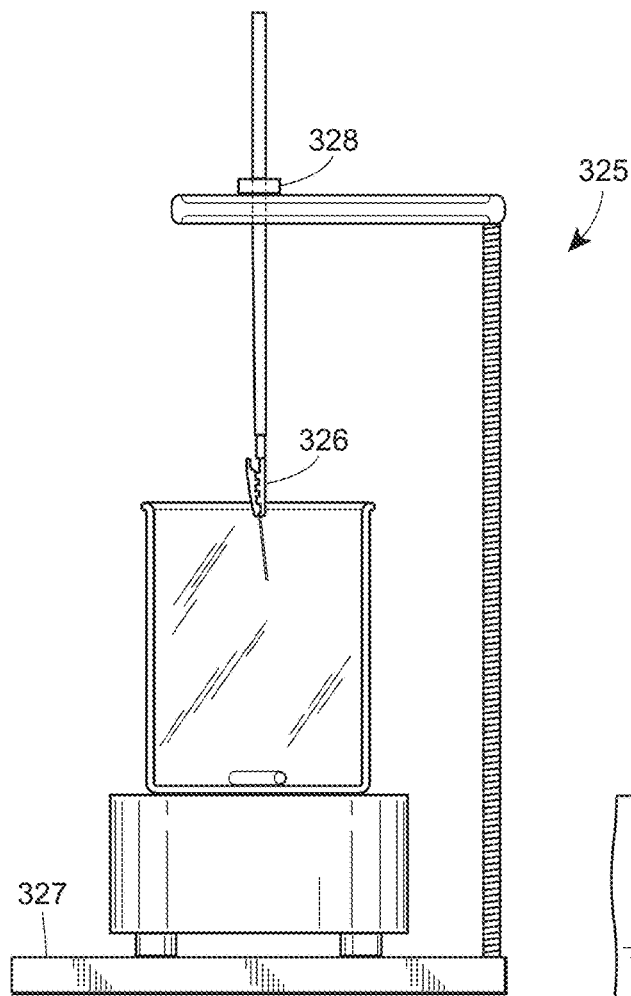
FIG. 24 is a perspective view of a test apparatus used to determine the water disintegration and dissolution times of film samples.
Figure 26:
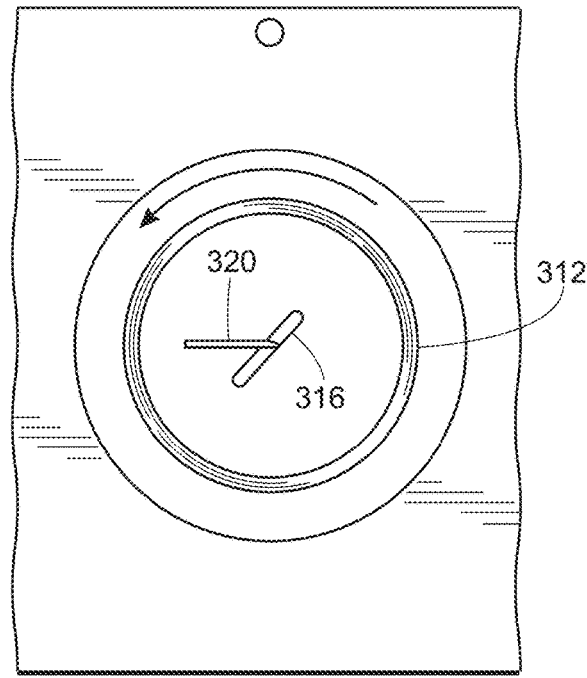
FIG. 26 is a top view of the test set-up of FIG. 25.
Figure 25:
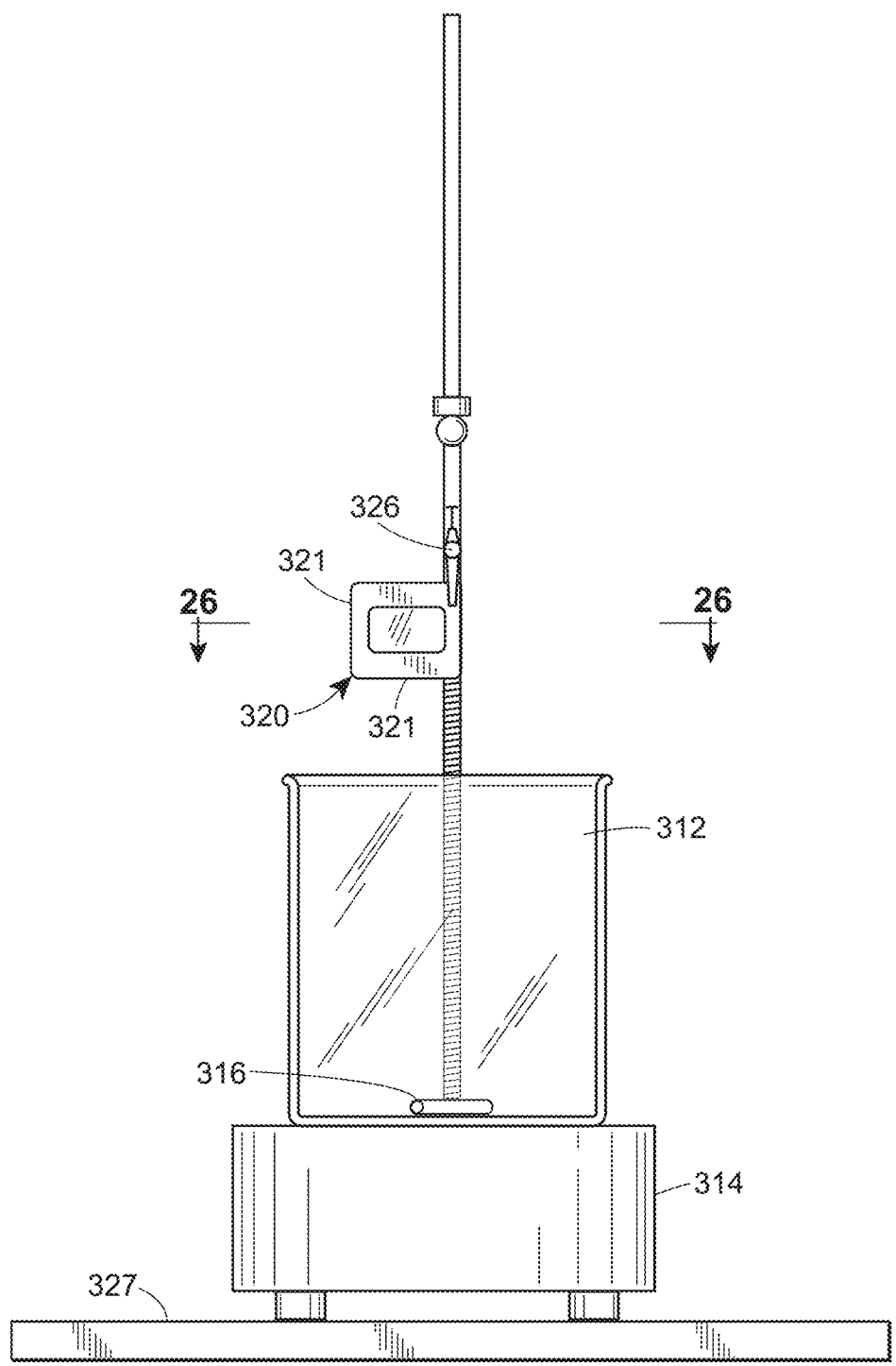
FIG. 25 is a perspective view of the test apparatus and test set-up illustrating the procedure for determining the water-solubility of film samples.

Apparatus and Materials:
1. 600 mL Beaker 312
2. Magnetic Stirrer 314 (Labline Model No. 1250 or equivalent)
3. Magnetic Stirring Rod 316 (5 cm)
4. Thermometer (0 to 100° C.±1° C.)
5. Template, Stainless Steel (3.8 cm×3.2 cm)
6. Timer (0-300 seconds, accurate to the nearest second)
7. Polaroid 35 mm slide Mount 320 (or equivalent)
8. MonoSol 35 mm Slide Mount Holder 325 (or equivalent, see FIG. 24)
9. Distilled water For each film to be tested, three test specimens are cut from a film sample using stainless steel template (i.e., 3.8 cm×3.2 cm specimen). If cut from a film web, specimens should be cut from areas of web evenly spaced along the traverse direction of the web. Each test specimen is then analyzed using the following procedure.
1. Lock each specimen in a separate 35 mm slide mount 320.
2. Fill beaker 312 with 500 mL of distilled water. Measure water temperature with thermometer and, if necessary, heat or cool water to maintain temperature at 20° C. (about 68° F.).
3. Mark height of column of water. Place magnetic stirrer 314 on base 327 of holder 325. Place beaker 312 on magnetic stirrer 314, add magnetic stirring rod 316 to beaker 312, turn on stirrer 314, and adjust stir speed until a vortex develops which is approximately one-fifth the height of the water column. Mark depth of vortex.
4. Secure the 35 mm slide mount 320 in the alligator clamp 326 of the MonoSol 35 mm slide mount holder 325 (FIG. 24) such that the long end 321 of the slide mount 320 is parallel to the water surface, as illustrated in FIG. 25. The depth adjuster 328 of the holder 325 should be set so that when dropped, the end of the clamp 326 will be 0.6 cm below the surface of the water. One of the short sides 323 of the slide mount 320 should be next to the side of the beaker 312 with the other positioned directly over the center of the stirring rod 316 such that the film surface is perpendicular to the flow of the water, as illustrated in FIG. 26.
5. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

The results should include the following: complete sample identification; individual and average disintegration and dissolution times; and water temperature at which the samples were tested.

Tensile Strength Test and Modulus Test (ASTM D 882)

A film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 3.0±0.15 mil (or 76.2±3.8 μm) are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 10% modulus (i.e., stress required to achieve 10% film elongation) and tensile strength (i.e., stress required to break film).

Suitable behavior of films according to the disclosure is marked by TS values of at least about 20 MPa as measured by the TS Test. Generally, higher TS values are desirable because they correspond to stronger pouch seals when the film is the limiting or weakest element of a seal. In various embodiments, the film has a TS value of at least 20 MPa and/or up to about 60 MPa (e.g., about 20, about 30, about 40, about 50 or about 60 MPa).

Suitable behavior of films according to the disclosure is marked by MOD values of at least about 5 N/mm$^2$ as measured by the MOD Test. Generally, higher MOD values are desirable because they correspond to pouches having a greater stiffness and a lower likelihood of deforming and sticking to each other when loaded on top of each other during production. In various embodiments, the film has a MOD value of at least about 5 N/mm$^2$ and/or up to about 100

N/mm² (e.g., about 5, about 10, about 20, about 30, about 40, about 50, about 60, about 70, about 80, about 90, or about 100 N/mm²).

Opacity Index

Opacity Index as used herein, is an index relating to the adherence of the printable material to the film surface. Abrasion resistance is a desirable property of printed materials. Abrasion damage can occur during shipment, storage, handling, and end use. The result is a significant decrease in product appearance and legibility of the printed design. The amount of abrasion damage to a printed substrate is dependent on the shipping conditions, possibly temperature and humidity, time, and many other variables. This test method provides a way of comparing abrasion resistance of printed materials under laboratory conditions. This test method also can be used to evaluate the relative abrasion resistance of printed inks, coatings, laminates, and substrates.

The opacity is the measure of the capacity of a printed material to obscure what is in the background. A value for opacity is determined by dividing the reflectance with black backing (RB) for the material, by the reflectance obtained for the same material with white backing (RW). This is called the contrast ratio method. Opacity is measured with a Reflectance Spectrophotometer Hunter Lab Scan XE, Hunter D25DP9000 supplied by HunterLab or equivalent.

Opacity=RB/RW

The Opacity Index (OI) of a printed film is calculated by dividing reflectance of printed film after the Sutherland Rub Test (SRT), by the reflectance obtained from the same material before the Sutherland Rub Test. The Sutherland Rub Test method is described in details below.

OI=(Opacity of printed film after SRT)/(Opacity of printed film before SRT)

Suitable behavior of films according to the disclosure is marked by OI values of at least about 0.38, 0.50, 0.85 as measured by the Opacity Index test. Generally, higher OI values are desirable because they correspond to more abrasive resistant printed films. In various embodiments, the film has an OI value of at least about 0.3 and/or up to about 0.8.

Sutherland Rub Test (ASTM D 5264 Abrasion Resistance)

A film characterized by or to be tested for abrasion resistance according to the Sutherland Rub Test is analyzed as follows. The procedure includes the determination of abrasion resistance according to ASTM D 5264 ("Standard Test Method for Abrasion Resistance") or equivalent. A Sutherland Ink Rub tester, SN R-1049, supplied by the Brown Company, or equivalent, is used for the collection of data. A minimum of three test specimens, are tested for each measurement. Each specimen contains at least one rectangular block of at least 10 cm×15 cm of ink printed onto the film (thickness of film? 3.0±0.15 mil (or 76.2±3.8 µm)). The specimen are preconditioned for a minimum of 2 hours at 24° C.±2.0° C. Actual relative humidity of the preconditioning environment should be between 45% and 50%. Specimen should be separated sufficiently so both sides of the specimen are equilibrated at this condition. Tests are conducted in the standard laboratory atmosphere of 23±2.0° C. and 35±5% relative humidity. Place the specimen being tested on the flat surface of the Sutherland rub test machine base. Use masking tape to hold the sample in place and flat as it has a tendency to curl. Use a 1 mL syringe, to place 0.2 mL of the liquid having the formulation shown in Table 1 onto the secured printed film specimen in a sinusoidal wave on top of the printed block. Cut Buehler micro cloth (20 cm×6.5 cm) and attach to the 1.8 kg (4 lbs) metal block. Set dial indicator for the desired number of strokes; 20 cycles should be used.

TABLE 1

| Material | Parts (%) |
|---|---|
| Glycerine | 2.48 |
| Neodol C11 E9[1] | 2.63 |
| SLF-18[2] | 44.69 |
| Dipropylene Glycerol | 41.84 |
| Water | 7.55 |

[1]nonionic surfactant of carbon chain length 11 and an ethoxylation level of 9
[2]Plurafac SLF = 18, low foaming linear alcohol alkoylate surfactant, sold by BASF QUV Test for Accelerated Weathering (ASTM G154, ASTM D4329, ASTM D4587, ISO 4892)

A film characterized by or to be tested for weathering degradation behavior according to the QUV Test is analyzed as follows. The procedure includes the determination of weathering behavior according to ASTM G154, ASTM D4329, ASTM D4587, and ISO 4892 or equivalents. The weathering behavior is measured by exposing test samples to varying conditions of the most aggressive components of weathering components of weathering—ultraviolet radiation, moisture and heat. Controlled conditions of accelerated weathering can be compared to documented performance of materials and coatings that have experienced extended periods offend use exposure. A QUV testing apparatus (Model QUV/Basic or equivalent) is used for the collection of the film data. A minimum of three test specimens, each cut with reliable cutting tools to ensure dimensional stability and reproducibility, are tested for each measurement. Up to 20 test samples can be mounted in the QUV. The samples are subjected to a cycle of exposure to intense ultraviolet radiation followed by moisture exposure by condensation. Various cycles are defined depending upon the intended end use application. The standard sample holders can hold one sample having a size of 3×13 inches (75×300 mm) or two samples having a size of 3×6 inches (75×150 mm). Depending on the performance requirements of concern, exposed samples may be compared to unexposed control samples or to other weathered samples using measurements such as Haze, Transmission, Yellowness Index, and/or physical properties such as Impact Strength.

In one type of embodiment, a suitable film would be able to withstand weathering of ultraviolet radiation, moisture, and heat for up to 24 hours. During the initial 24 hours, the film would maintain its appearance, solubility and physical characteristics as measured by at least one of, or a plurality of, and preferably all of the tests described herein. After 24 hours, the film would begin to break down and biodegrade.

Compostability Test (ASTM D6400-04)

A film characterized by or to be tested for compostability according to the Compostability Test is analyzed as follows. The procedure includes the determination of [compostability] according to ASTM D D6400-04 ("Standard Specification for Compostable Plastics") or equivalent. The compostability test is used to determine if plastics and products made from plastics will compost satisfactorily, including biodegrading at a rate comparable to known compostable materials.

In order to compost satisfactorily, a product or material will demonstrate Disintegration During Composting, Inherent Biodegradation, and No Adverse Impacts on Ability of Compost to Support Plant Growth.

To pass Disintegration During Composting, the object under consideration (e.g., a film, or a packet made from film) will disintegrate during composting such that any remaining plastic residuals are not readily distinguishable from the other organic materials in the finished product. Additionally, the material or product must not be found in significant quantities during screening prior to final distribution of the compost. A plastic product is considered to have demonstrated satisfactory disintegration if after twelve weeks in a controlled composting test, no more than 10% of its original dry weight remains after sieving on a 2.0-mm sieve. Generate laboratory thermophilic composting conditions by performing Test Method D5338 without $CO_2$ trapping component, or ISO 16929.

To pass Inherent Biodegradation a level of inherent biodegradation will be established by tests under controlled conditions, that are comparable to known compostable materials. A plastic product will demonstrate a satisfactory rate of biodegradation by achieving one of the following ratios of conversion to carbon dioxide: for products consisting of a single polymer (homopolymers or random copolymers), 60% of the organic carbon must be converted to carbon dioxide by the end of the test period when compared to the positive control. For products consisting of more than one polymer, each individual polymer component, present at more than 1% concentration, must achieve the 60% specification for homopolymers. For products consisting of more than one monomer or polymer (block copolymers, segmented copolymers, blends, or addition of low molecular weight additives), 90% of the organic carbon must be converted to carbon dioxide by the end of the test period when compared to the positive control. A mixture containing the test substance, mineral nutrients and a relatively large amount of activated sludge in aqueous medium is agitated and aerated at 20-25° C. in the dark or in diffuse light for up to 28 days. Blank controls, containing activated sludge and mineral nutrients but no test substance, are run in parallel. The biodegradation process is monitored by determination of DOC (or COD) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

To pass No Adverse Impacts on Ability of Compost to Support Plant Growth the tested materials will not adversely affect the ability of composts to support plant growth, when compared to composts using cellulose as a control, once the finished compost is placed in soil. Additionally, the materials must not introduce unacceptable levels of heavy metals or other toxic substances into the environment, upon sample decomposition.

The foregoing description is given for clearness of understanding only, and no unnecessary limitations should be understood therefrom, as modifications within the scope of the invention may be apparent to those having ordinary skill in the art.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

Specific contemplated aspects of the disclosure herein are described in the following numbered paragraphs.

1. A water-soluble film, comprising a first water-soluble film, wherein the first water soluble film disintegrates in water within less than about 24 hours and dissolves in water within less than about 48 hours as measured by the MSTM-205 at 20° C.

2. The water-soluble film of paragraph 1, wherein the first water soluble film does not disintegrate in water for at least about 1 hour and does not dissolve in water for at least about 1 hour as measured by the MSTM-205 at 20° C.

3. A water-soluble film, comprising a first water-soluble film, wherein the first water soluble film is characterized in that the degradation or dissolution of the film is adapted to be activated by consumer handling.

4. The water-soluble film of any one of the preceding paragraphs, wherein the first water-soluble film comprises a water soluble film-forming resin selected from the group consisting of polyvinyl alcohol, modified polyvinyl alcohols, polyacrylates, water-soluble acrylate copolymers, polyaminopropyl sulfonic acid and salts thereof, polyitaconic acid and salts thereof, polyacryamides, polyvinyl pyrrolidone, pullulan, cellulosics, guar gum, xanthan gum, carrageenan, starch, modified starches, poly(sodium acrylamido-2-methylpropane sulfonate), polymonomethylmaleate and salts thereof, copolymers of the foregoing, and combinations of any of the foregoing.

5. The water-soluble film of any one of the preceding paragraphs, wherein the first water-soluble film further comprises an additional component selected from the group consisting of plasticizers, surfactants, emulsifiers, fillers, extenders, antiblocking agents, detackifying agents, antifoams, film formers, and combinations of the foregoing.

6. The water-soluble film of any one of the preceding paragraphs, wherein the first water-soluble film further comprises a degradation accelerator.

7. The water-soluble film of paragraph 6, wherein the degradation accelerator is encapsulated.

8. The water-soluble film of any one of paragraphs 6 or 7, wherein the degradation accelerator is dispersed within the first water-soluble film.

9. The water-soluble film of one of paragraphs 7 or 8, wherein at least one side of the first water-soluble film is coated with a second water-soluble film.

10. The water-soluble film of paragraph 9, wherein the second water-soluble film disintegrates in water within at most about 90 seconds and dissolves in water within at most about 120 seconds as measured by MSTM-205.

11. The water-soluble film of any one of paragraphs 6 or 7, wherein the degradation accelerator is provided on at least one side of the water-soluble film.

12. The water-soluble film of paragraph 11, wherein the water-soluble film comprises a layer of a second water-soluble film provided over the degradation accelerator such that the degradation accelerator is provided between the first water-soluble film and the second-water soluble film.

13. The water-soluble film of any one of the preceding paragraphs, wherein the degradation accelerator is selected from the group consisting of a chemical degradation accelerator, heat forming agent, enzyme, UV degradation accelerator, oxidative degradation accelerator, microorganism, humidity degradation accelerator and combinations of the foregoing.

14. The water-soluble film of any one of the preceding paragraphs, wherein the first water-soluble film further comprises an agent for delayed degradation.

15. The water-soluble film of paragraph 14, wherein the agent for delayed degradation is selected from the group consisting of an antioxidant, UV absorber, light stabilizer, and combinations of the foregoing.

16. The water-soluble film of any one of the preceding paragraphs, wherein a printed material is provided on the water-soluble film as determined by the opacity test.

17. The water-soluble film of paragraph 16, wherein the printed material is characterized in that it has reduced visibility after about 1 month of exposure to sunlight.

18. The water-soluble film of paragraph 16 or 17, wherein the printed material is or comprises a degradation accelerator.

19. The water-soluble film of any one of the preceding paragraphs, having a tensile strength of at least 20 N as determined by the ASTM D 882 test method.

20. A water-insoluble, degradable film, wherein the film is characterized in that it degrades within about 4 weeks as determined by the Compostability Test ASTM D6400-04.

21. The water-insoluble film of paragraph 20, further characterized in that it does not degrade within about 2 weeks as determined by the Compostability Test ASTM D6400-04.

22. A water-insoluble, degradable film, wherein the film is characterized in that the degradation of the film is adapted to be activated by consumer handling.

23. The water-insoluble film of any one of paragraphs 20-22, wherein the water-insoluble film comprises a water insoluble film-forming resin selected from the group consisting of polypropylene, polyisobutylene, polybut-1-ene, poly-4-methylpent-1-ene, polyvinylcyclohexane, polyisoprene, polybutadiene, cyclopentene, norbornene, high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE), copolymers of monoolefins and diolefins with each other or with other vinyl monomers, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COQ, ethylene/1-olefins copolymers, propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts, terpolymers of ethylene with propylene and a diene, and combinations of the foregoing.

24. The water-insoluble film of any one of paragraphs 20-23, wherein the water-insoluble film comprises a blend of film-forming comprising a water-insoluble film-forming resin and a water-soluble film forming resin.

25. The water-insoluble film of paragraph 24, wherein the water-insoluble film-forming resin is a cross-linked water-soluble film forming resin.

26. The water-insoluble film of paragraph 24 or 25, wherein the water-insoluble film-forming resin comprises the continuous phase of the blend of water-insoluble film-forming resin and water-soluble film forming resin.

27. The water-insoluble film of any one of paragraphs 20-26, wherein the water-insoluble film further comprises an additional component selected from the group consisting of plasticizers, surfactants, emulsifiers, fillers, extenders, anti-blocking agents, detackifying agents, antifoams, film formers, and combinations of the foregoing.

28. The water-insoluble film of any one of paragraphs 20-27, wherein the water-insoluble film further comprises a degradation accelerator.

29. The water-insoluble film of paragraph 28, wherein the degradation accelerator is encapsulated.

30. The water-insoluble film of any one of paragraphs 28 or 29, wherein the degradation accelerator is dispersed within the water-insoluble film.

31. The water-insoluble film of one of paragraphs 29 or 30, wherein at least one side of the water-insoluble film is coated with a water-soluble film.

32. The water-insoluble film of paragraph 31, wherein the water-soluble film disintegrates in water within at most about 90 seconds and dissolves in water within at most about 120 seconds as measured by MSTM-205.

33. The water-insoluble film of any one of paragraphs 28 or 29, wherein the degradation accelerator is provided on at least one side of the water-insoluble film.

34. The water-insoluble film of paragraph 33, wherein the water-insoluble film comprises a layer of a water-soluble film provided over the degradation accelerator such that the degradation accelerator is provided between the water-insoluble film and the water-soluble film.

35. The water-insoluble film of any one of paragraphs 28-34, wherein the degradation accelerator is selected from the group consisting of a chemical degradation accelerator, heat forming agent, enzyme, UV degradation accelerator, oxidative degradation accelerator, microorganism, humidity degradation accelerator and combinations of the foregoing.

36. The water-insoluble film of any one of paragraphs 20-35, wherein the water-insoluble film further comprises an agent for delayed degradation.

37. The water-insoluble film of paragraph 36, wherein the agent for delayed degradation is selected from the group consisting of an antioxidant, UV absorber, light stabilizer, and combinations of the foregoing.

38. The water-soluble film of any one of paragraphs 20-37, wherein a printed material is provided on the water-insoluble film as determined by the opacity test.

39. The water-insoluble film of paragraph 38, wherein the printed material is characterized in that it has reduced visibility after about 1 month of exposure to sunlight.

40. The water-soluble film of paragraph 38 or 39, wherein the printed material is or comprises a degradation accelerator.

41. A water-soluble pouch or packet comprising the water-soluble film of any one of claims 1-19 in the form of a pouch or packet, wherein the water-soluble pouch is encapsulated in an inorganic shell material.

42. The water-soluble pouch of paragraph 41, wherein the inorganic shell comprises a water-insoluble inorganic material.

43. The water-soluble pouch of paragraph 41, wherein the inorganic shell comprises a water-soluble inorganic material.

44. A degradable packet for enclosing a powder or non-aqueous liquid, the degradable packet comprising:

a first panel defined by at least a first edge, the first panel having an inner surface and an outer surface opposite the inner surface; and a second panel defined by at least a first edge, the second panel having an inner surface and an outer surface opposite the inner surface, wherein the inner surface of the first panel is disposed between the outer surface of the first panel and the inner surface of the second panel, and wherein the inner surface of the second panel is disposed between the outer surface of the second panel and the inner surface of the first panel, wherein at least a portion of the first panel is sealingly coupled to a portion of the second panel to define a sealed enclosure between the inner surface of the first panel and the inner surface of the second panel, wherein the sealed enclosure receives the powder or non-aqueous liquid, wherein the first panel comprises the water-soluble film or water-insoluble film of any of paragraphs 1 to 40, and wherein the second panel comprises the water-soluble film or water-insoluble film of any of paragraphs 1 to 40.

45. The degradable packet of paragraph 44, wherein the first panel and the second panel both comprise one of the water-soluble films or water-insoluble films of any of paragraphs 1 to 40.

46. The degradable packet of paragraph 44, wherein the first edge of the first panel is adjacent to the first edge of the second panel.

47. The degradable packet of paragraph 46, wherein the first edge of the first panel is aligned with the first edge of the second panel.

48. The degradable packet of paragraph 44, wherein the first panel and the second panel are integrally formed at the first edge of the first panel and the first edge of the second panel.

49. The degradable packet of paragraph 44, wherein at least one of the first edge of the first panel and the first edge of the second panel has a partially-circular shape.

50. The degradable packet of paragraph 49, wherein each of the first edge of the first panel and the first edge of the second panel has a partially-circular shape.

51. The degradable packet of paragraph 44, wherein at least one of the first edge of the first panel and the first edge of the second panel has a circular shape.

52. The degradable packet of paragraph 5, wherein each of the first edge of the first panel and the first edge of the second panel has a circular shape.

53. The degradable packet of paragraph 44, wherein the first panel includes a second edge and the second panel includes a second edge.

54. The degradable packet of paragraph 53, wherein the first panel and the second panel are integrally formed at the first edge of the first panel and the first edge of the second panel, and wherein a seal is formed along at least a portion of the second edge of the first panel and along at least a portion of the second edge of the second panel.

55. The degradable packet of paragraph 49, wherein the first edge of the first panel is adjacent to and aligned with the first edge of the second panel, and wherein the
the second edge of the first panel is adjacent to and aligned with the second edge of the second panel.

56. The degradable packet of paragraph 49, wherein the first panel includes a third edge and the second panel includes a third edge.

57. The degradable packet of paragraph 51, wherein the first edge of the first panel is adjacent to and aligned with the first edge of the second panel, the second edge of the first panel is adjacent to and aligned with the second edge of the second panel, and the third edge of the first panel is adjacent to and aligned with the third edge of the second panel.

58. The degradable packet of paragraph 51, wherein the first edge, the second edge, and the third edge of the first panel and the first edge, the second edge, and the third edge of the second panel are each have a triangular shape.

59. The degradable packet of paragraph 51, wherein the first panel includes a fourth edge and the second panel includes a fourth edge.

60. The degradable packet of paragraph 54, wherein the first edge of the first panel is adjacent to and aligned with the first edge of the second panel, the
the second edge of the first panel is adjacent to and aligned with the second edge of the second panel, the third edge of the first panel is adjacent to and aligned with the third edge of the second panel, and the fourth edge of the first panel is adjacent to and aligned with the fourth edge of the second panel.

61. The degradable packet of paragraph 60, wherein the first edge, the second edge, the third edge, and the fourth edge of the first panel and the first edge, the second edge, the third edge, and the fourth edge of the second panel are each have a square or rectangular shape.

62. A method of accelerating a degrading of a degradable packet for enclosing a powder or non-aqueous liquid, the degradable packet comprising a first panel having an inner surface and an outer surface opposite the inner surface and a second panel having an inner surface and an outer surface opposite the inner surface, wherein the inner surface of the first panel is disposed between the outer surface of the first panel and the inner surface of the second panel, wherein at least a portion of the first panel is sealingly coupled to a portion of the second panel to define a sealed enclosure between the inner surface of the first panel and the inner surface of the second panel, and wherein the sealed enclosure receives the powder or non-aqueous liquid, wherein the first panel comprises the water-soluble film or water-insoluble film of any of paragraphs 1 to 40, and wherein the second panel comprises the water-soluble film or water-insoluble film of any of paragraphs 1 to 40, the method comprising:

rupturing the sealed enclosure to form at least one passage in the fire panel between the inner surface and the outer surface and/or at least one passage in the second panel between the inner surface and the outer surface;

immersing at least a portion of the degradable packet in an aqueous liquid such that the aqueous liquid passes through the at least one passage in the first panel or the at least one passage in the second panel, wherein the aqueous liquid contacts at least one of the inner surface of the first panel and the inner surface of the second panel.

63. The method of paragraph 62, wherein rupturing the sealed enclosure includes tearing a portion of the first panel and/or the second panel that comprises the sealed enclosure.

64. The method of paragraph 63, wherein tearing a portion of the first panel and/or the second panel that comprises the sealed enclosure includes tearing a scored or perforated portion of the first panel and/or the second panel.

65. The method of paragraph 62, wherein rupturing the sealed enclosure includes puncturing the sealed enclosure with a tool.

66. The method of paragraph 62, wherein rupturing the sealed enclosure includes pulling a tab affixed to at least one of the first panel or the second panel.

67. A method of manufacturing a degradable packet for enclosing a powder or non-aqueous liquid, the method comprising:
  positioning a first panel having an inner surface and an outer surface and a second panel having an inner surface such that the inner surface of the first panel is between the outer surface of the first panel and the inner surface of the second panel,
  wherein the first panel comprises the water-soluble film of any of paragraphs 1 to 19, and wherein when the water-soluble film of any of paragraphs 1 to 19 is exposed to an aqueous liquid, the water-soluble film of any of paragraphs 1 to 19 each degrades within one hour to one week, and
  the second panel comprises the film of any of paragraphs 1 to 40, and wherein when the film of any of paragraphs 1 to 40 is exposed to an aqueous liquid, the film of any of paragraphs 1 to 40 each degrades within one hour to one week;
  disposing the powder or non-aqueous liquid between the inner surface of the first panel and the inner surface of the second panel; and sealing at least a portion of the first panel and/or the second panel to form a sealed enclosure containing the powder or non-aqueous liquid.

68. The method of paragraph 67, further comprising:
  cutting a portion of water-soluble film of any of paragraphs 1 to 19 to form the first panel; and
  cutting a portion of the water-soluble film of any of paragraphs 1 to 19 to form the second panel.

69. The method of paragraph 67, wherein the first panel and the second panel both comprise s single one of the water-soluble film of any of paragraphs 1 to 19.

70. The method of paragraph 69, further comprising:
  cutting a first portion of the one of the water-soluble film of any of paragraphs 1 to 19 to form the first panel; and
  cutting a second portion of the one of the water-soluble film of any of paragraphs 1 to 19 to form the second panel.

71. The method of paragraph 70, further comprising:
  folding the one of the water-soluble film of any of paragraphs 1 to 19 about a first edge to form the first panel and the second panel.

72. The method of paragraph 71, wherein sealing at least the portion of the first panel and/or the second panel to form the sealed enclosure includes sealing along a second edge that is different than the first edge.

73. The method of paragraph 67, wherein sealing at least the portion of the first panel and/or the second panel includes ultrasonically welding at least the portion of the first panel and/or the second panel to form the sealed enclosure containing the powder or non-aqueous liquid.

74. The method of paragraph 67, wherein sealing at least the portion of the first panel and/or the second panel includes applying an adhesive to at least the portion of the first panel and/or the second panel to form the sealed enclosure containing the powder or non-aqueous liquid.

75. The method of paragraph 74, wherein the adhesive is a adapted to dissolve when in contact with an aqueous liquid.

76. The method of paragraph 67, wherein sealing at least the portion of the first panel and/or the second panel includes heat sealing at least the portion of the first panel and/or the second panel to form the sealed enclosure containing the powder or non-aqueous liquid.

77. The water-soluble film of any one of paragraphs 1-19, wherein the first-water soluble film further comprises an active agent.

78. A system for dispensing cleaning product, the system comprising:
  a dispensing machine having an inside portion defined by a plurality of walls, wherein at least one degradable packet of any of paragraphs 44 to 61 is removably disposed within the inside portion of the dispensing machine,
  wherein the at least one degradable packet of any of paragraphs 44 to 61 contains the cleaning product.

79. The system of paragraph 78, further comprising a delivery assembly coupled to the dispensing machine, the delivery assembly including an actuator assembly coupled to the at least one degradable packet and adapted to displace the at least one degradable packet within the inside portion.

80. The system of paragraph 79, wherein the actuator assembly is electrically powered.

81. The system of paragraph 79, wherein the actuator assembly is powered mechanically.

82. The system of paragraph 79, wherein the delivery assembly includes a payment unit adapted to facilitate a transaction, the payment unit being in communication with the actuator assembly such that the actuator assembly displaces one or more of the degradable packets after the transaction is made at the payment unit.

83. The system of paragraph 82, wherein the transaction is inserting tokens and/or currency into the payment unit.

84. A system for dispensing cleaning product, the system comprising:
  a dispensing machine having an inside portion defined by a plurality of walls;
  a storage vessel at least partially disposed within the inside portion of the dispensing machine, the storage vessel having a volume storing the cleaning product;
  an actuator assembly that includes a gate or a pump coupled to the storage vessel to selectively dispense a portion of the cleaning product through a spout; and
  a payment unit adapted to facilitate a transaction, the payment unit being in communication with the gate or pump such that the gate dispenses the portion of the cleaning product after the transaction is made at the payment unit.

85. The system of paragraph 84, wherein the transaction is inserting tokens and/or currency into the payment unit.

86. The system of paragraph 84, wherein at least one of the gate or pump is electrically powered.

87. The system of paragraph 84, wherein at least one of the gate or pump is powered mechanically.

88. The system of paragraph 82, further comprising a personal container adapted to hold the portion of the cleaning product dispensed from the spout.

89. The system of paragraph 88, wherein the personal container comprises the water-soluble film or water-insoluble film of any of paragraphs 1 to 40.

90. The system of paragraph 88, wherein a plurality of the personal containers are provided adjacent to the dispensing machine.

91. The system of paragraph 79, wherein the degradable packet is packaged in a degradable outer packaging comprising the water-soluble film or water-insoluble film of any of paragraphs 1 to 40.

92. A scrub brush assembly comprising:
  a plurality of sheets that cooperate to form a non-planar and/or three-dimensionally contoured shape, wherein each of the plurality of sheets comprises the water-soluble film or water-insoluble film of any of paragraphs 1 to 40.

93. The scrub brush assembly of paragraph 92, wherein detergents and/or anti-bacterial aids may be embedded into one or more of the plurality of sheets.

94. The scrub brush assembly of paragraph 92, wherein each of the plurality of sheets has an abrasive texture.

95. A scrub brush assembly comprising:
an elongated rigid handle portion having a first end, a longitudinally-opposite second end, and an intermediate pointe disposed between the first end and the second end; and
a cleaning portion secured to the handle portion and extending between the first end and the intermediate point of the handle portion,
wherein the cleaning portion includes one or more sheets that cooperate to form a substantially three-dimensional cross-sectional shape, and wherein each of the one or more sheets comprises the water-soluble film or water-insoluble film of any of paragraphs 1 to 40.

96. The scrub brush assembly of paragraph 95, wherein detergents and/or anti-bacterial aids may be embedded into any or all of the one or more sheets.

97. The scrub brush assembly of paragraph 95, wherein each of the one or more sheets has an abrasive texture.

98. The scrub brush assembly of paragraph 95, wherein the handle portion comprises the water-soluble film or water-insoluble film of any of paragraphs 1 to 40.

99. A scrub brush assembly comprising:
a handle portion having a first side end and second side opposite the first side; and
a cleaning portion secured to all or part of the first side of the handle portion, wherein the cleaning portion includes one or more sheets that cooperate to form a substantially three-dimensional cross-sectional shape,
and wherein each of the one or more sheets comprises the water-soluble film or water-insoluble film of any of paragraphs 1 to 40.

100. The scrub brush assembly of paragraph 99, wherein detergents and/or anti-bacterial aids may be embedded into any or all of the one or more sheets.

101. The scrub brush assembly of paragraph 99, wherein each of the one or more sheets has an abrasive texture.

102. The scrub brush assembly of paragraph 99, wherein the handle portion comprises the water-soluble film or water-insoluble film of any of paragraphs 1 to 40.

All patents, publications and references cited herein are hereby fully incorporated by reference. In case of conflict between the present disclosure and incorporated patents, publications and references, the present disclosure should control.

What is claimed:

1. A water-soluble film, comprising a first water-soluble film, wherein the first water soluble film disintegrates in water within less than about 24 hours and dissolves in water within less than about 48 hours as measured by the MSTM-205 at 20° C., and the first water soluble film does not disintegrate in water for at least about 1 hour and does not dissolve in water for at least 1 hour as measured by MSTM-205 at 20° C., wherein the first water-soluble film comprises a degradation accelerator and the degradation accelerator is encapsulated.

2. The water-soluble film of claim 1, wherein the first water soluble film is characterized in that the degradation or dissolution of the film is adapted to be activated by consumer handling.

3. The water-soluble film of claim 1, wherein the first water-soluble film comprises a water soluble film-forming resin selected from the group consisting of polyvinyl alcohol, modified polyvinyl alcohols, polyacrylates, water-soluble acrylate copolymers, polyaminopropyl sulfonic acid and salts thereof, polyitaconic acid and salts thereof, polyacryamides, polyvinyl pyrrolidone, pullulan, cellulosics, guar gum, xanthan gum, carrageenan, starch, modified starches, poly(sodium acrylamido-2-methylpropane sulfonate), polymonomethylmaleate and salts thereof, copolymers of the foregoing, and combinations of any of the foregoing.

4. The water-soluble film of claim 1, wherein the first water-soluble film further comprises an additional component selected from the group consisting of plasticizers, surfactants, emulsifiers, fillers, extenders, antiblocking agents, detackifying agents, antifoams, film formers, and combinations of the foregoing.

5. The water-soluble film of claim 1, wherein the degradation accelerator is dispersed within the first water-soluble film.

6. The water-soluble film of claim 1, wherein at least one side of the first water-soluble film is coated with a second water-soluble film.

7. The water-soluble film of claim 6, wherein the second water-soluble film disintegrates in water within at most about 90 seconds and dissolves in water within at most about 120 seconds as measured by MSTM-205.

8. The water-soluble film of claim 1, wherein the degradation accelerator is provided on at least one side of the water-soluble film.

9. The water-soluble film of claim 8, wherein the water-soluble film comprises a layer of a second water-soluble film provided over the degradation accelerator such that the degradation accelerator is provided between the first water-soluble film and the second-water soluble film.

10. The water-soluble film of claim 1, wherein the degradation accelerator is selected from the group consisting of a chemical degradation accelerator, heat forming agent, enzyme, UV degradation accelerator, oxidative degradation accelerator, microorganism, humidity degradation accelerator and combinations of the foregoing.

11. The water-soluble film of claim 1, wherein the first water-soluble film further comprises an agent for delayed degradation.

12. The water-soluble film of claim 11, wherein the agent for delayed degradation is selected from the group consisting of an antioxidant, UV absorber, light stabilizer, and combinations of the foregoing.

13. The water-soluble film of claim 1, wherein a printed material is provided on the water-soluble film as determined by the opacity test.

14. The water-soluble film of claim 13, wherein the printed material is characterized in that it has reduced visibility after about 1 month of exposure to sunlight.

15. The water-soluble film of claim 13, wherein the printed material is or comprises a degradation accelerator.

16. The water-soluble film of claim 1, having a tensile strength of at least 20 N as determined by the ASTM D 882 test method.

* * * * *

UNITED STATES PATENT AND TRADEMARK OFFICE
CERTIFICATE OF CORRECTION

| | |
|---|---|
| PATENT NO. | : 11,884,467 B2 |
| APPLICATION NO. | : 17/390005 |
| DATED | : January 30, 2024 |
| INVENTOR(S) | : David M. Lee et al. |

It is certified that error appears in the above-identified patent and that said Letters Patent is hereby corrected as shown below:

In the Claims

At Column 66, Lines 6-7, "polyacryamides," should be -- polyacrylamides, --.

Signed and Sealed this
First Day of October, 2024

*Katherine Kelly Vidal*

Katherine Kelly Vidal
*Director of the United States Patent and Trademark Office*